US012535113B2

(12) United States Patent
P.V et al.

(10) Patent No.: US 12,535,113 B2
(45) Date of Patent: Jan. 27, 2026

(54) THERMAL HARVESTING FOR VEHICLE BRAKES

(71) Applicant: Honeywell International Inc., Charlotte, NC (US)

(72) Inventors: Ramakrishna Rao P.V, Bangalore (IN); Raghavendra Muniraju, Bangalore (IN); Chandiran Jayamurugan, Bangalore (IN); Ravi Kumar Nimmapati, Hyderabad (IN)

(73) Assignee: Honeywell International Inc., Charlotte, NC (US)

( * ) Notice: Subject to any disclaimer, the term of this patent is extended or adjusted under 35 U.S.C. 154(b) by 513 days.

(21) Appl. No.: 18/062,953

(22) Filed: Dec. 7, 2022

(65) Prior Publication Data
US 2023/0287950 A1  Sep. 14, 2023

(30) Foreign Application Priority Data

Mar. 10, 2022  (IN) .............................. 202211013015
Oct. 7, 2022   (IN) .............................. 202211057511

(51) Int. Cl.
*F16D 66/02*    (2006.01)
*B60T 17/22*    (2006.01)
(Continued)

(52) U.S. Cl.
CPC .............. *F16D 65/84* (2013.01); *B60T 17/22* (2013.01); *F16D 65/18* (2013.01); *F16D 66/023* (2013.01);
(Continued)

(58) Field of Classification Search
CPC .......... F16D 55/24; F16D 55/26; F16D 55/36; F16D 55/40; F16D 66/023; F16D 66/026;
(Continued)

(56) References Cited

U.S. PATENT DOCUMENTS 3,298,873 A * 1/1967 Norton ................... H10N 10/17
                                                            257/722
5,884,691 A * 3/1999 Batchelder ......... H05K 7/20154
                                                            257/722
(Continued)

FOREIGN PATENT DOCUMENTS

EP         1259991 A1    11/2002
EP         2622239 A1     8/2013
(Continued)

OTHER PUBLICATIONS

U.S. Appl. No. 17/815,718, filed Jul. 28, 2022, naming inventors Muniraju et al.
(Continued)

*Primary Examiner* — Thomas J Williams
(74) *Attorney, Agent, or Firm* — Shumaker & Sieffert, P.A.

(57) ABSTRACT

A system including a magnet configured to move in response to a movement of a wear pin indicator of a brake assembly of a vehicle. A sensor is configured to generate position data corresponding to the magnet. The position data is indicative of a position and/or movement of the wear pin indicator. The system includes a thermoelectric generator configured to generate an electrical signal based on an operation of the brake assembly. The thermoelectric generator is configured to deliver at least a portion of the electrical signal to the sensor. The system includes a mounting bracket configured to mechanically couple a sensor housing to an actuator housing of the brake assembly. The mounting bracket is configured to provide heat to the thermoelectric generator when the mounting bracket mechanically couples the sensor housing and the actuator housing.

17 Claims, 29 Drawing Sheets

(51) Int. Cl.
*F16D 65/18* (2006.01)
*F16D 65/84* (2006.01)
*H10N 10/13* (2023.01)
*H10N 10/80* (2023.01)
*B64C 25/42* (2006.01)
*F16D 55/40* (2006.01)
*F16D 65/78* (2006.01)
*F16D 66/00* (2006.01)
*F16D 121/04* (2012.01)

(52) U.S. Cl.
CPC ......... *F16D 66/026* (2013.01); *F16D 66/028* (2013.01); *H10N 10/13* (2023.02); *H10N 10/80* (2023.02); *B64C 25/42* (2013.01); *F16D 55/40* (2013.01); *F16D 2065/785* (2013.01); *F16D 2066/003* (2013.01); *F16D 2121/04* (2013.01)

(58) Field of Classification Search
CPC ..... F16D 66/027; F16D 66/028; H10N 10/13; H10N 10/80
USPC ............................. 188/1.11 W, 1.11 L, 1.11 E
See application file for complete search history.

(56) References Cited

U.S. PATENT DOCUMENTS

| | | | |
|---|---|---|---|
| 6,410,842 B1* | 6/2002 | McAlonan | H10N 10/00 431/79 |
| 7,397,169 B2 | 7/2008 | Nersessian et al. | |
| 10,072,638 B2 | 9/2018 | McKay et al. | |
| 10,471,947 B1 | 11/2019 | Sheriff et al. | |
| 10,843,512 B2 | 11/2020 | Bates et al. | |
| 10,941,826 B2 | 3/2021 | Muniraju et al. | |
| 11,538,975 B2 | 12/2022 | Rastegar | |
| 2002/0070633 A1* | 6/2002 | Salender | H10N 10/00 310/306 |
| 2005/0205125 A1 | 9/2005 | Nersessian et al. | |
| 2009/0229926 A1 | 9/2009 | Schaefer | |
| 2010/0206671 A1* | 8/2010 | Cahill | F16D 66/026 73/1.79 |
| 2011/0000516 A1* | 1/2011 | Hershberger | H10N 10/13 165/185 |
| 2014/0298811 A1 | 10/2014 | McKay et al. | |
| 2016/0031394 A1 | 2/2016 | Irish et al. | |
| 2016/0215833 A1 | 7/2016 | Robert et al. | |
| 2017/0117775 A1 | 4/2017 | Shahosseini et al. | |
| 2019/0078630 A1 | 3/2019 | Serra et al. | |
| 2019/0128352 A1 | 5/2019 | Jain et al. | |
| 2019/0217671 A1 | 7/2019 | Bates et al. | |
| 2020/0080609 A1 | 3/2020 | Muniraju et al. | |
| 2020/0149860 A1 | 5/2020 | Huang et al. | |
| 2021/0229651 A1 | 7/2021 | Al-Tabakha | |
| 2023/0287950 A1* | 9/2023 | P.V | F16D 65/18 |

FOREIGN PATENT DOCUMENTS

| | | |
|---|---|---|
| EP | 3626566 A1 | 3/2020 |
| GB | 2530819 A | 4/2016 |
| JP | 2010259238 A | 11/2010 |
| WO | 0161768 A1 | 8/2001 |
| WO | 2012041321 A1 | 4/2012 |
| WO | 2021058349 A1 | 4/2021 |

OTHER PUBLICATIONS

Notice of Intent to Grant and Text Intended to Grant from counterpart European Application No. 23160290.5 dated Mar. 4, 2024, 163 pp.

Extended Search Report from counterpart European Application No. 23160290.5 dated Aug. 18, 2023, 8 pp.

Response to Extended Search Report dated Aug. 18, 2023, from counterpart European Application No. 23160290.5 filed Sep. 7, 2023, 109 pp.

* cited by examiner

THERMAL HARVESTING FOR VEHICLE BRAKES

This application claims the benefit of Indian Provisional Patent Application No. 202211057511, filed on Oct. 7, 2022, and Indian Provisional Patent Application No. 202211013015, filed on Mar. 10, 2022, the entire contents of which are incorporated herein by reference.

TECHNICAL FIELD

The disclosure relates to vehicle brake systems.

BACKGROUND

During periodic maintenance, the amount of wear on a vehicle's braking assembly is manually assessed by a maintenance technician. On an aircraft, for example, the remaining use of the braking assembly is determined by observing the length of a wear pin indicator, also known as a wear pin or a brake wear pin.

SUMMARY

In general, this disclosure describes systems and techniques for determining the estimated remaining use of a brake assembly of a vehicle. The system includes a sensing device configured to generate position data indicative of a wear pin indicator using power generated by a thermoelectric device. The thermoelectric device is configured to produce the power using heat generated by the brake assembly (e.g., during brake operation). A mounting bracket is configured to provide a heat flow to the thermoelectric generator as the mounting bracket mechanically couples a sensor housing to an actuator housing of the brake assembly. In examples, the sensing device is configured to limit a voltage supplied by the thermoelectric generator to a voltage below a cutoff voltage of circuitry of the sensing device to, for example, allow operation of the sensing device over a wider range of operating conditions of the brake assembly. The sensor may be configured to generate an output signal indicative of a movement and/or position of the wear pin indicator as the brake assembly is operated to, for example, indicate a state of wear of one or more components of the brake assembly (e.g., one or more brake discs of a disc stack). In examples, the sensing device is configured to store wear data in a memory device. In some examples, the sensing device is configured to transmit wear data to an external device. The system may be configured to determine the estimated remaining use of the brake assembly based on the wear data.

In examples, a system comprises: a sensing device including: sensing circuitry configured to generate position data corresponding to movement of a wear pin indicator configured to indicate translation of a disc stack of a brake assembly relative to an actuator housing of the brake assembly, and wherein the sensing circuitry is configured to generate the position data using electrical power; and conditioning circuitry configured to provide the electrical power to the sensing circuitry; a thermoelectric generator configured to provide the electrical power to the conditioning circuitry, wherein the thermoelectric generator defines a hot node and a cold node, and wherein the thermoelectric generator is configured to produce the electrical power based on a temperature gradient between the hot node and the cold node; a heat sink configured to transfer heat from the cold node to an environment surrounding the brake assembly; a sensor housing mechanically supporting at least the sensing device, the thermoelectric generator, and the heat sink; and a mounting bracket mechanically coupled to the sensor housing, wherein the mounting bracket is configured to attach to the actuator housing, and wherein the mounting bracket is configured to transfer heat from the actuator housing to the hot node to generate the temperature gradient when the mounting bracket attaches to the actuator housing.

In examples, a technique comprises: providing electrical power, using a thermoelectric generator, to a sensing device, wherein the thermoelectric generator defines a hot node and a cold node, and wherein the thermoelectric generator produces the electrical power based on a temperature gradient between the hot node and the cold node; generating, using the sensing device, position data corresponding to movement of a wear pin indicator configured to indicate translation of a disc stack of a brake assembly relative to an actuator housing of the brake assembly, wherein the sensing device generates the position data using the electrical power; transferring heat, using a mounting bracket mechanically coupled to the actuator housing, from the actuator housing to the hot node to generate the temperature gradient, wherein the mounting bracket is mechanically coupled to a sensor housing mechanically supporting at least the sensing device, the thermoelectric generator, and the heat sink; and transferring heat, using the heat sink, from the cold node to an environment surrounding the brake assembly.

Further details of one or more examples of this disclosure are set forth in the accompanying drawings and in the description below. Other features, objects, and advantages will be apparent from the description and drawings, and from the claims.

DETAILED DESCRIPTION

Figure 1:
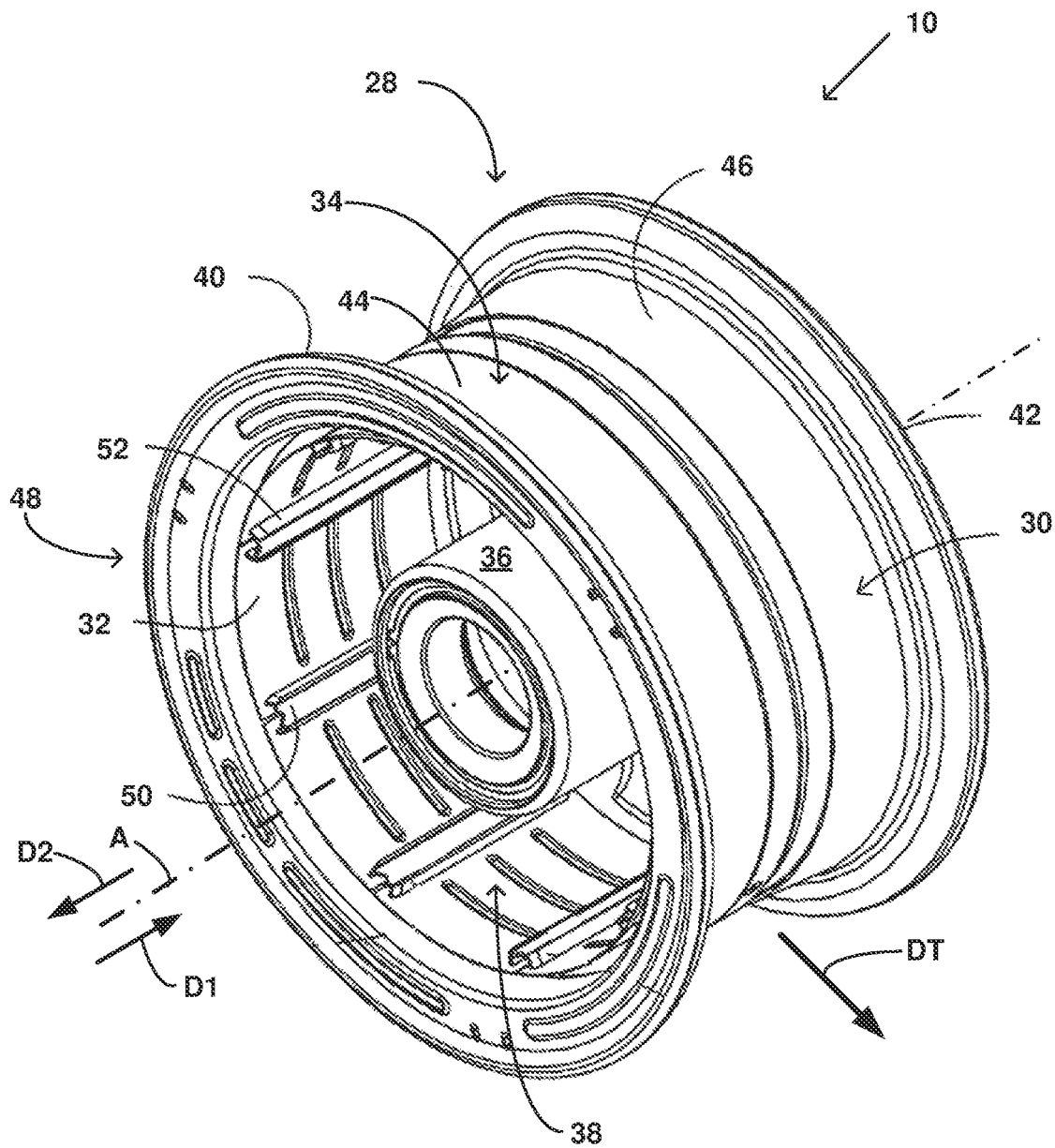
FIG. 1 is a perspective view of an example wheel.

This disclosure describes systems and techniques for determining an estimated remaining use of a brake assembly based on a position of a wear pin indicator (e.g., a wear pin, a brake wear pin, a wear indicator, and/or a wear indicator pin) in the brake assembly. The wear pin indicator may be configured to indicate a translation of a disc stack of the brake assembly (e.g., when the disc stack is compressed) relative to another portion of the brake assembly, such as an actuator housing configured to remain substantially stationary when the disc stack is compressed. A sensor including sensing circuitry is configured to generate an output signal (e.g., position data) based on the position of the wear pin indicator. The system may include communication circuitry configured to provide the position data to processing circuitry of an external device, to allow for substantially automated brake wear measurement. In examples, the sensor includes sensing circuitry configured to generate the position data. The sensor may include conditioning circuitry configured to provide electrical power to the sensing circuitry.

The system includes a thermoelectric generator (TEG) configured to harvest energy in order to supply the electrical power to the conditioning circuitry. The TEG is configured to produce the electrical power using heat generated by the brake assembly. For example, the brake assembly may generate heat when the brake assembly operates to reduce a rotational velocity of a wheel (e.g., due to friction between rotor discs and stator discs when the disc stack is compressed). This heat may transfer (e.g., via radiation, conduction, and/or convection) to one or more other components of the brake assembly, such as a pressure plate, a brake actuator housing, and/or other components of the brake assembly. The TEG is configured to receive some portion of the heat generated to develop a temperature gradient across the TEG. The TEG may be configured to develop the electrical power using the temperature gradient.

The TEG is configured to develop the temperature gradient between a hot node and a cold node. The TEG is configured to receive heat generated by the brake assembly at the hot node. The TEG includes a heat sink configured to transfer heat from the cold node to an environment surrounding the brake assembly. Hence, the TEG may be configured to develop the temperature gradient as the hot node receives heat from the brake assembly and the heat sink causes heat rejection to the environment from the cold node. In examples, the TEG includes a solid-state device in thermal communication with the hot node and the cold node and configured to produce the electrical power based on the temperature gradient between the hot node and the cold node.

The brake assembly may develop a significant degree of heat during a braking operation with temperature in some parts of the braking assembly reaching temperatures in excess of 1500 degrees Fahrenheit (815 degrees Celsius). A proximity of the sensor to these high temperatures can damage the sensing circuitry and conditioning circuitry of the sensor unless consideration is given to the specific location of the sensor. The system disclosed here is configured to position the sensor and the TEG such that the TEG receives sufficient heat from the brake assembly for the production of electrical power while the sensor circuitry is sufficiently displaced from the higher temperature regions of the brake assembly, such that the sensor circuitry is not adversely impacted by the heat flux generated by the high temperature regions. In examples, the system is configured to deliver heat (e.g., via a conduction path) to the TEG from an actuator housing of the brake assembly as the sensing circuitry and/or TEG is substantially displaced from the actuator housing, such that heat may be delivered while limiting and/or mitigating heat exposure from the high temperature regions of the brake assembly.

In examples, the system includes a sensor housing mechanically supporting at least the sensing circuitry, the TEG, and the heat sink. The system may include a mounting bracket configured to attach to the sensor housing and the actuator housing of the brake assembly. The mounting bracket is configured to transfer heat (e.g., by conduction) from the actuator housing to the hot node of the TEG when the mounting bracket positions the sensor housing. Further, the mounting bracket may be configured to substantially displace the sensor housing from the actuator housing and/or other portions of the brake assembly, such that exposure of the sensor housing (and the signal circuitry and TEG components therein) to the high heat flux produced by the relatively high temperature area of the brake assembly is reduced and/or limited. In examples, the mounting bracket is configured to substantially suspend the sensor housing between the actuator housing and a pressure plate of the brake assembly, to limit excessive exposure of the sensor housing to the high heat fluxes generated by the brake assembly during a braking operation. Hence, the mounting bracket may be configured to define a heat transfer path from the actuator housing to the hot node of the TEG while positioning the sensor housing in an advantageous location relative to the brake assembly for operation of the sensing circuitry and the conditioning circuitry.

In examples, the system is configured to substantially limit and/or prevent the TEG from providing a voltage greater than a cutoff voltage of the sensing circuitry and/or conditioning circuitry. The system may limit the voltage provided to the conditioning circuitry and/or sensing circuitry when the TEG develops a TEG voltage greater than the cutoff voltage. For example, the TEG may develop a voltage exceeding the cutoff voltage of the conditioning circuitry and/or sensing circuitry when the TEG experiences a high temperature gradient between the hot node and the cold node (e.g., when the brake assembly is generating a high amount of heat such as, for example, during braking). In the absence of the shunt circuitry, this could cause the sensor to substantially cease operation, due the high TEG voltage generated. The shunt circuitry is configured to limit the voltage provided to the conditioning circuitry by the TEG when the TEG experiences the high temperature gradient, such that the sensor may continue to provide position data indicative of the wear pin indicator position during brake assembly operation. The shunt circuitry may thus enhance operation of the system operation by allowing generation of the position data over a wider range of braking conditions, including under conditions when frictional engagement of the disc stack (e.g., during a landing) tends to produce higher temperature regions throughout the brake assembly. In examples, the shunt circuitry is configured such that the thermoelectric generator may provide the electrical power when the hot node has a temperature of at least 90 degrees Celsius.

The heat sink may be configured to improve and/or optimize the temperature gradient developed from the hot node to the cold node. In examples, the sensor housing is configured to mechanically support the heat sink such that, when the mounting bracket attached the sensor housing to the actuator housing, the heat sink substantially establishes a particular orientation relative to the direction of travel of a wheel assembly supporting the brake assembly. The particular orientation may be established to enhance and/or optimize a transfer of heat from cold node of the TEG to the environment surrounding the brake assembly, such that the temperature gradient from the hot node to the cold node may be established and/or satisfactorily maintained under a variety of braking conditions. For example, the sensor housing may be configured such that the heat sink substantially faces in the direction of travel of the wheel assembly. The heat sink may be configured such that the heat sink and on or more fins of the heat sink substantially experiencing an impingement flow when the wheel travels in the direction of travel. In some examples, the heat sink includes a plurality of fins extending substantially in the direction travel when the mounting bracket attaches (e.g., when the mounting bracket is attached) the sensor housing to the actuator housing of the brake assembly. In some examples, the one or more fins of the heat sink are comprised of a mesh and/or lattice to increase a heat transfer area exposed to the environment surrounding the brake assembly. In some examples, the heat sink defines a gyroid lattice.

Determining a length of a wear pin indicator is described herein with the understanding that the length of the wear pin indicator corresponds to the amount of use or estimated life of the brake assembly. It should be understood however that when implemented by sensing circuitry and/or processing circuitry of an external device, the sensing circuitry and/or processing circuitry does not necessarily need to determine a length of the wear pin indicator as an input or output variable and may just map an output signal or a time difference to the estimated life of the brake assembly. The mapping, which may be stored to a memory device, can associate signal characteristics and/or times with estimated remaining uses for the brake assembly. The mapping can be based on an equation, a lookup table, or a data structure and may include data such as amplitude, signal strength, time, distance, length, remaining use, and wear rates. A system of this disclosure can be installed in an existing brake assembly as a retrofit sensor (e.g., an after-market product), or the system can be built into a new brake assembly.

In some examples, the brake assembly described herein is located on an aircraft. Aircrafts may, in some examples use wheels and braking systems when taking off, landing, taxiing, resting, or any combination thereof. Since aircraft are often subject to congested taxiways, short runway exits, and tight gate turn-times it may be beneficial to improve an efficiency of monitoring one or more aspects of the aircraft. For example, shortening an amount of time that it takes to evaluate a remaining use of a brake assembly may shorten an amount of time that an aircraft is idle. Generally, a ground aircraft engineering team performs routine inspections (e.g., visual inspections) of the tires and brake systems to monitor the wheels and brakes of an aircraft in order to analyze wear and tear and ensure aircraft safety during take-off and landing. It may be beneficial to use sensor data to evaluate the brakes of an aircraft, in terms to time turnaround between flights, improved monitoring capabilities, and for other reasons. In some examples, it may be beneficial to use an artificial intelligence (AI) model and/or a machine learning (ML) model in order to evaluate the sensor data.

For example, wear to the disc stack of a brake assembly may occur substantially every time an aircraft lands and/or taxis on a runway. Since the brake assembly is important to operation of the aircraft, some aircraft operators might inspect brake assemblies before every flight in order to make sure that the brake assembly has sufficient life remaining. The manual and/or a visual inspection of the brake assembly may take 10-15 minutes, meaning that manual and visual inspections may be costly to aircraft operators. Automatic brake inspections based on sensor data may improve an accuracy of brake inspections and/or decrease a cost to airlines as compared with manual inspections. One or more automatic brake wear measurement systems described herein may generate and evaluate sensor data in order to determine an estimated remaining life of one or more brake assemblies. For example, the system disclosed herein may use self-powered energy harvesting technology in order to supply power to the sensors so that the sensors may operate independently, without relying on batteries and/or an outside power source. Additionally, or alternatively, sensors may include wear sensing technology, automatic landing and takeoff detection, and on board edge inferencing. Sensors may communicate with a cloud. Computing systems may use AI/ML models in order to evaluate sensor data.

Figure 2:
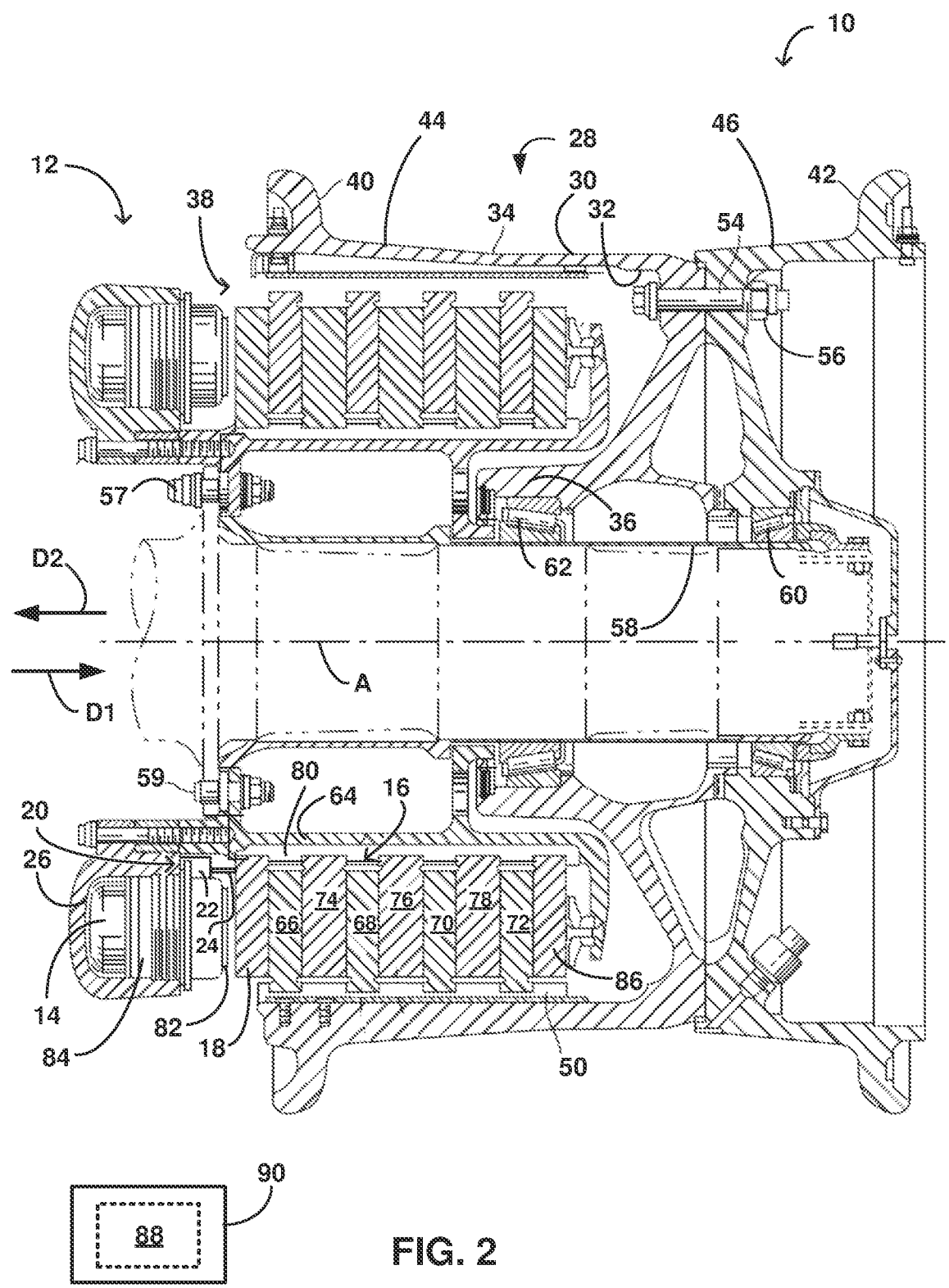
FIG. 2 is a schematic cross-sectional view of an example braking assembly positioned on the example wheel of FIG. 1.
Figure 3:
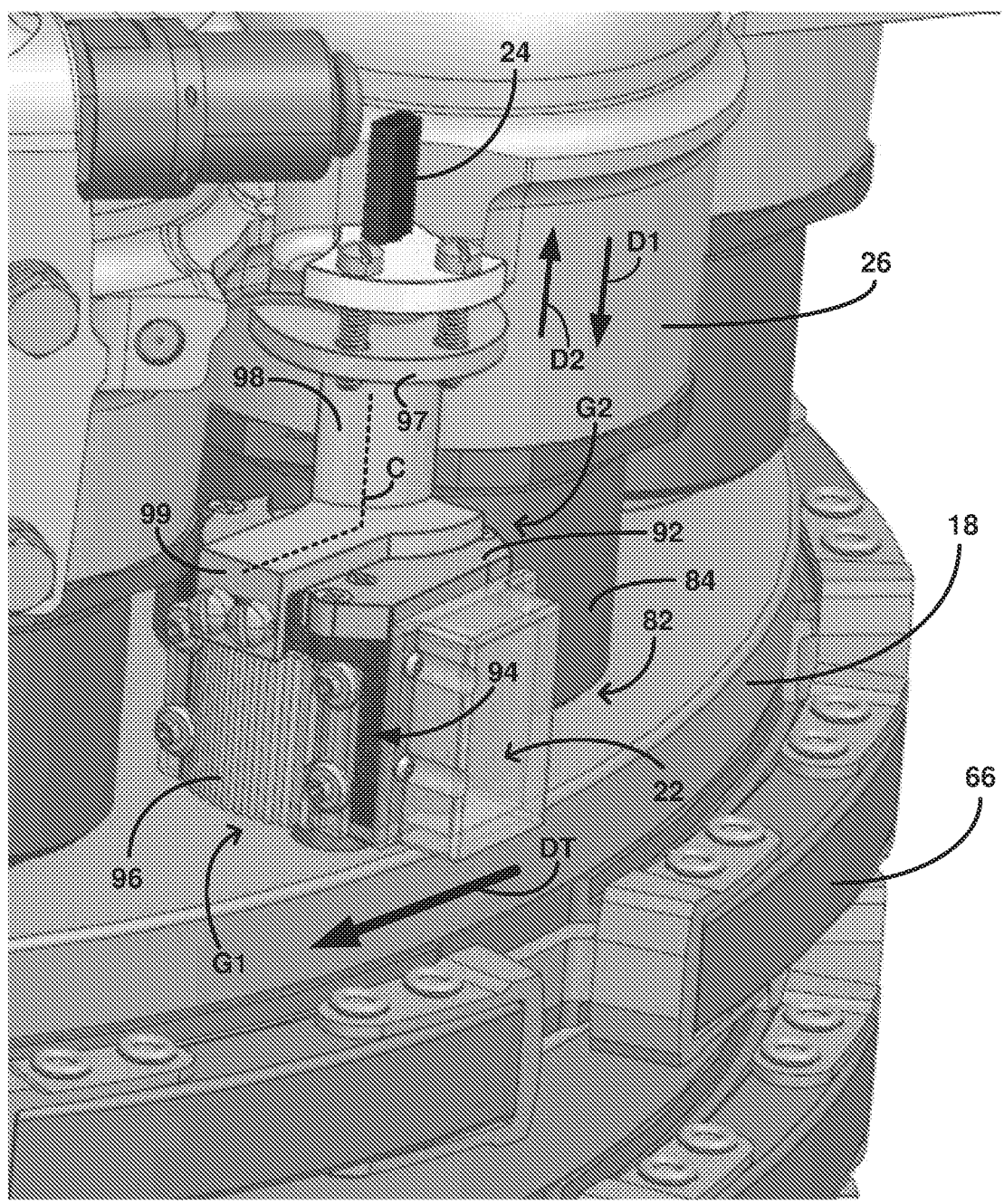
FIG. 3 is a perspective view of an example sensing device attached to a braking assembly.

FIG. 1 is a perspective view illustrating an example wheel 10 configured to rotate around an axis of rotation A. In examples, wheel 10 is a part of an aircraft vehicle. In other examples, wheel 10 may be a part of any other vehicle, such as, for example, any land vehicle or other vehicle. FIG. 2 is a schematic cross-sectional view illustrating wheel 10 and an example brake assembly 12 configured to decelerate a rotation of wheel 10 using an actuator 14 to compress a disc stack 16 (e.g., via a pressure plate 18). The cross-section of FIG. 2 is illustrated with a cutting plane perpendicular to the axis of rotation A. FIG. 3 is a perspective view illustrating a system 20 including a sensing device 22 configured to generate position data indicative of a position of a wear pin indicator 24. Wear pin indicator 24 is configured to translate when disc stack 16 and/or pressure plate 18 translates relative to an actuator housing 26 (e.g., when disc stack 16 is compressed by actuator 14).

In the example shown in FIG. 1, wheel 10 includes a wheel rim 28 defining an exterior surface 30 and interior surface 32. Wheel rim 28 includes tubewell 34 and wheel hub 36. Interior surface 32 and wheel hub 36 may define a wheel cavity 38 (e.g., a volume) between interior surface 32 and wheel hub 36. In some examples, a tire (not shown) may be mounted on exterior surface 30 of wheel rim 28. Wheel 10 may include an inboard bead seat 40 and an outboard bead seat 42 configured to retain a tire on exterior surface 30 of wheel rim 28. In examples, wheel 10 may comprise an inboard section 44 (e.g., including inboard bead seat 40) and an outboard section 46 (e.g., including outboard bead seat 42). Wheel 10 may define a first direction D1 parallel to the axis of rotation A and a second direction D2 opposite the first direction D1. In examples, first direction D1 is an outboard direction of wheel 10 having a direction from inboard section 44 toward outboard section 46. In examples, second direction D1 is an inboard direction of wheel 10 having a direction from outboard section 46 toward inboard section 44. Wheel 10 may be configured to travel in a direction DT or a direction opposite the direction DT when wheel 10 rotates around axis of rotation A. In examples, the direction DT is substantially perpendicular to the axis of rotation A.

Wheel 10 includes a plurality of rotor drive keys 48 on interior surface 32 of wheel 10, such as rotor drive key 50 and rotor drive key 52. In some examples, each rotor drive key of the plurality of rotor drive keys 48 extends in a substantially axial direction of wheel 10 (e.g., in a direction parallel to the axis of rotation A). The plurality of rotor drive keys 48 ("rotor drive keys 48") and interior surface 32 are configured to be substantially stationary with respect to each other, such that when wheel 10 (and interior surface 32) rotates around axis of rotation A, each of the rotor drive keys (e.g., rotor drive keys 50, 52) translates over a closed path around axis A. Consequently, when wheel 10, interior surface 32, and rotor drive keys 48 are rotating around axis of rotation A, a force on one or more of rotor drive keys 48 opposing the direction of rotation acts to slow or cease the rotation. As will be discussed, rotor drive keys 48 may be configured to receive a torque from a braking system (not shown) configured to reduce and/or cease a rotation of wheel 10. Rotor drive keys 48 may be integrally formed with interior surface 32, or may be separate from and mechanically affixed to interior surface 32.

FIG. 2 is a schematic cross-sectional view illustrating wheel 10 with brake assembly 12 positioned at least partially within wheel cavity 38. FIG. 2 illustrates wheel rim 28 as a split rim wheel with lug bolt 54 and lug nut 56 connecting inboard section 44 and outboard section 46, however wheel rim 28 may utilize other configurations (e.g., a unified wheel rim) in other examples. An axial assembly 58 is configured to support wheel 10 while allowing wheel 10 to rotate around axis A using bearing 60 and bearing 62. For example, bearings 60, 62 may define a substantially circular track around axial assembly 58. In examples, axis A extends through axial assembly 58. A torque tube 64 is coupled to axial assembly 58, such that torque tube 64 remains substantially rotationally stationary when wheel 10 rotates around axial assembly 58 and axis A. Torque tube 64 may at least partially surround an exterior of axial assembly 58. Axial assembly 58 may be mechanically coupled to a strut or some other portion of a vehicle using, for example, bolts 57 and/or bolts 59, or some other fastening device. Wheel 10 is shown and described to provide context to the brake assembly described herein, however the brake assembly described herein may be used with any suitable wheel assembly in other examples.

In the example shown in FIG. 2, brake assembly 12 is positioned within wheel 10 (e.g., wheel cavity 38) and configured to engage torque tube 64 and rotor drive key 50. Brake assembly 12 is configured to generate a torque to oppose a rotation of wheel 10 around axis A and transfer the torque to rotor drive key 50, reducing and/or eliminating the rotation of wheel 10 around axis A. Brake assembly 12 includes disc stack 16 which includes one or more rotor discs (e.g., rotor discs 66, 68, 70, 72) and one or more stator discs (e.g., stator discs 74, 76, 78). Rotor discs 66, 68, 70, 72, and/or stator discs 74, 76, 78 may have any suitable configuration. For example, rotor discs 66, 68, 70, 72 and/or stator discs 74, 76, 78 can each be substantially annular discs surrounding axial assembly 58. Stator discs 74, 76, 78 are coupled to torque tube 64 via a spline 80 and remain rotationally stationary with torque tube 64 (and axial assembly 58) as wheel 10 rotates. Rotor discs 66, 68, 70, 72 are rotationally coupled to rotor drive key 50 and interior surface 32 and rotate substantially synchronously with wheel 10 around axis A.

Actuator 14 is configured to compress disc stack 16 to bring friction surfaces of rotor discs 66, 68, 70, 72 into contact with friction surfaces of stator discs 74, 76, 78 to generate shearing forces between the discs. The shearing forces cause rotor discs 66, 68, 70, 72 to exert a torque on rotor drive key 50 opposing a rotation of wheel 10. In some examples, actuator 14 is configured to compress disc stack 16 using pressure plate 18. In examples, actuator 14 is configured to cause a piston 82 to translate relative to a body 84 of actuator 14 ("actuator body 84") to compress disc stack 16. Actuator 14 may cause piston 82 to translate using any suitable process. In some examples, actuator 14 is configured to cause translation of piston 82 by supplying and/or venting a pressurized hydraulic fluid to or from a piston chamber. In addition or instead, in some examples, actuator 14 is configured to cause piston 82 to translate through a motion (e.g., a rotary motion) generated by an electric motor. In the example shown in FIG. 2, actuator 14 is configured to compress disc stack 16 against a backing plate 86.

Actuator housing 26 is configured to partially or fully cover and/or protect one or more components of brake assembly 12, such as actuator body 84. Actuator housing 26 may be configured to attach to torque tube 64 and/or another component of brake assembly 12 configured to remain substantially stationary with respect to torque tube 64. In examples, actuator housing 26 is configured to remain substantially stationary relative to torque tube 64 and/or actuator body 84 when actuator 14 (e.g., piston 82) causes a translation of disc stack 16 relative to torque tube 64 (e.g., when actuator 14 causes a compression of disc stack 16 during a braking operation of brake assembly 12). Disc stack 16 may be configured to translate (e.g., in an axial direction of wheel 10) relative to actuator housing 26 when actuator 14 causes the translation of disc stack 16. In examples, actuator housing 26 at least partially surrounds axis of rotational A. In some examples, actuator housing 26 is configured to at least partially extend outside of wheel cavity 38 in either the direction D2 (e.g., in the inboard direction of wheel 10) or the direction D1 (e.g., in the outboard direction of wheel 10). In some examples, actuator housing 26 is positioned such that disc stack 16 is between actuator housing 26 and backing plate 86. In some examples, axis of rotation A intersects actuator housing 26.

The shearing forces generated between rotor discs 66, 68, 70, 72 and stator discs 74, 76, 78 when actuator 14 compresses disc stack 16 act to convert kinetic energy (e.g., of an aircraft) to thermal energy. Disc stack 16 generally acts as a heat sink to absorb some part of this thermal energy, leading to increases in the temperature of disc stack 16. The shearing forces and/or increase in temperature may cause a wearing of the friction surfaces of rotor discs 66, 68, 70, 72 and/or stator discs 74, 76, 78, resulting in a decreased thickness of the friction surfaces over multiple uses. The decreased thickness of the friction surfaces may result in an increased translation of disc stack 16 (e.g., in the first direction D1) when actuator 14 (e.g., piston 82) compresses disc stack 16 to cause braking of wheel 10. Hence, translation of disc stack 16 during braking may be indicative of a state of wear of one or more of rotor discs 66, 68, 70, 72 and/or stator discs 74, 76, 78.

Brake assembly 12 may include wear pin indicator 24 configured to indicate a position and/or translation of disc stack 16 and/or pressure plate 18. In examples, wear pin indicator 24 is configured to indicate the position and/or translation of disc stack 16 and/or pressure plate 18 relative to another portion of brake assembly 12, such as actuator housing 26 and/or torque tube 64. For example, wear pin indicator 24 may be configured to indicate to indicate the position and/or translation of disc stack 16 and/or pressure plate 18 when actuator 14 causes a compression of disc stack 16. Hence, a position and/or translation indicated by wear pin indicator 24 may be indicative of a state of wear of one or more of rotor discs 66, 68, 70, 72 and/or stator discs 74, 76, 78. In examples, wear pin indicator 24 is configured to indicate the position and/or translation of pressure plate 18 when actuator 14 acts on pressure plate 18 to cause the compression of disc stack 16. In some examples, wear pin indicator 24 is configured to indicate the position and/or translation of one or more of rotor discs 66, 68, 70, 72 and/or stator discs 74, 76, 78 when actuator 14 acts on pressure plate 18 to cause the compression of disc stack 16.

In examples, wear pin indicator 24 is a component whose exposed length represents the remaining use (e.g., remaining lifespan) of a component of brake assembly 12 (e.g., one or more of rotor discs 66, 68, 70, 72 and/or stator discs 74, 76, 78). In some examples, when a tip of wear pin indicator 24 establishes a specific position relative to actuator housing 26 (e.g., is substantially flush with actuator housing 26), the component of brake assembly 12 may need replacement. Wear pin indicator 24 may have any suitable shape, such as a cylinder, a cone, or a rectangle, where the length of wear pin indicator 24 may decrease over time. As a cylinder, wear pin indicator 24 may have a radius of a few millimeters. Wear pin indicator 24 can also include a material layer, a coating, and/or a covering that indicates the wear of the brake assembly.

Brake assembly 12 may include system 20 including sensing device 22 configured to generate position data corresponding to movement of wear pin indicator 24. In examples, system 20 includes communication circuitry (e.g., communication circuitry 136 (FIG. 14)) configured to transmit the position data to processing circuitry 88. In examples, processing circuitry 88 is mechanically supported by an external device 90. External device 90 may be, for example, a tablet, a workstation, another system on board on aircraft, or some other external device having a housing generally separated from a housing of sensing device 22.

Sensing device 22 is configured to generate the position data using electrical power. System 20 includes a thermoelectric generator (e.g., TEG 94 (FIGS. 4A and 4B)) configured to generate the electrical power using heat produced by disc stack 16 during the braking operations of brake assembly 12. This heat typically transfers (e.g., by conduction, convection, and/or radiation) to torque tube 64, actuator housing 26, and/or other portions of brake assembly 12 and/or wheel 10 leading to increased temperatures of these components. System 20 is configured to receive some portion of this heat to provide electrical power to sensing device 22. In examples, system 20 is configured to receive heat from actuator housing 26 to provide power to sensing device 22. System 20 may be configured to position sensing device 22 (e.g., using mounting bracket 98 (FIG. 3)) relative to actuator housing 26, torque tube 64, and/or other portions of brake assembly 12 and/or wheel 10 to reduce a heat flux on sensing device 22 to, for example, reduce and/or mitigate temperatures experienced on circuitry within sensing device 22 during operation of system 20.

FIG. 3 illustrates system 20 including a sensor housing 92. Sensor housing 92 mechanically supports sensing device 22, a thermoelectric generator 94 ("TEG 94"), and a heat sink 96. System 20 further includes a mounting bracket 98 mechanically coupled to sensor housing 92. Mounting bracket 98 is configured to attach to actuator housing 26 to transfer heat from actuator housing 26 to TEG 94. Heat sink 96 is configured to transfer heat from TEG 94 and reject the heat to an environment surrounding sensor housing 92 (e.g., an ambient environment surrounding brake assembly 12 and/or wheel 10). System 20 is configured such that the heat transferred from actuator housing 26 via mounting bracket 98 and the heat rejected from TEG 94 via heat sink 96 causes a temperature gradient across TEG 94. TEG 94 is configured to produce electrical power using the temperature gradient and provide the electrical power to sensing device 22, such that sensing device 22 may generate position data indicative of a position and/or translation of wear pin indicator 24.

Mounting bracket 98 is configured to transfer heat to TEG 94 (e.g., by conduction) while positioning sensor housing 92 in a position displaced from actuator housing 26 and other portions of brake assembly 12, such as pressure plate 18. Positioning sensor housing 92 in such a manner allows TEG 94 to receive heat flow via mounting bracket 98 while limiting thermal contact with other portions of brake assembly 12 (e.g., pressure plate 18). Limiting the thermal contact with the other portions of brake assembly 12 may serve to reduce and/or mitigate heat fluxes from the other portions of brake assembly 12 which impinge on sensor housing 92. These heat fluxes from other portions of brake assembly 12 may tend to increase the temperature of sensor housing 92 and/or other mechanically supported components, potentially adversely impacting the operation of circuitry within sensing device 22 and/or the ability of heat sink 96 to establish a temperature gradient across TEG 94. By utilizing mounting bracket 98 to provide a relatively defined transfer of heat from actuator housing 26 to TEG 94 while limiting thermal contact with other portions of brake assembly 12, mounting bracket 98 may enhance operations of system 20 in obtaining and providing position data indicative of a position and/or translation of wear pin indicator 24.

In examples, mounting bracket 98 is configured to separate sensor housing 92 and pressure plate 18 by a gap G1 when mounting bracket 98 mechanically couples sensor housing 92 and actuator housing 26. Gap G1 may define, for example, a space between sensor housing 92 and pressure plate 18. In examples, mounting bracket 98 is configured such that gap G1 substantially eliminates physical contact between sensor housing 92 and pressure plate 18, such that heat transfer by conduction from pressure plate 18 to sensor housing 92 is substantially eliminated. Substantially eliminating the physical contact between sensor housing 92 and pressure plate 18 may tend to reduce and/or mitigate heat transfers by conduction from pressure plate 18 to sensor housing 92 when brake assembly 12 generates high temperatures during and/or following a braking operation. Reducing and/or mitigating the heat transfers by conduction from pressure plate 18 may reduce and/or eliminate severe increases in the temperature of sensor housing 92, potentially avoiding adverse impacts to the operation of circuitry within sensing device 22 and/or the ability of heat sink 96 to establish a temperature gradient across TEG 94.

Similarly, mounting bracket 98 may be configured to separate sensor housing 92 and actuator housing 26 and/or actuator body 84 by a gap G2 when mounting bracket 98 mechanically couples sensor housing 92 and actuator housing 26. Gap G2 may define, for example, a space between sensor housing 92 and actuator housing 26 and/or actuator body 84. In examples, mounting bracket 98 is configured such that gap G2 substantially eliminates physical contact between sensor housing 92 and actuator housing 26 and/or actuator body 84, such that heat transfer by conduction from actuator housing 26 and/or actuator body 84 to sensor housing 92 is substantially eliminated. Substantially eliminating the physical contact between sensor housing 92 and actuator housing 26 and/or actuator body 84 may tend to reduce and/or mitigate heat transfers by conduction from actuator housing 26 and/or actuator body 84, and may reduce and/or eliminate severe increases in the temperature of sensor housing 92. In some examples, mounting bracket 98 is configured to position sensor housing 92 substantially between some portion of actuator housing 26 and pressure plate 18 when mounting bracket 98 mechanically couples sensor housing 92 and actuator housing 26.

For example, mounting bracket 98 may be configured to position sensor housing 92 such that mounting bracket 98 substantially suspends sensor housing 92, TEG 94, and/or heat sink 96 between a portion of actuator housing 26 and pressure plate 18. In examples, mounting bracket 98 is configured to substantially displace sensor housing 92, TEG 94, and/or heat sink 96 from pressure plate 18 in the second direction D2 (e.g., when actuator housing 26 is inboard of wheel 10) or the first outboard direction D1 (e.g., when actuator housing 26 is outboard of wheel 10). In some examples, mounting bracket 98 is configured to substantially displace sensor housing 92, TEG 94, and/or heat sink 96 from at least a portion of actuator housing 26 in the first direction D1 when mounting bracket 98 displaces sensor housing 92, TEG 94, and/or heat sink 96 from pressure plate 18 in the second direction D2. In some examples, mounting bracket 98 is configured to substantially displace sensor housing 92, TEG 94, and/or heat sink 96 from at least a portion of actuator housing 26 in the second direction D2 when mounting bracket 98 displaces sensor housing 92, TEG 94, and/or heat sink 96 from pressure plate 18 in the first direction D1.

Mounting bracket 98 may be configured to provide a relatively defined heat transfer path from actuator housing 26 to TEG 94 while limiting the thermal contact (e.g., using gap G1 and/or gap G2) with other portions of brake assembly 12. In examples, mounting bracket 98 is configured to define a conductive heat path from actuator housing 26 to TEG 94. Mounting bracket 98 may be configured such that conductive heat flow to sensor housing 92 is substantially limited to the conductive heat path defined by mounting bracket 98. For example, mounting bracket 98 may be configured to provide a conductive heat flow to sensor housing 92 from a first component of brake assembly 12 (e.g., actuator housing 26) while positioning sensor housing 92 such that heat flows from other portions of brake assembly 12 to sensor housing 92 (e.g., from pressure plate 18) are substantially limited to heat transfer by convection and/or radiation.

For example, mounting bracket 98 may include a first bracket portion 97 and a second bracket portion 99. Mounting bracket may be configured to thermally couple first bracket portion 97 and second bracket portion 99 via a conductive heat path C, such that heat flow by conduction may occur from first bracket portion 97 to second bracket portion 99, and vice-versa. Mounting bracket 98 may be configured such that first bracket portion 97 is in thermal communication with a first component of brake assembly 12 (e.g., actuator housing 26) and second bracket portion 99 is in thermal communication with TEG 94 when mounting bracket 98 mechanically couples sensor housing 92 and the first component of brake assembly 12. Mounting bracket 98 may be configured to transfer heat to TEG 94 by conduction from the first component via the conductive heat path C.

Figure 4A:
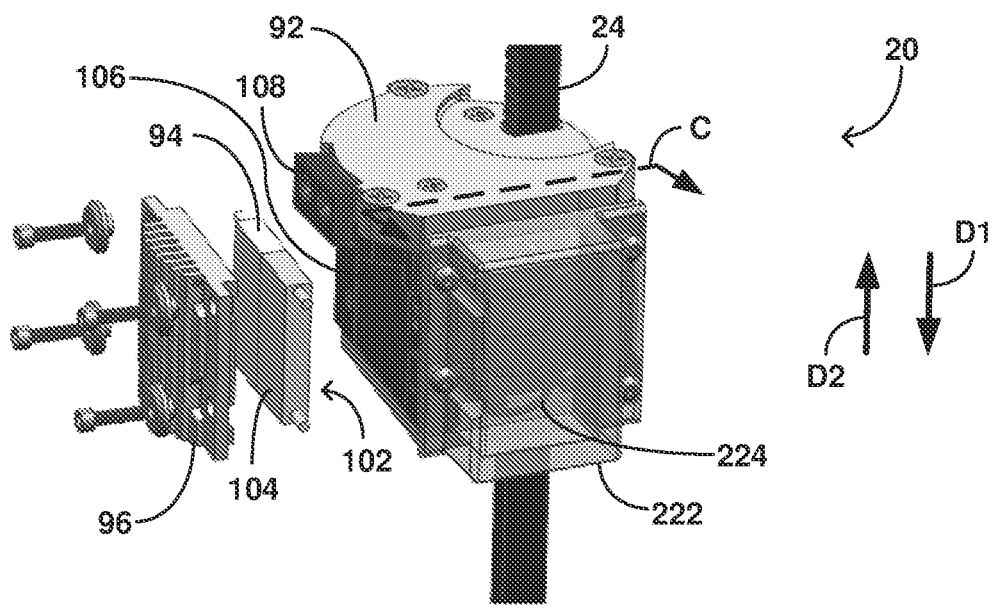
FIG. 4A is an exploded view of an example sensing device.
Figure 4B:
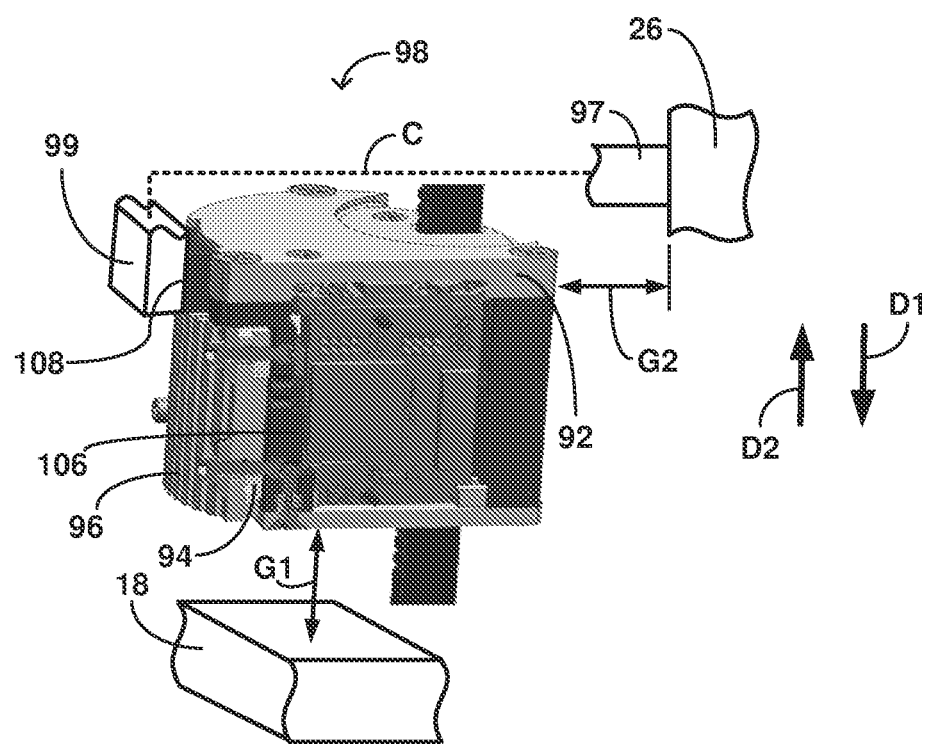
FIG. 4B is a cross-sectional view of the sensing device of FIG. 4A.
Figure 5:
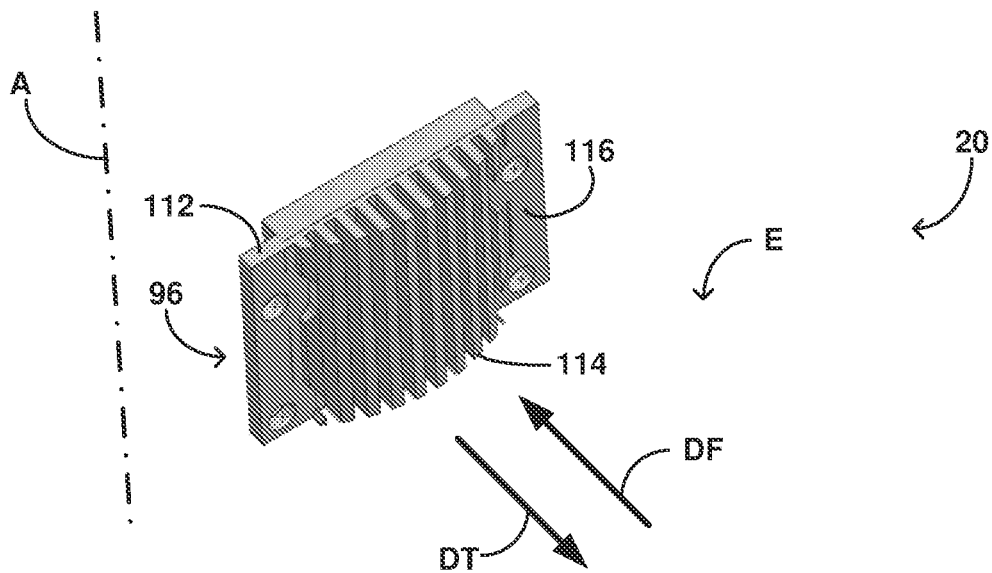
FIG. 5 is a perspective view of a first example heat sink of a sensing device.

FIG. 4A illustrates a perspective exploded view showing portions of system 20 including sensor housing 92, TEG 94, and heat sink 96. FIG. 4B illustrates a cross-sectional view of system 20 illustrating portions of mounting bracket 98 thermally coupled to sensor housing 92 and actuator housing 26. The cross-section of FIG. 4B is taken along cutting plane C of FIG. 4A. In FIG. 5, Mounting bracket 98 mechanically couples sensor housing 92 and actuator housing 26 such that sensor housing 92 and pressure plate 18 are separated by gap G1 and sensor housing 92 and actuator housing 26 are separated by gap G2. Mounting bracket 98 is configured such that heat flows across gap G1 and gap G2 are substantially limited to heat transfer by convection and/or radiation.

TEG 94 defines a hot node 102 ("TEG hot node 102") and a cold node 104 ("TEG cold node 104"). TEG 94 is configured to produce electrical power based on a temperature gradient between TEG hot node 102 and TEG cold node 104. Sensing device 22 is configured to thermally couple mounting bracket 98 and TEG hot node 102, such that heat received via mounting bracket 98 is transferred by sensor housing 92 to TEG hot node 102. Sensing device 22 is configured to thermally couple TEG cold node 104 and heat sink 96, such that a rejection of heat by heat sink 96 causes a temperature gradient between TEG hot node 102 and TEG cold node 104. In examples, TEG 94 includes one or more thermoelectric elements (e.g., one or more solid-state devices) thermally coupled to TEG hot node 102 and TEG cold node 104. The one or more thermoelectric devices may be configured to develop a voltage based on the temperature gradient between TEG hot node 102 and TEG cold node 104. In examples (e.g., when mounting bracket 98 provides heat to sensor housing 92 and heat sink 96 rejects heat to an environment surrounding brake assembly 12 and/or wheel 10), system 20 is configured to cause a first temperature at TEG hot node 102 and a second temperature at TEG cold node 104, with the first temperature greater than the second temperature.

In examples, sensing device 22 (e.g., sensor housing 92) includes a heat conductive element 106 configured to receive a conductive heat flow from mounting bracket 98 and transfer the heat to TEG hot node 102. Heat conductive element 106 may be configured to mechanically couple with mounting bracket 98 (e.g., second bracket portion 99) to define a heat transfer interface 108. Mounting bracket 98 may be configured to transfer heat by conduction to conductive element 106 through heat transfer interface 108 when heat conductive element 106 is mechanically coupled with mounting bracket 98. In examples, heat transfer interface 108 defines an area through which a conductive heat flux passes from mounting bracket 98 to heat conductive element 106 when material bracket 98 receives heat from actuator housing 26 (FIGS. 2 and 3). In examples, heat conductive element 106 includes a fastening portion 110 configured to mechanically couple with mounting bracket 98 (e.g., second bracket portion 99) to define heat transfer interface 108. Fastening portion 110 may be mechanically coupled with mounting bracket 98 using suitable techniques, such as fasteners, adhesives, engineering fits, fusion, friction, welding, soldering or other techniques. In some examples, heat conductive element 106 and second bracket portion 99 define a substantially unified component comprising a continuous mass, such that heat transfer interface 108 defines an area within the continuous mass through which a conductive heat flux passes from material bracket 98 to heat conductive element 106.

In examples, mounting bracket 98 is configured to mechanically couple sensor housing 92 and brake assembly 12 (e.g., actuator housing 26) to enhance the transfer of heat from heat sink 96 to an environment (e.g., an air environment) surrounding brake assembly 12 and/or wheel 10. In examples, mounting bracket 98 is configured to position heat sink 96 relative to the travel direction DT of wheel 10 such that the surrounding environment impinges on heat sink 96 when wheel 10 travels in the travel direction DT (e.g., when wheel 10 rotates around axis of rotation A).

For example, FIG. 5 illustrates heat sink 96 including a base 112 and a plurality of fins 114 ("fins 114"). Mounting bracket 98 may be configured such that, when brake assembly 12 is coupled to wheel 10 and mounting bracket 98 mechanically couples sensor housing 92 and brake assembly 12 (e.g., actuator housing 26), travel of wheel 10 in the travel direction TD causes an fluid (e.g., air) in an environment E surrounding brake assembly 12 and/or wheel 10 to impinge on heat sink 96 substantially in a fluid direction DF. The impingement of the fluid from environment E on heat sink 96 as wheel 10 travels in the travel direction TD (e.g., while an aircraft is landing and/or taxiing) may improve the heat transfer from heat sink 96 to the surrounding environment E. The improved heat transfer from heat sink 96 may assist in substantially establishing and/or maintaining a thermal gradient across TEG 94 as mounting bracket 98 transfers heat to TEG hot node 102 and heat sink 96 transfer heat from TEG cold node 104. Fins 114 may be configured to receive heat from TEG hot node 102 (e.g., via base 112) by conduction and transfer the heat to the fluid comprising environment E by, for example, convection and/or radiation.

In examples, mounting bracket 98 is configured to position heat sink 96 such that the fluid direction DF is substantially opposite the travel direction DT. For example, mounting bracket 98 may be configured to position heat sink 96 such an unobstructed line of sight (e.g., unobstructed by brake assembly 12 and/or wheel 10) is present from heat sink 96 in the travel direction TD when wheel 10 travels in the travel direction TD. In examples, mounting bracket 98 is configured to position heat sink 96 such that a vector parallel to the travel direction TD and extending from heat sink 96 is non-intersecting (e.g., does not intersect with) brake assembly 12 and/or wheel 10. In some examples, one or more of fins 114 extend from a base surface 116 defined by base 112, and mounting bracket 98 is configured to position heat sink 96 such that base surface 116 is substantially perpendicular to the travel direction TD. In some examples, one or more of fins 114 extend from base surface 116 in a direction substantially parallel to the travel direction TD.

Figure 6:
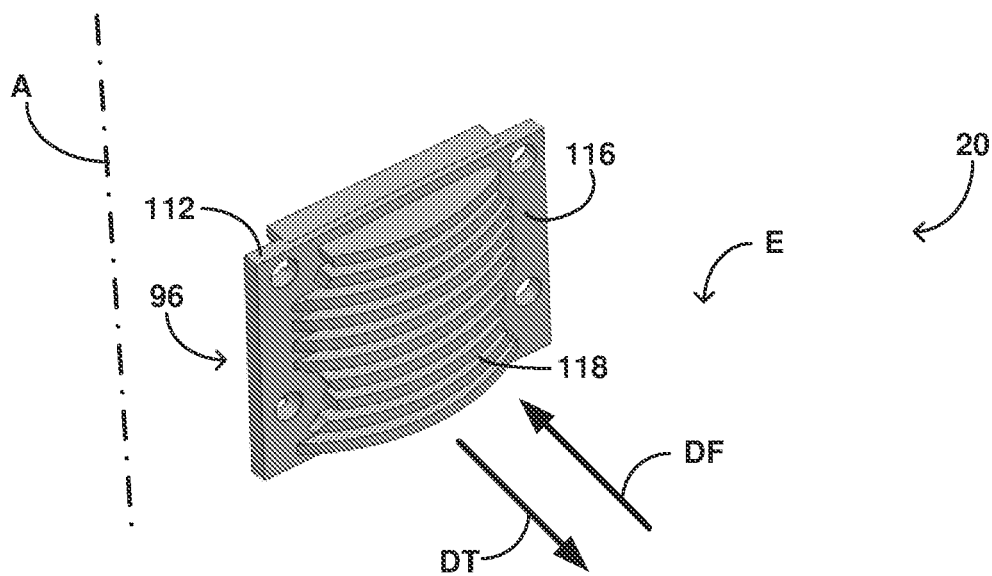
FIG. 6 is a perspective view of a second example heat sink of a sensing device.
Figure 7:
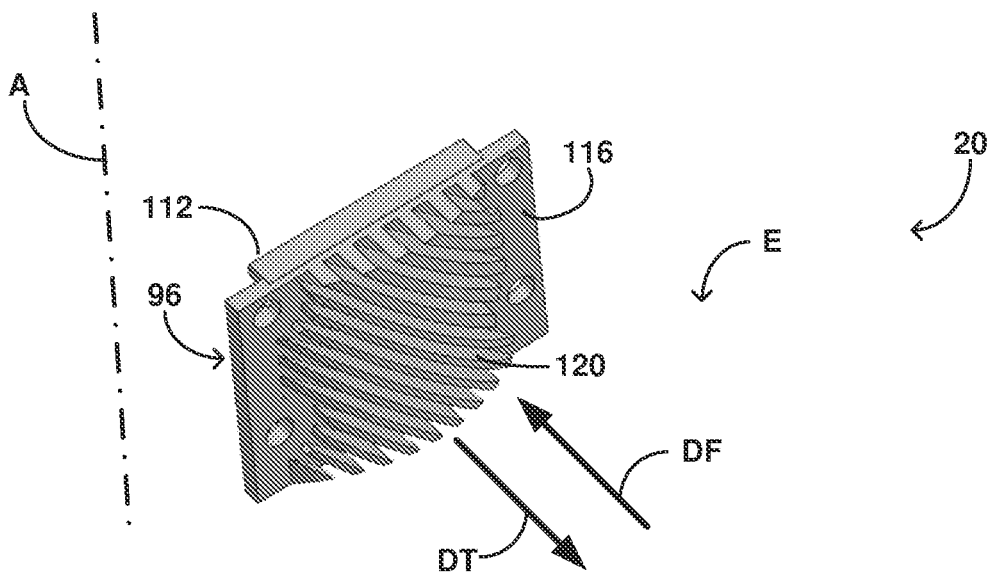
FIG. 7 is a perspective view of a third example heat sink of a sensing device.
Figure 8:
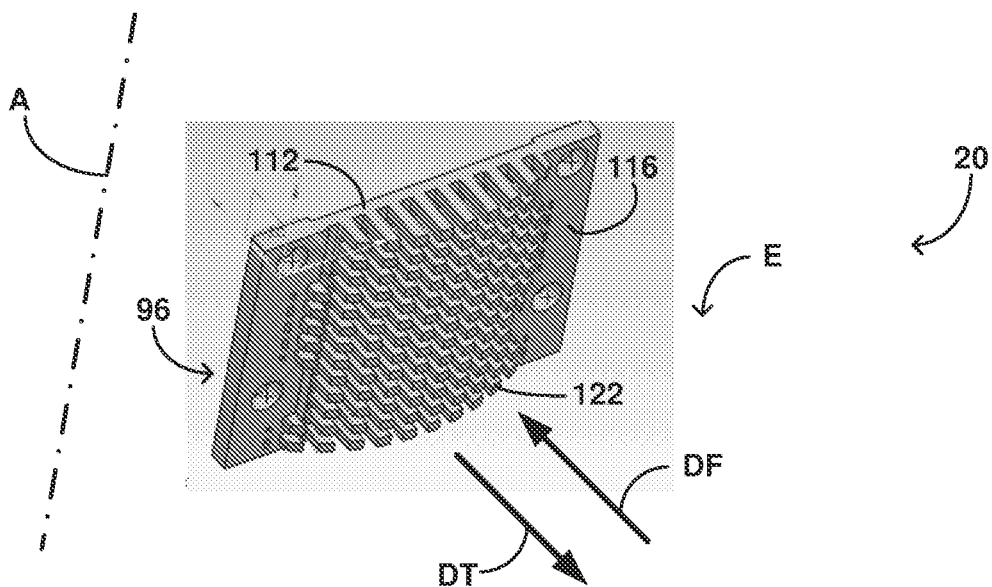
FIG. 8 is a perspective view of a fourth example heat sink of a sensing device.

Mounting bracket 98 may be configured such that fins 114 define a specific orientation relative to the axis of rotation A of wheel 10 when mounting bracket 98 mechanically couples sensor housing 92 and brake assembly 12 (e.g., actuator housing 26). For example, as illustrated in FIG. 5, heat sink 96 may be a straight-fin heat exchanger with one or more of fins 114 defining a major dimension (e.g. a largest dimension, such as a "fin width") which extends in a direction substantially parallel to the axis of rotation A when mounting bracket 98 mechanically couples sensor housing 92 and brake assembly 12. In some examples, such as illustrated in FIG. 6, heat sink 96 may include one or more fins 118 defining a major dimension which extends in a direction substantially perpendicular to the axis of rotation A when mounting bracket 98 mechanically couples sensor housing 92 and brake assembly 12. In some examples, such as illustrated in FIG. 7, heat sink 96 may include one or more fins 120 defining a major dimension which extends in a direction substantially oblique to (e.g., neither parallel nor perpendicular to) the axis of rotation A when mounting bracket 98 mechanically couples sensor housing 92 and brake assembly 12. In some examples, as illustrated in FIG. 8, heat sink 96 may be a pin-fin heat exchanger including a plurality of pins 122 ("pins 122") extending from base 112. In examples, heat sink 96 may be configured such that one or more of pins 122 extend from base 112 in a direction substantially perpendicular to the axis of rotation A when mounting bracket 98 mechanically couples sensor housing 92 and brake assembly 12. Fins 118, fins 120, and/or pins 122 may be examples of fins 114.

Figure 9:
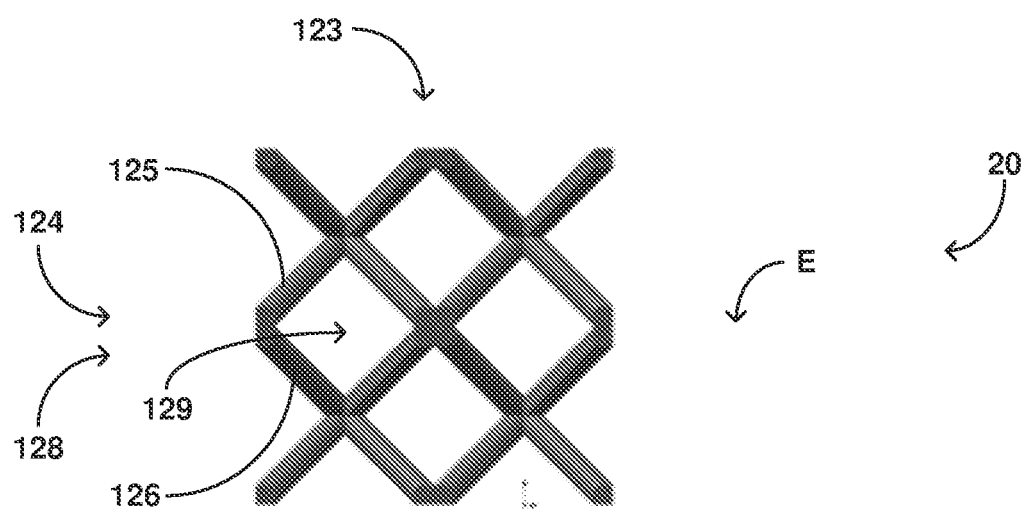
FIG. 9 is a schematic illustration of a diamond lattice structure of a heat sink.

Heat sink 96 (e.g., fins 114, fins 118, fins 120, pins 122, and/or base 112) may define a plurality of substantially solid, unified components, and/or may define a plurality of substantially porous components including one or more passages configured to enhance the heat transfer between the component and the fluid comprising environment E. For example, FIG. 9 illustrates a portion of heat sink 96 comprising a plurality of members 124 ("members 124") defining a mesh 123. Members 124, such as member 125 and member 126, may define a plurality of passages 128 ("passages 128") configured to facilitate and/or enhance contact between the fluid comprising environment E and one or more of members 124. For example, member 125 and member 126 may at least partially define a passage 129 configured to facilitate and/or enhance contact between the fluid comprising environment E and member 125 and/or member 126. Members 124 may be configured to receive heat from TEG hot node 102 (e.g., via base 112 and/or another member of members 124) by conduction and transfer the heat to the fluid comprising environment E by, for example, convection and/or radiation. Heat sink 96 may be configured such that the fluid comprising environment E substantially flows through the one or more passages defined by members 124 when the fluid has a velocity relative to members 124. For example, heat sink 96 may be configured such that the fluid substantially flows through the one or more passages when a travel of wheel 10 in the travel direction DT causes the fluid to have the velocity relative to members 124.

Figure 10:
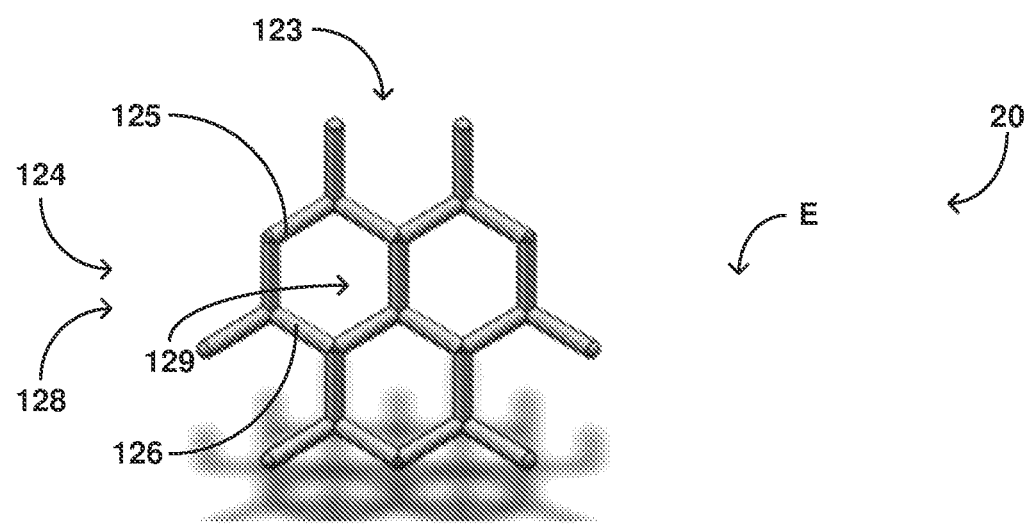
FIG. 10 is a schematic illustration of a hexagonal diamond lattice structure of a heat sink.
Figure 11:
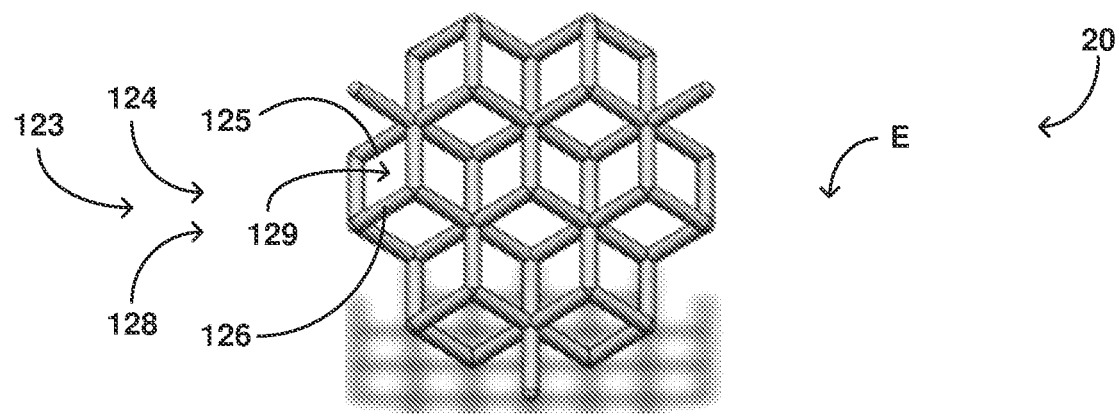
FIG. 11 is a schematic illustration of a body-centered cubic lattice structure of a heat sink.
Figure 12:
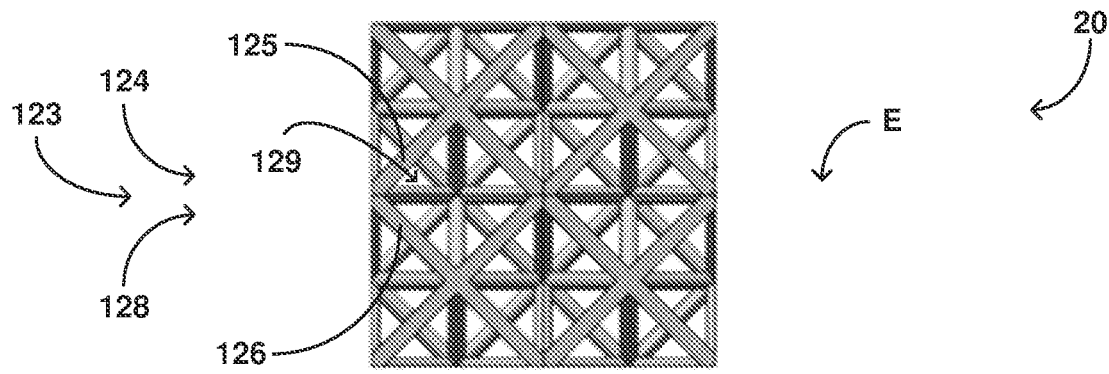
FIG. 12 is a schematic illustration of a face-centered cubic lattice structure of a heat sink.
Figure 13:
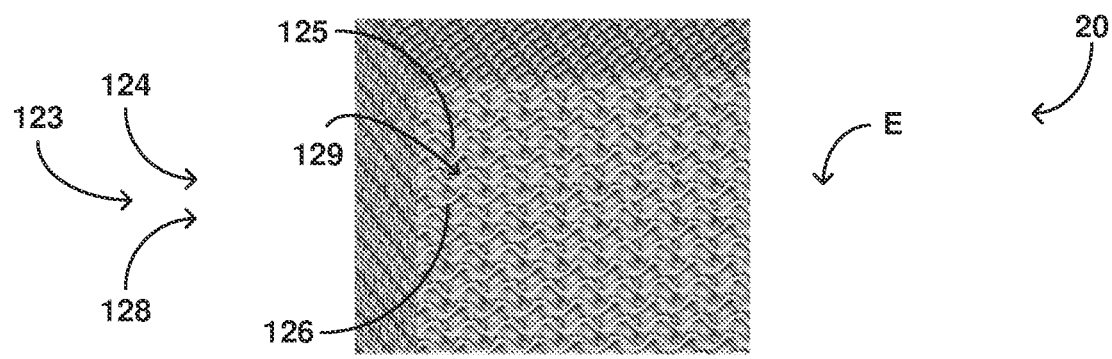
FIG. 13 is a schematic illustration of a gyroid lattice structure of a heat sink.

Members 124 may be interconnected such that mesh 123 defines any type of structure. In examples, for example as illustrated in FIG. 9, members 124 may be interconnected to form mesh 123 defining a substantially diamond lattice structure (e.g., a Dfcc structure). In some examples, as illustrated in FIG. 10, members 124 may be interconnected to form mesh 123 defining a substantially hexagonal diamond lattice structure (e.g., a Dhex structure). In some examples, as illustrated in FIG. 11, members 124 may be interconnected to form mesh 123 defining a substantially body-centered cubic structure (e.g., a BCC structure). In some examples, as illustrated in FIG. 12, members 124 may be interconnected to form mesh 123 defining a substantially face-centered cubic structure (e.g., an FCC structure). In some examples, as illustrated in FIG. 13, one or more of members 124 (e.g., member 125 and/or member 126) may be configured to form mesh 123 defining a gyroid lattice comprising one or more gyroid structures (e.g., one or more structures and/or structure portions defining substantially no straight lines and/or planar symmetries).

Figure 14:
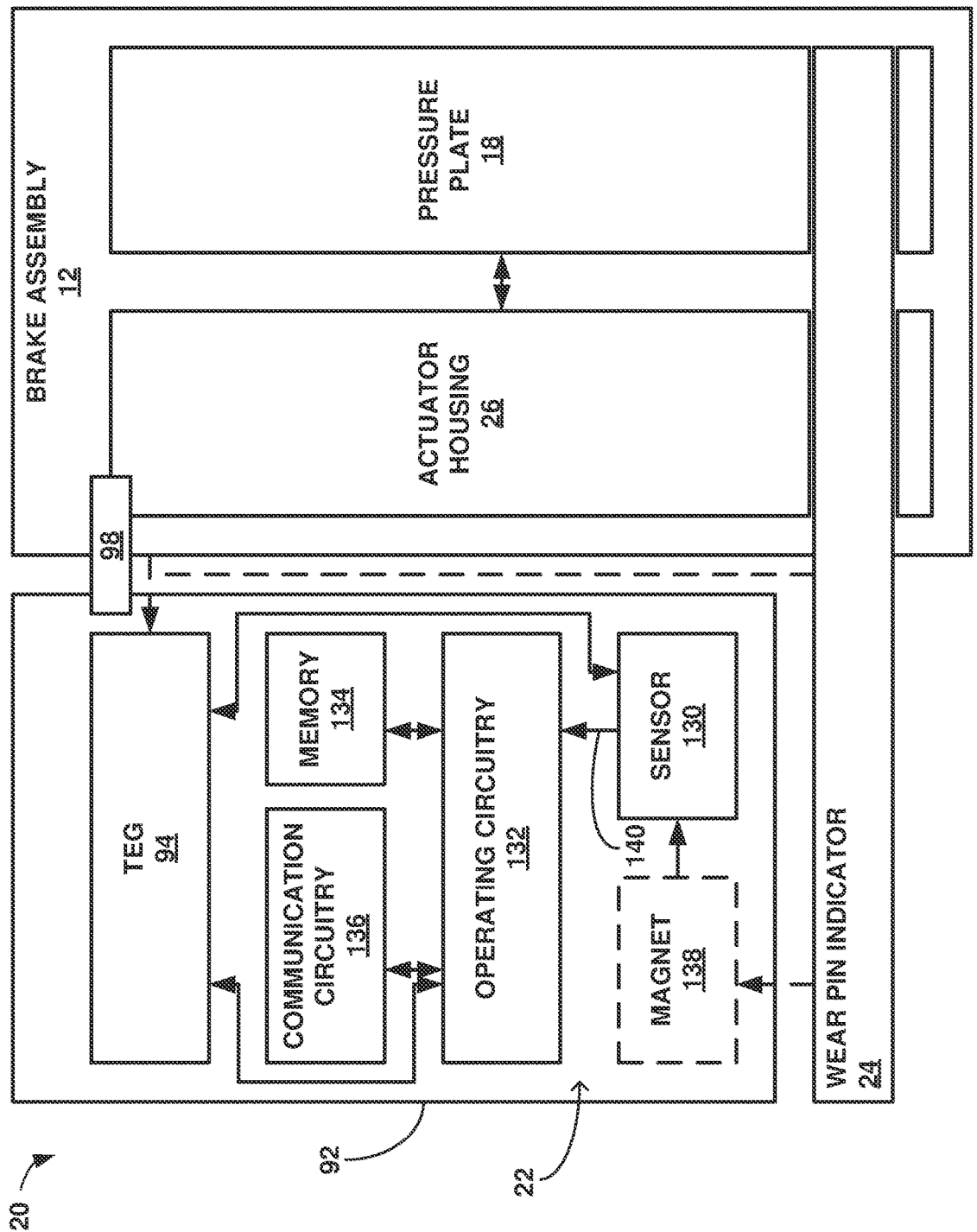
FIG. 14 is a block diagram illustrating a system configured to measure a position or movement of a wear pin indicator using a sensor.

FIG. 14 is a block diagram illustrating system 20 configured to measure the length of a wear pin indicator 24 and harvest energy for the operation of sensing device 22 using TEG 94, in accordance with one or more techniques of this disclosure. As seen in FIG. 14 system 20 includes sensing device 22 configured to generate position data indicative of a travel of wear pin indicator 24. Wear pin indicator 24 may be configured such that a displacement of some portion of brake assembly 12 (e.g., pressure plate 18) relative to actuator housing 26 causes the travel of wear pin indicator 24. Sensing device 22 may include sensor 130, operating circuitry 132, memory 134, wear pin indicator 24, and/or communication circuitry 136. In examples, sensing device 22 includes a magnet 138. In some examples, brake assembly 12 includes wear pin indicator 24. Sensing device 22, or any other device described in this disclosure, can be mechanically coupled to a brake assembly (e.g., brake assembly 12) of a vehicle, such as an aircraft or a helicopter, a space vehicle such as a satellite or spaceship, a land vehicle such as an automobile, a manned vehicle, an unmanned vehicle such as a drone, a remote-control vehicle, or any suitable vehicle without any pilot or crew on board. TEG 94 may be configured to provide an AC power or a DC power. In examples, TEG 94 includes circuitry configured to convert a DC power generated by a solid-state device (e.g., using the temperature gradient between hot node 102 and cold node 104) into an AC power output.

Sensing device 22 is mechanically supported by sensor housing 92. Sensor housing 92 may be mechanically coupled to brake assembly 12 (e.g., actuator housing 26) by mounting bracket 98. Sensing device 22 may be attached to one or more components of brake assembly 12 (e.g., actuator housing 26) such that a movement of magnet 138 indicates a movement of wear pin indicator 24 relative to one or more other components of brake assembly 12. Sensing device 22 may be attached to any component of brake assembly 12 such that sensing device 22 (e.g., sensor 130) generates an output signal 140 indicative of position data corresponding to a position and/or translation of wear pin indicator 24.

Figure 15:
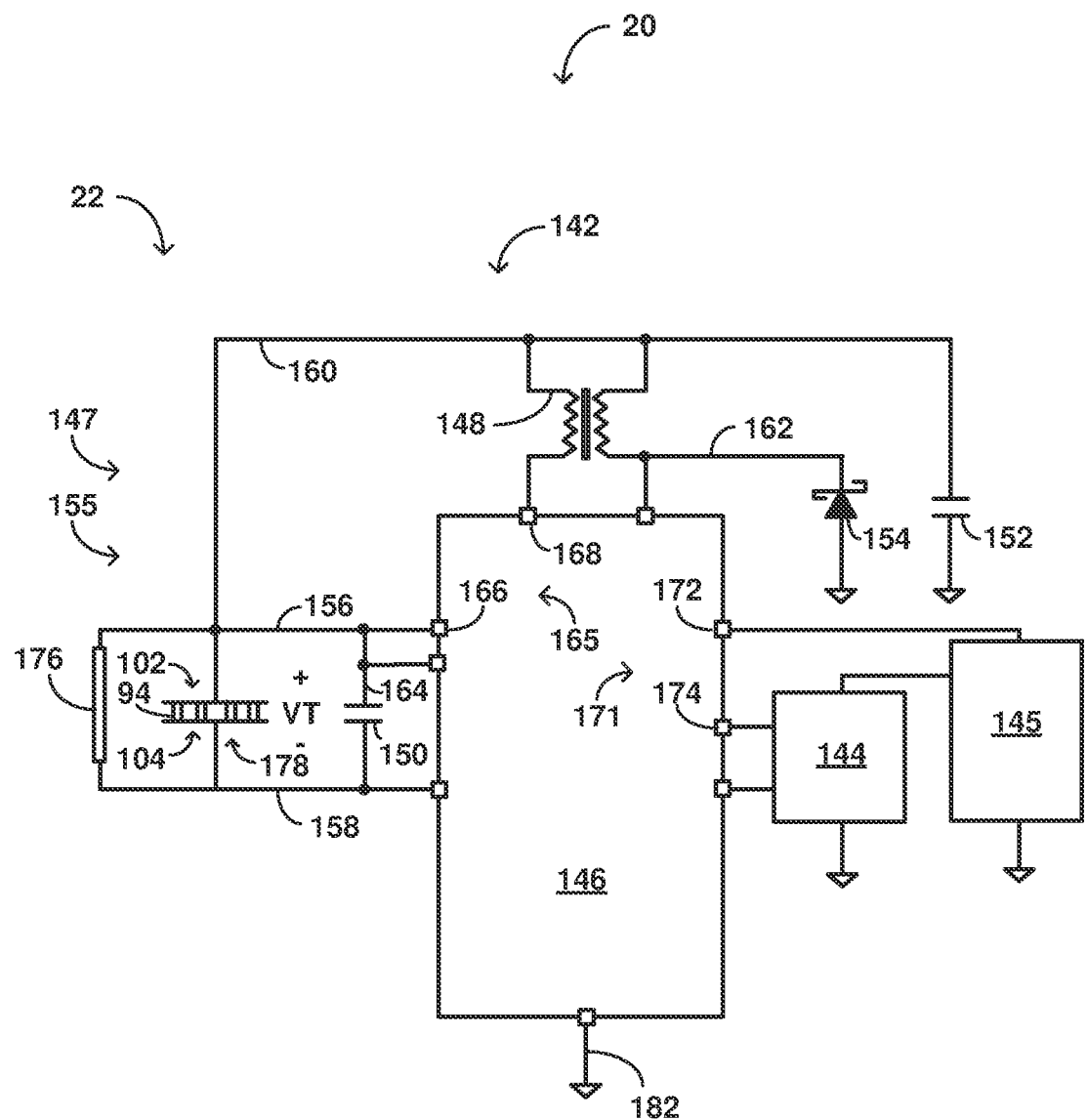
FIG. 15 is a schematic illustration of conditioning circuitry and sensing circuitry of a system configured to measure a position or movement of a wear pin indicator.

FIG. 15 is a schematic diagram illustrating sensing device 22 and TEG 94. Sensing device 22 includes conditioning circuitry 142 and sensing circuitry 144. TEG 94 includes TEG hot node 102 and TEG cold node 104. TEG hot node 102 is in thermal communication with mounting bracket 98 (e.g., via heat conductive element 106 (FIGS. 4, 5). TEG cold node 104 is in thermal communication with heat sink 96 (FIGS. 2-13). TEG 94 is configured to generate electrical power at a TEG voltage VT based on a temperature gradient between hot node 102 and cold node 104. TEG 94 is configured to provide electrical power to conditioning circuitry 142. Conditioning circuitry 142 is configured to provide the electrical power generated by TEG 94 to sensing circuitry 144 and/or an energy storage device 145 (e.g., a battery and/or capacitor). Sensing circuitry 144 is configured to generate position data corresponding to a position and/or movement of wear pin indicator 24 (e.g., using output signal 140 (FIG. 14)) using the electrical power generated by TEG 94. In some examples, sensing circuitry 144 is a processor (e.g., a microprocessor) configured to generate the position data based on output signal 140 of sensor 130 (FIG. 14). In examples, operating circuitry 132 (FIG. 14) includes sensing circuitry 144. Sensing circuitry 144 may be configured to receive the electrical power generated by TEG 94 via conditioning circuitry 142 and/or energy storage device 145. In FIGS. 15-18, black dots represent points of electrical connection between illustrated components.

In examples, conditioning circuitry 142 includes interface circuitry 146 configured to supply electrical power to sensing circuitry 144 and/or energy storage device 145. Interface circuitry 146 may be, for example, a printed circuit board ("PCB"). Conditioning circuitry 142 may include one or more components 147 ("components 147") in electrical communication with TEG 94, such as coupling transformer 148, capacitor 150, capacitor 152, diode 154 (e.g., a Zener diode), and/or other components. Any of components 147 may be in electrical communication with TEG 94 and/or via another of components 147 via one or more conductors 155 ("conductors 155"), such as conductor 156, conductor 158, conductor 160, conductor 162, conductor 164, and/or other conductors. Conditioning circuitry 142 is configured to provide electrical power generated by TEG 94 and provide the electrical power to interface circuitry 146 using components 147 and conductors 155. For example, conditioning circuitry 142 (e.g., components 147 and/or conductors 155) may be configured to provide electrical from TEG 94 to one or more inputs 165 ("inputs 165") of interface circuitry 146, such as input 166, input 168, and/or input 170. Interface circuitry 146 may be configured to distribute electrical power received at inputs 165 to sensing circuitry 144 and/or energy storage device 145 via one or more outputs 171 ("outputs 171"), such as output 172 and/or output 174.

In examples, certain components of sensing device 22 may be configured to use electrical power when the electrical power is provided at a voltage below a cutoff voltage. For example, interface circuitry 146 may be configured to distribute electrical power received via inputs 165 and distribute the electrical power to outputs 171 when the electrical power received is below a cutoff voltage. Interface circuitry 146 may be configured such that, when power received and/or present at inputs 165 has a voltage greater than the cutoff voltage, interface circuitry 146 fails and/or ceases to distribute the power received and/or present to outputs 171, potentially ceasing a supply of electrical power to energy storage device 145 and/or sensing circuitry 144. Sensing device 22 may be configured to limit the voltage of the electrical power provided to the components of sensing device 22 (e.g., interface circuitry 146) such that the electrical power provided has a voltage less than or equal to the cutoff voltage. Limiting the voltage to less than or equal to the cutoff voltage may allow sensing device 22 to operate over larger temperature gradients between hot node 102 and cold node 104, such as, for example, larger temperature gradients which might be present during or shortly after a braking event by brake assembly 12.

For example, TEG 94 may be configured to generate the voltage VT using a solid-state device 178 configured to generate a voltage in response to the temperature gradient between hot node 102 and cold node 104. In some examples, solid-state device 178 may include one or more thermoelectric materials having a thermoelectric sensitivity sufficient to cause solid-state device 178 to generate a voltage greater than the cutoff voltage when the temperature gradient between hot node 102 and cold node 104 exceeds a threshold temperature gradient. Under some conditions, for example during certain portions of or following a braking event, the temperatures developed by brake assembly 12 may cause the temperature gradient between hot node 102 and cold node 104 to exceed the threshold temperature gradient of solid-state device 178. Hence, the voltage developed by solid-state device 178 when the temperature gradient exceed the temperature gradient threshold, if provided to certain components of sensing device 22 (e.g., interface circuitry 146), might limit the continued operation of these components under certain operating conditions of brake assembly 12 (e.g., when the certain operating conditions cause the temperature gradient to exceed the temperature gradient threshold). In examples, sensing device 22 is configured to limit the voltage VT provided by TEG 94 to a voltage below the cutoff voltage, such that sensing device 22 may continue to provide power to sensing circuitry 144 and/or energy storage device 145 when brake assembly 12 causes the temperature gradient between hot node 102 and cold node 104 to exceed the temperature gradient threshold of solid state device 178.

In examples, sensing device 22 includes shunt circuitry 176 configured to limit the voltage VT developed by TEG 94 to a voltage below a cutoff voltage (e.g., below a cutoff voltage of interface circuitry 146). Shunt circuitry 176 may be configured to substantially monitor and/or track the voltage VT developed by TEG 94. Shunt circuitry 176 may be configured to limit the voltage VT to a voltage substantially equal to or less than the cutoff voltage, such that sensing device 22 may continue to operate when brake assembly 12 causes the temperature gradient between hot node 102 and cold node 104 to exceed the threshold temperature gradient of solid-state device 178.

Figure 16:
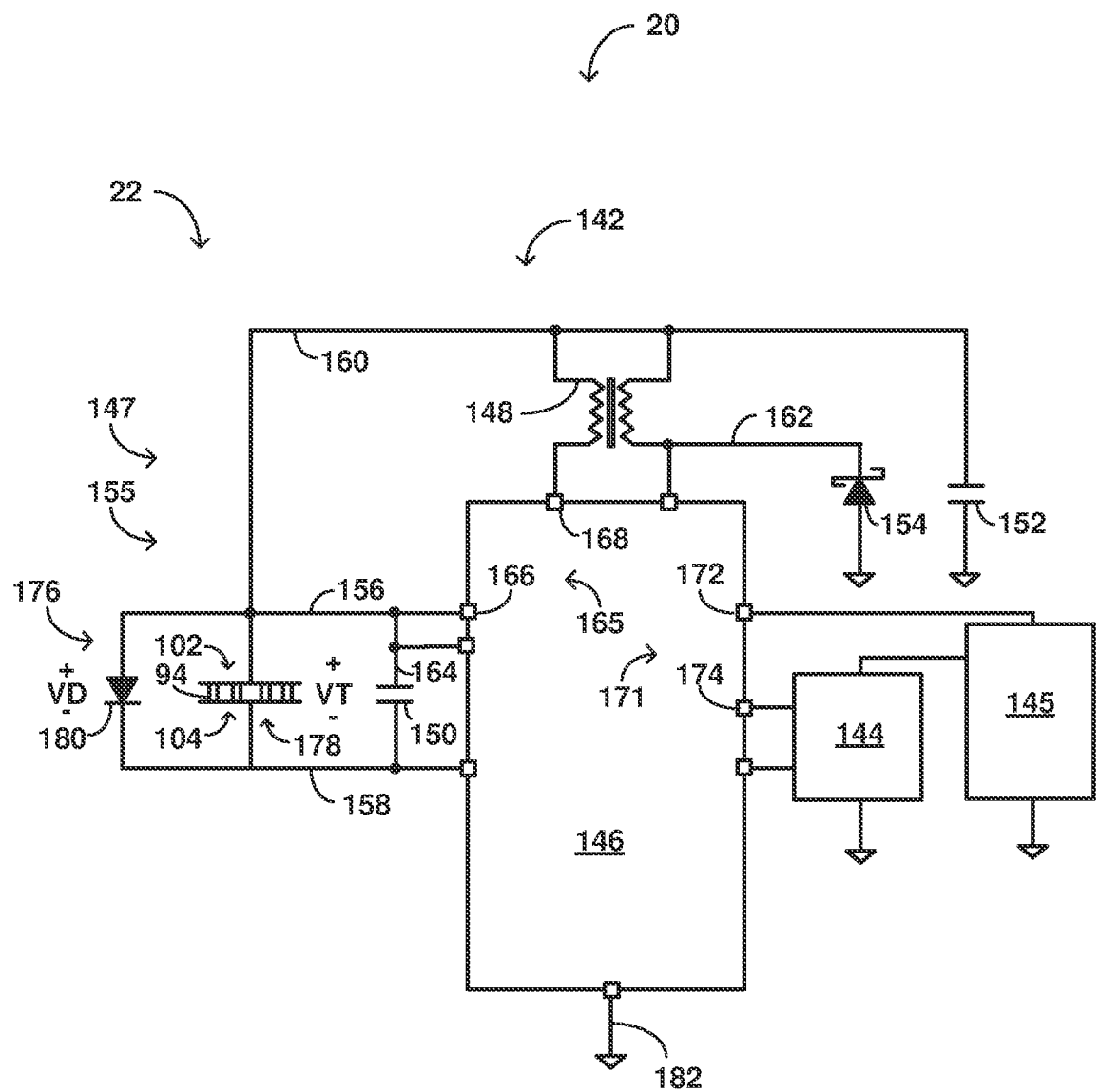
FIG. 16 is a schematic illustration of a first example of shunt circuitry of a system configured to measure a position or movement of a wear pin indicator.

For example, FIG. 16 is a schematic diagram illustrating an example implementation of shunt circuitry 176 including a shunt element 180 (shown as a diode in FIG. 16) configured to limit the voltage VT to less than a cutoff voltage. Shunt element 180 may be semiconductor device configured to allow a current to flow when a voltage VD across the device exceeds forward bias voltage. For example, shunt element 180 may comprise a small signal diode, a Schottkey diode, and/or another diode having small signal diode characteristics. Shunt circuitry 176 may be configured such that the voltage VD is based on (e.g., substantially equal and/or proportional to) the voltage VT developed by TEG 94. Shunt circuitry 176 may be configured such that, when the voltage VT causes voltage VD to be below the forward bias of shunt element 180 (e.g., when the temperature gradient between hot node 102 and cold node 104 is less than the threshold temperature gradient), shunt element 180 remains reversed biased such that, for example, the voltage VT provided to conditioning circuitry 142 (and, e.g., substantially to interface circuitry 146) is based on the thermoelectric sensitivity of solid-state device 178. Shunt circuitry 176 may be configured such that, when the voltage VT causes voltage VD to be equal to or greater than the forward bias of shunt element 180 (e.g., when the temperature gradient between hot node 102 and cold node 104 is equals or exceeds the threshold temperature gradient), the forward biasing of shunt element 180 causes shunt element 180 to shunt at least some portion of the electrical power developed by TEG 94 to a common (e.g., a ground) such as common 182. Shunt element 180 may substantially establish the voltage VD when forward biased, such that the voltage VT is substantially limited to a voltage causing the forward biasing of shunt element 180. In examples, shunt element 180 is substantially electrically parallel to TEG 94, such that the voltage VD is substantially equal to the voltage VT.

Figure 17:
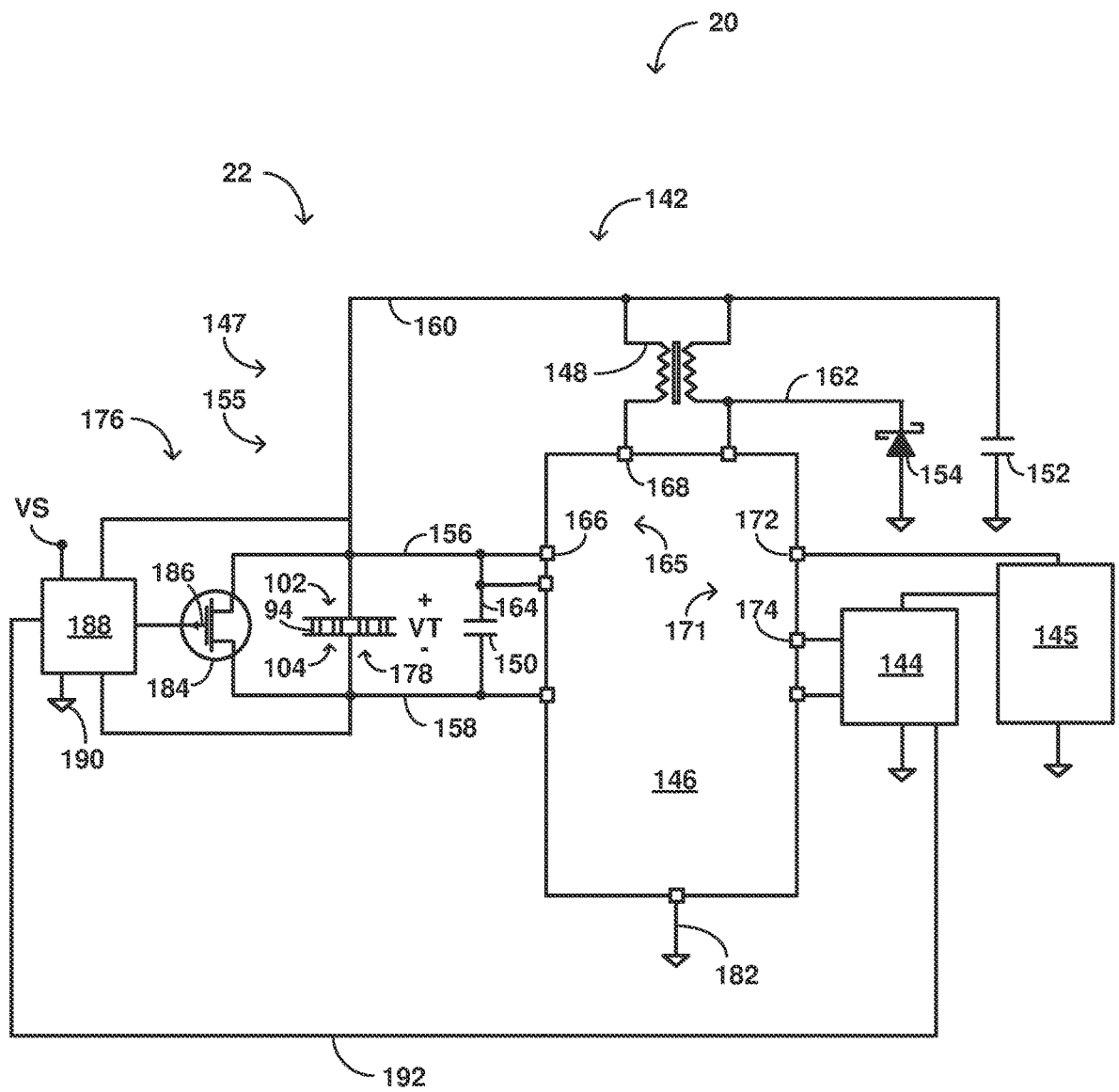
FIG. 17 is a schematic illustration of a second example of shunt circuitry of a system configured to measure a position or movement of a wear pin indicator.

FIG. 17 is a schematic diagram illustrating an example implementation of shunt circuitry 176 including a shunt element 184 configured to limit the voltage VT based on a gate voltage provided to a gate 186 of shunt element 184. Shunt element 184 may be configured to exhibit a conductivity for an electrical current based on the gate voltage. In examples, shunt element 184 includes a semi-conductor device, such as at least one of a MOSFET, JFET, or other field-effect transistor. In examples, shunt circuitry 176 includes a regulation circuitry 188 configured to provide the gate voltage to gate 186. In examples, regulation circuitry 188 provides the gate voltage using voltage source VS. Voltage source VS may be provided by sensing device 22, another portion of system 20, or from another source. Shunt circuitry 176 may include shunt element 184 instead of or in addition to shunt element 180 (FIG. 16).

Regulation circuitry 188 may be configured to monitor and/or track the voltage VT produced by TEG 94 and provide the gate voltage to gate 186 based on the voltage VT. For example, regulation circuitry 188 may be configured to provide a gate voltage to gate 186 when the voltage VT substantially equals or exceeds a cutoff voltage defined by components of conditioning circuitry 142 (e.g., interface circuitry 146). Regulation circuitry 188 may be configured to substantially control the conductivity of shunt element 184 using the gate voltage. In examples, shunt circuitry 176 is configured such that, when the voltage VT is below the cutoff voltage (e.g., when the temperature gradient between hot node 102 and cold node 104 is less than the threshold temperature gradient), regulation circuitry 188 controls the conductivity of shunt element 184 such that, for example, the voltage VT provided to conditioning circuitry 142 (and, e.g., substantially to interface circuitry 146) is based on the thermoelectric sensitivity of solid-state device 178. Shunt circuitry 176 may be configured such that, when the voltage VT is greater than or equal to the cutoff voltage (e.g., when the temperature gradient between hot node 102 and cold node 104 is equals or exceeds the threshold temperature gradient), regulation circuitry 188 controls the conductivity of shunt element 184 such that shunt element 184 shunts at least some portion of the electrical power developed by TEG 94 to a common (e.g., common 190 and/or common 182).

Shunt element 184 may substantially control the voltage VT based on the conductivity of shunt element 184, as established by the gate voltage provided to gate 186 by regulation circuitry 188. Hence, regulation circuitry 188 may be configured to control the voltage VT using the gate voltage. In examples, regulation circuitry 188 is configured to communicate with sensing circuitry 144 and/or operating circuitry 132 (e.g., via a communication link 192). Sensing circuitry 144 and/or operating circuitry 132 may be configured to communicate with regulation circuitry 188 to cause regulation circuitry 188 to provide the gate voltage to gate 186.

Figure 18:
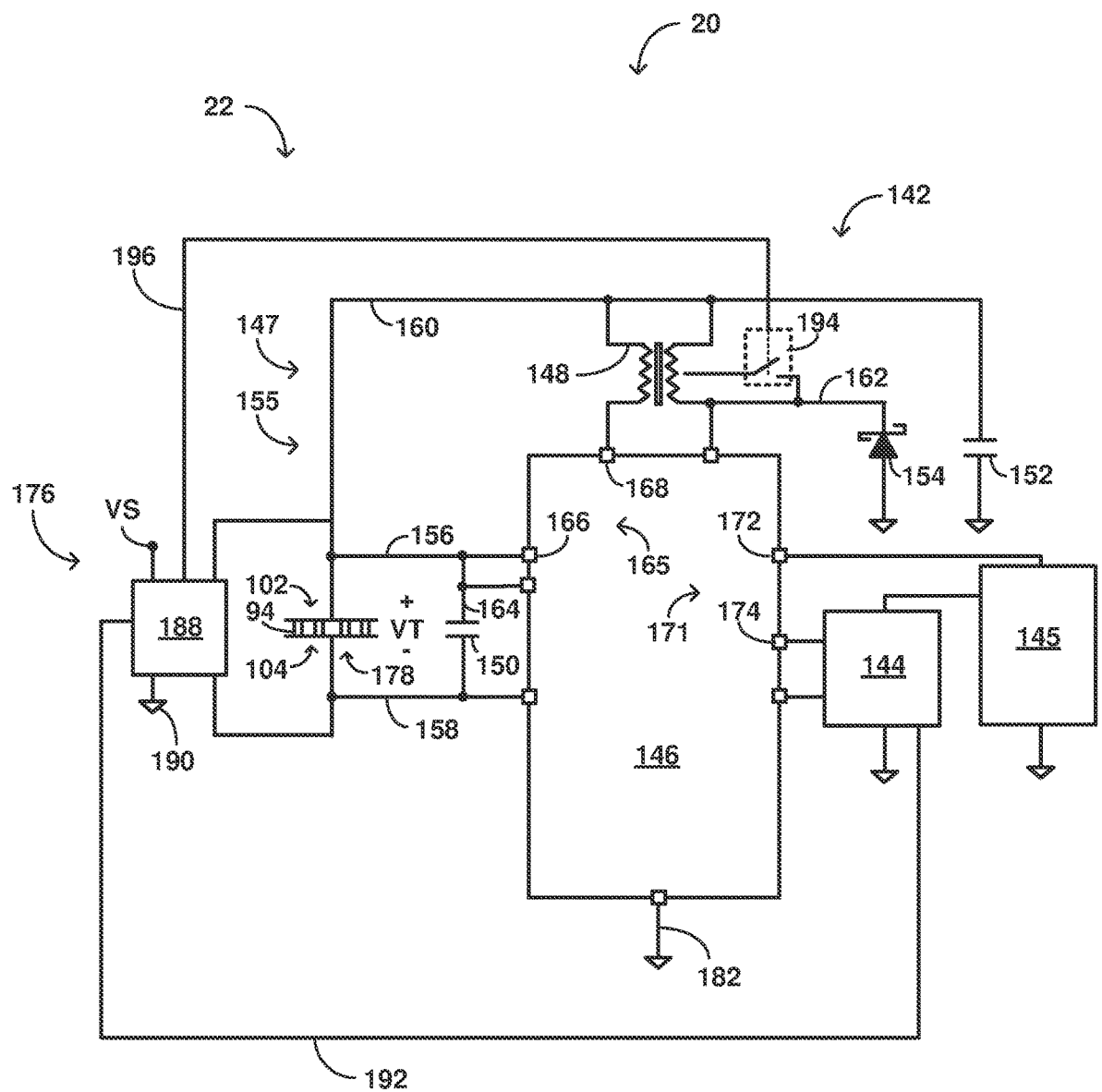
FIG. 18 is a schematic illustration of a third example of shunt circuitry of a system configured to measure a position or movement of a wear pin indicator.

FIG. 18 is a schematic diagram illustrating an example implementation of shunt circuitry 176 configured as a feed-forward network configured to cause sensing circuitry 144 to substantially establish a voltage below the cutoff voltage. In examples, shunt circuitry 176 includes a switching device 194 configured to configured to control a control ratio (e.g., a step-down ratio) of a coupling device such as coupling transformer 148. For example, switching device 194 may be configured to cause the coupling device (e.g., coupling transformer 148) to have a first control ratio (e.g., a first step-down ratio) when switching device 194 is in a first position and cause the coupling device to have a second control ratio (e.g., a second step-down ratio) when switching device 194 is in a second position. Shunt circuitry 176 may include switching device 194 instead of or in addition to shunt element 180 (FIG. 16) and/or shunt element 184 (FIG. 17).

Regulator 188 may be configured to control the position of switching device 194 (e.g., using communication link 196) based on the voltage VT of TEG 94. In examples, regulator 188 is configured to control the position of switching device 194 to substantially maintain the voltage VT at a voltage less than or equal to the cutoff voltage of one or more components of conditioning circuitry 142 (e.g., interface circuitry 146). For example, regulation circuitry 188 may be configured such that, when the voltage VT is below the cutoff voltage (e.g., when the temperature gradient between hot node 102 and cold node 104 is less than the threshold temperature gradient), regulation circuitry 188 controls switching device 194 such a coupling device (e.g., coupling transformer 148) adjusts (e.g., steps-down) a voltage provided to one or more components of conditioning circuitry 142 (e.g., interface circuitry 146) using a first control ratio (e.g., a first step-down ratio) such as 20:1. Regulation circuitry 188 may be configured such that, when the temperature gradient between hot node 102 and cold node 104 is equals or exceeds the threshold temperature gradient, regulation circuitry 188 controls switching device 194 such the coupling device adjusts (e.g., steps-down) the voltage provided to the one or more components of conditioning circuitry 142 using a control ratio (e.g., a second step down ratio) such as 50:1.

In examples, the coupling device is a tapped transformer including a tap changer and switching device 194 is configured to adjust the control ratio of the coupling device using the tap changer. Regulator 188 may be configured to cause switching device 194 (e.g., using communication link 196) to adjust the control ratio using the tap changer. In some examples, switching device 194 and/or the coupling device (e.g., coupling transformer 148) may be configured such that the coupling device may provide (e.g., using the tap changer) other control ratios in addition to the first control ratio and/or the second ratio. Regulation circuitry 188 may be configured to cause switching device 194 to substantially establish a specific control ratio (e.g., the first control ratio, the second control ratio, or another control ratio) to substantially maintain the voltage VT below the cutoff voltage of one or more components of conditioning circuitry 142 (e.g., interface circuitry 146). In examples, regulation circuitry 188 is configured to cause switching device 194 to substantially establish the specific control ratio based on a communication (e.g., via communication link 192) received from sensing circuitry 144 and/or operating circuitry 132 (FIG. 14). Sensing circuitry 144 and/or operating circuitry 132 may be configured to provide the communication based on the temperature gradient between hot node 102 and cold node 104.

Figure 19:
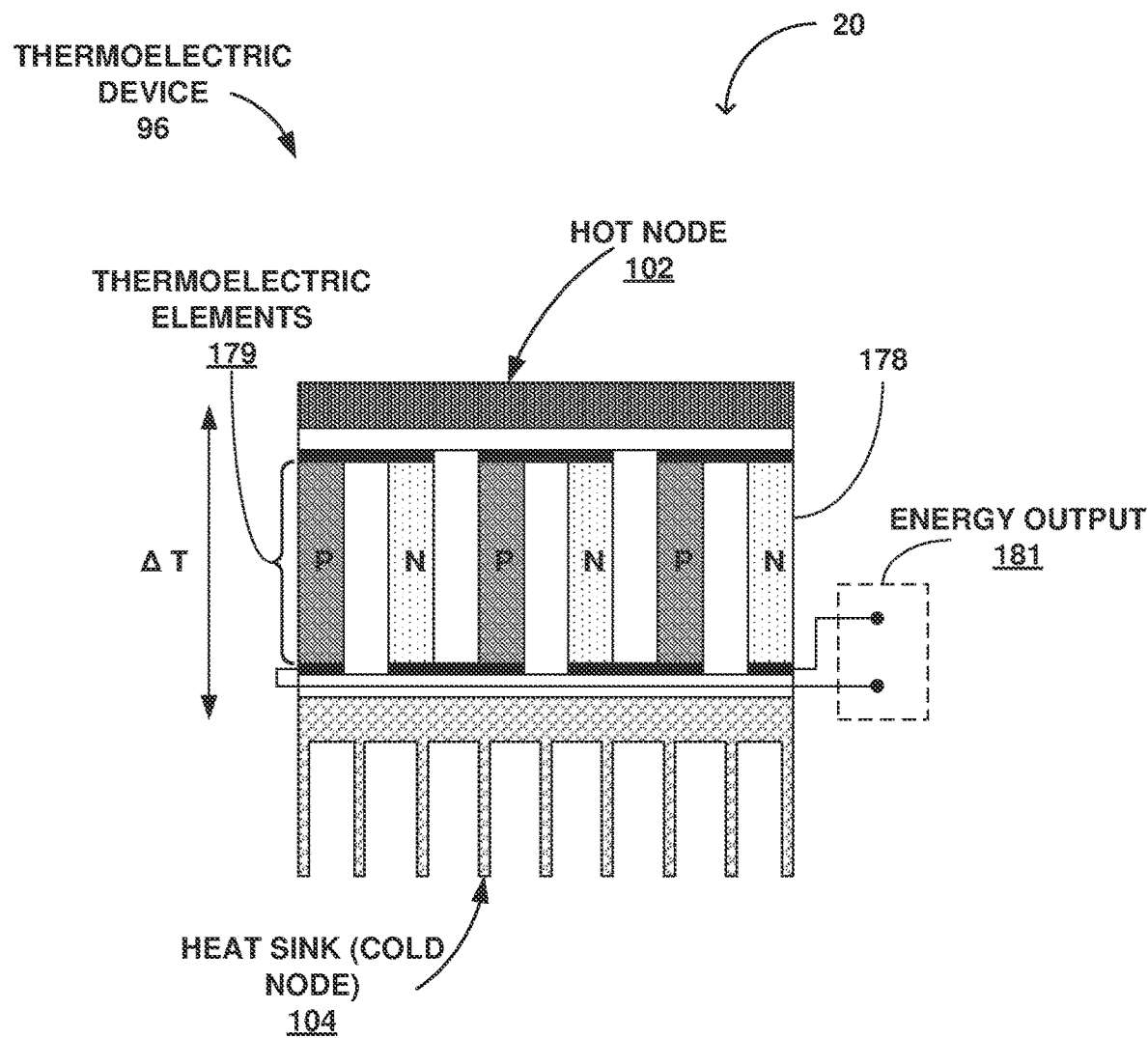
FIG. 19 is a schematic illustration of an example thermoelectric generator.

FIG. 19 is a conceptual diagram illustrating an example TEG 94 including an example solid-state device 178. Solid-state device 178 includes a set of thermoelectric elements 179 including positive (P) thermoelectric elements and negative (N) thermoelectric elements. Thermoelectric elements 179 generate an electrical signal for delivery to an energy output 181 (e.g., conditioning circuitry 142). Heat may flow from TEG hot node 102 to TEG cold node 104 through the thermoelectric elements 179. The voltage of the electrical signal delivered to energy output 181 may depend on a temperature gradient ΔT between the TEG hot node 102 and TEG cold node 104. For example, an increase in the magnitude of the temperature gradient ΔT may cause the voltage of the electrical signal to increase, and a decrease in the magnitude of the temperature gradient ΔT may cause the voltage of the electrical signal to decrease. Shunt circuitry 176 may be configured to limit the voltage VT provided to conditioning circuitry 142 by TEG 94 when solid-state device 178 (e.g., thermoelectric elements 179) generate the electrical signal in response to the temperature gradient ΔT. Shunt circuitry 176 may be configured to limit the voltage VT to a voltage below a cutoff voltage (e.g., below a cutoff voltage of interface circuitry 146) when solid-state device 178 (e.g., thermoelectric elements 179) experience a temperature gradient ΔT greater than or equal to the temperature gradient threshold.

With reference to FIG. 14 and FIGS. 15-18, operating circuitry 132 and/or sensing circuitry 144, in some examples, may include one or more processors that are configured to implement functionality and/or process instructions for execution within system 20. For example, operating circuitry 132 and/or sensing circuitry 144 may be capable of processing instructions stored in memory 134. Operating circuitry 132 and/or sensing circuitry 144 may include, for example, microprocessors, digital signal processors (DSPs), application specific integrated circuits (ASICs), field-programmable gate arrays (FPGAs), or equivalent discrete or integrated logic circuitry, or a combination of any of the foregoing devices or circuitry. Accordingly, operating circuitry 132 and/or sensing circuitry 144 may include any suitable structure, whether in hardware, software, firmware, or any combination thereof, to perform the functions ascribed herein to operating circuitry 132 and/or sensing circuitry 144.

Operating circuitry 132 and/or sensing circuitry 144 may be configured to determine an estimated remaining use of brake assembly 12 based on output signal 140 provided by sensor 130. Output signal 140 may be indicative of wear pin data related to a position and/or translation of wear pin indicator 24. The wear pin data may be indicative of, for example, a length of wear pin indicator 24, a position of wear pin indicator 24 relative to sensor housing 92, actuator housing 26, and/or another component of brake assembly 12 configured to remain substantially stationary relative to actuator body 84 when actuator 14 causes a translation of pressure plate 18 and/or disc stack 16, and/or a translation of wear pin indicator 24 relative to sensor housing 92, actuator housing 26, and/or another component of brake assembly 12 configured to remain substantially stationary relative to actuator body 84 when actuator 14 causes a translation of pressure plate 18 and/or disc stack 16. In examples, operating circuitry 132 and/or sensing circuitry 144 use the wear pin data (e.g., a change in position of wear pin indicator 24) per braking event to determine a remaining use of disc stack 16. Operating circuitry 132 and/or sensing circuitry 144 may use specifications for the brake assembly to determine the estimate of wear per braking event (e.g., rate of wear). Alternatively, or additionally, operating circuitry 132 and/or sensing circuitry 144 can the wear pin data (e.g., measurements of the length of wear pin indicator 24), along with the number of braking events between measurements, to determine the estimate of wear per braking event.

In examples, operating circuitry 132 and/or sensing circuitry 144 are configured to determine the wear pin data using a position and/or movement of magnet 138. Operating circuitry 132 and/or sensing circuitry 144 may be configured to determine the movement and/or position (e.g., a cartesian position and/or a rotational position) of magnet 138 based on output signal 140. Operating circuitry 132 and/or sensing circuitry 144 may receive output signal 140 and determine the position and/or movement of magnet 138 relative to sensing device 22 based on output signal 140. The position and/or movement of magnet 138 relative to sensing device 22 may be, for example, a position and/or movement of magnet 138 relative to sensor housing 92, actuator housing 26, and/or another portion of sensing device 22 configured to remain substantially stationary when actuator 14 causes a translation of disc stack 16. Using output signal 140, operating circuitry 132 and/or sensing circuitry 144 may be configured to determine a remaining length of wear pin indicator 24 by, for example, comparing the current distance measurement to an initial or previous distance or length. Operating circuitry 132 and/or sensing circuitry 144 may be configured to determine the position and/or movement of magnet 138 and then determine the length of wear pin indicator 24 based on the position and/or movement of magnet 138 relative to sensing device 22 and the position and/or movement of magnet 138 relative to wear pin indicator 24. Operating circuitry 132 and/or sensing circuitry 144 may also be configured to transmit the determined current length of wear pin indicator 24, along with a timestamp indicative of the time at which the length was measured, to be stored within memory 134 of system 20.

Operating circuitry 132 and/or sensing circuitry 144 may further be configured to retrieve from memory 134 a previous set of wear pin data and/or time data and use the previous set of wear pin data and/or time data in conjunction with a current measurement (e.g., current wear pin data and/or time data) in order to determine a rate of change of the length of wear pin indicator 24 during the time between which the different measurements were conducted. Operating circuitry 132 and/or sensing circuitry 144 may then transmit the rate of change data to be stored in memory 134 along with the current wear pin data and time data. Operating circuitry 132 and/or sensing circuitry 144 may determine if a one or more parameters of wear pin indicator 24 (e.g., a length) is less than a threshold (e.g., a threshold length) length and generate an alert if a parameter of wear pin indicator 24 is less than the threshold. Such an alert may be an audio alert, such as a recorded verbal message or a tone, or alternatively or additionally, a visual alert, such as a displayed phrase, message, symbol, or color.

In some examples, operating circuitry 132 and/or sensing circuitry 144 may perform data analysis on the wear pin data. For example, operating circuitry 132 and/or sensing circuitry 144 may use wear pin data indicating the number of braking events, the weather conditions during each braking event, the vehicle operator during each braking event, the type of surface for each braking event (asphalt, concrete, etc.), and/or any other data stored to memory 134. Operating circuitry 132 and/or sensing circuitry 144 may determine metrics such as the rate of wear and the estimated remaining use of wear pin indicator 24. Operating circuitry 132 and/or sensing circuitry 144 may also determine when and whether to generate alerts regarding the status of wear pin indicator 24 and/or brake assembly 12. Alternatively, or additionally, operating circuitry 132 and/or sensing circuitry 144 may output the data to an external computing system, such as an external computing system in the avionics bay of an aircraft, to perform the data analysis on data relating to wear pin indicator 24 and/or brake assembly 12.

In some examples, memory 134 includes computer-readable instructions that, when executed by operating circuitry 132 and/or sensing circuitry 144, cause operating circuitry 132 and/or sensing circuitry 144 to perform various functions attributed to system 20 herein. Memory 134 may include any volatile, non-volatile, magnetic, optical, or electrical media, such as a random access memory (RAM), read-only memory (ROM), non-volatile RAM (NVRAM), electrically-erasable programmable ROM (EEPROM), flash memory, or any other digital media. Memory 134 may include a non-transitory computer-readable medium capable of storing information indicative wear pin data, along with a timestamp indicating the time at which the wear pin data was obtained (e.g., from sensor 130). Memory 134 may be further configured to store multiple sets of wear pin data and time data, as well as rates of change of a parameter (e.g., a length) of wear pin indicator 24 between subsequent measurements. Memory 134 may also store thresholds (e.g., threshold lengths and/or threshold distances) that operating circuitry 132 and/or sensing circuitry 144 may use to determine if wear pin indicator 24 and/or a component of brake assembly 12 (e.g., disc stack 16) is approaching an end of useful life. In some examples, the memory 134 data relating to braking events, such as a measurement conducted when the brakes are applied, and weather or climate conditions.

Operating circuitry 132 and/or sensing circuitry 144 may be configured to determine the estimated remaining use of the brake assembly 12 directly based on output signal 140, for example, based on a mapping of signal characteristics to remaining-use estimates stored to memory 134. The mapping may take the form a data structure such as an array or a lookup table that associates estimated remaining uses with signal characteristics, such as strength, amplitude, power, direction, etc. Operating circuitry 132 and/or sensing circuitry 144 may use the mapping stored to memory 134 to directly determine an estimated remaining use of brake assembly 12, and/or operating circuitry 132 and/or sensing circuitry 144 may first determine the position and/or movement of magnet 138 (e.g., absolute position or position relative to sensing device 22). Operating circuitry 132 and/or sensing circuitry 144 may be configured to update the mapping stored to memory 134 by storing each instance of output signal 140 (e.g., each sampling of output signal 140) and the new estimated remaining use of the brake assembly to the memory device.

Communication circuitry 136 may include any suitable hardware, firmware, software or any combination thereof for communicating with another device. Under the control of operating circuitry 132, communication circuitry 136 may receive downlink telemetry from, as well as send uplink telemetry to, another device. In some examples, communication circuitry 136 exchanges information with the aid of an internal or external antenna. Communication circuitry 136 may include any combination of a Bluetooth® radio, LoRa radio, Wi-Fi radio, LTE radio, an electronic oscillator, frequency modulation circuitry, frequency demodulation circuitry, amplifier circuitry, and power switches such as a metal-oxide-semiconductor field-effect transistors (MOSFET), a bipolar junction transistor (BJT), an insulated-gate bipolar transistor (IGBT), a junction field effect transistor (JFET), or another element that uses voltage for its control.

In some examples, magnet 138 is may be coupled to or attached to an exposed end of wear pin indicator 24. The position and/or movement of magnet 138 may be indicative of a parameter (e.g., a remaining wear length) of wear pin indicator 24. Magnet 138 may be attached to wear pin indicator 24 by mounting, screwing, welding, gluing, taping, soldering, and/or any other attaching technique. In some examples, magnet 138 may comprise a rotational magnet configured to engage with wear pin indicator 24 such that magnet 138 rotates as wear pin indicator 24 moves laterally. In some examples, magnet 138 may be configured to move laterally in response to lateral movement of wear pin indicator 24. Magnet 138 may include magnetic material such as iron, cobalt, nickel, aluminum, alnico, and/or any other magnetic materials.

System 20 may be configured to perform a measurement of the estimated remaining use of the brake assembly automatically (e.g., without a human operator). For example, a measurement of the estimated remaining use of the brake assembly may occur when the brakes are applied. Operating circuitry 132 and/or sensing circuitry 144 may be configured to determine when the brakes are applied and to sample, without human intervention, output signal 140 when the brakes are applied. In some examples, the techniques of this disclosure may be especially useful for after-market devices that can be installed on existing brake assemblies. An after-market device may be installed on an actuator housing 26 such that system 20 does not contact wear pin indicator 24. In some examples, the techniques of this disclosure may be especially useful for new brake assemblies and/or other new products.

Figure 20:
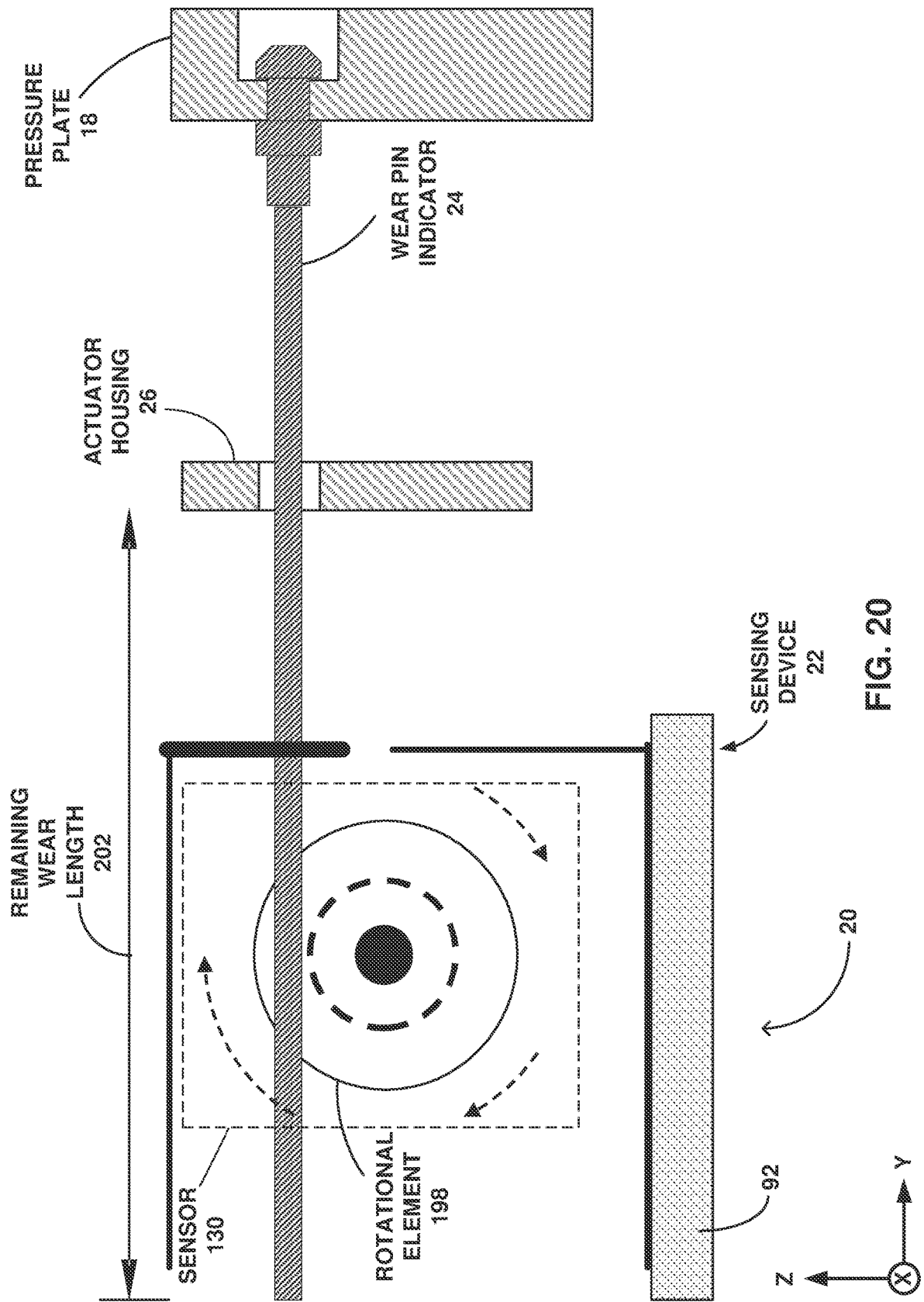
FIG. 20 is a schematic cross-sectional illustration of an example sensing device including a rotational sensor, with a cutting plane taken perpendicular to the x axis of the x-y-z axes shown.

FIG. 20 is a conceptual diagram illustrating a y-axis view of an example sensing device 22 including a rotational sensor, in accordance with one or more techniques of this disclosure. As seen in FIG. 20, sensing device 22 includes an example sensor 130 including a rotational element 198. Wear pin indicator 24 may pass through an opening in actuator housing 26 such that a portion of wear pin indicator 24 extends beyond actuator housing 26. The portion of wear pin indicator 24 that extends beyond actuator housing 26 may be referred to as the remaining wear length 202. Wear pin indicator 24 may be fixed to pressure plate 18.

In examples, actuator housing 26 and pressure plate 18 may displace (e.g., grow farther apart) as brake assembly 12 (e.g., disc stack 16) wears. When a distance between the actuator housing 26 and the pressure plate 18 increases, the remaining wear length 202 decreases. In some examples, sensing device 22 may be configured to measure an amount of brake wear by determining the remaining wear length 202 and/or determining an amount that the remaining wear length 202 has changed. For example, wear pin indicator 24 may engage with rotational element 198 such that a lateral movement of wear pin indicator 24 (e.g., a movement in the y direction) causes rotational element 198 to rotate. In some examples, rotational element 198 may include a gear comprising a first set of teeth, and wear pin indicator 24 may include a second set of teeth configured to engage with the first set of teeth. This may cause the rotational element 198 to rotate when wear pin indicator 24 moves laterally.

Sensor 130 may be configured to generate one or more signals indicative of one or more rotational parameters of rotational element 198. In some examples, rotational element 198 includes magnet 138 configured to rotate with rotational element 198. Sensor 130 may include a hall sensor or another kind of sensor configured to sense the position of magnet 138. Sensor 130 may be configured to generate one or more signals indicative of the rotational position of magnet 138 as a function of time, the rotational velocity of magnet 138 as a function of time, the rotational acceleration of magnet 138 as a function of time, or any combination thereof. Based on the one or more signals generated by sensor 130, operating circuitry 132 and/or sensing circuitry 144 may be configured to determine remaining wear length 202 and/or an estimated amount of wear to brake assembly 12.

Figure 21:
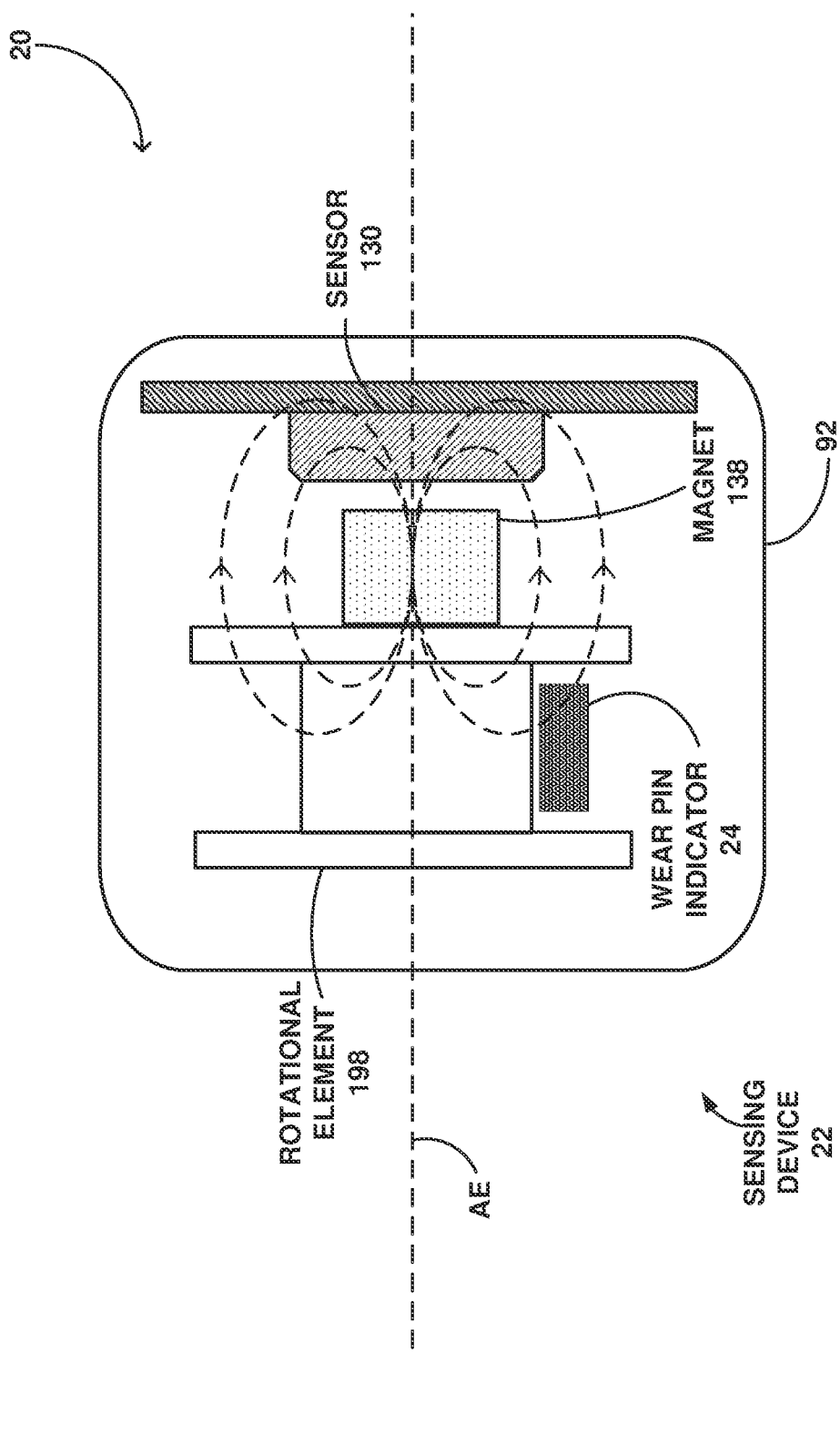
FIG. 21 is a schematic cross-sectional illustration of an example sensing device including a rotational sensor, with a cutting plane taken perpendicular to the y axis of the x-y-z axes shown.

FIG. 21 is a conceptual diagram illustrating an x-axis view of a sensing device 22 including a rotational sensor, in accordance with one or more techniques of this disclosure. As seen in FIG. 21, magnet 138 is attached to rotational element 198. Wear pin indicator 24 may engage with rotational element 198 such that when wear pin indicator 24 moves laterally along the y-axis relative to device 601, rotational element 198 and magnet 138 rotate about axis AE.

Magnet 138 and rotational element 198 may rotate about element axis of rotation AE. As magnet 138 and rotational element 198 rotate about axis AE, sensor 130 remains fixed. Sensor 130 may be configured to generate one or more signals indicative of one or more rotational parameters of the magnet 138. For example, magnet 138 may create a magnetic field. Rotation of magnet 138 may cause sensor 130 to sense the magnetic field differently (e.g., sense a different orientation of the magnetic field) based on the rotation of the magnet 138. Sensor 130 may generate one or more signals indicative of the rotational position of magnet 138 as a function of time, the rotational velocity of magnet 138 as a function of time, the rotational acceleration of magnet 138 as a function of time, or any combination thereof. In some examples, sensor 130 may generate one or more signals indicative of a number of rotations of the magnet 138. System 20 (e.g., operating circuitry 132 and/or sensing circuitry 144) may store the number of rotations and calculate a remaining wear length 202 based on the number of rotations of magnet 138.

Figure 22:
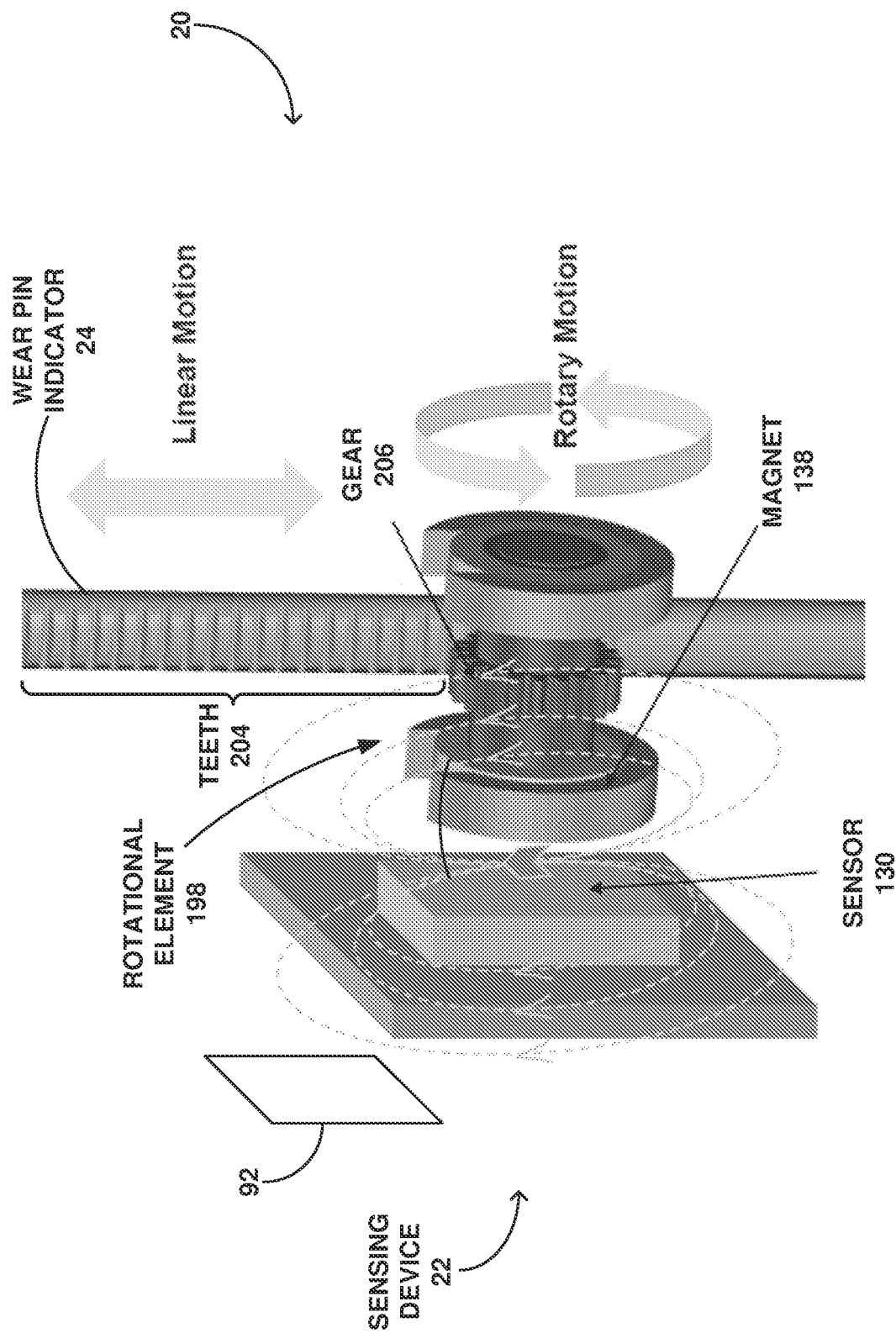
FIG. 22 is a conceptual diagram illustrating a perspective view of a sensing device including a rotational sensor.

FIG. 22 is a conceptual diagram illustrating a perspective view of a sensing device 22 including a rotational sensor, in accordance with one or more techniques of this disclosure. As seen in FIG. 22, sensing device 22 includes sensor 130 and rotational element 198. Wear pin indicator 24 may engage with rotational element 198. For example, wear pin indicator 24 includes a set of teeth 204, and rotational element 198 includes a gear 206 that comprises a set of teeth and a set of grooves. The set of teeth 204 on the wear pin indicator 24 may engage with the set of teeth on the gear 206 such that a lateral movement of wear pin indicator 24 causes rotational element 198 to rotate. For example, teeth 204 may fit within the set of grooves formed by the set of teeth on the gear 206. Sensor 130 may generate one or more signals indicative of one or more rotational parameters of magnet 138, which is centered on a rotational axis of rotational element 198.

Figure 23:
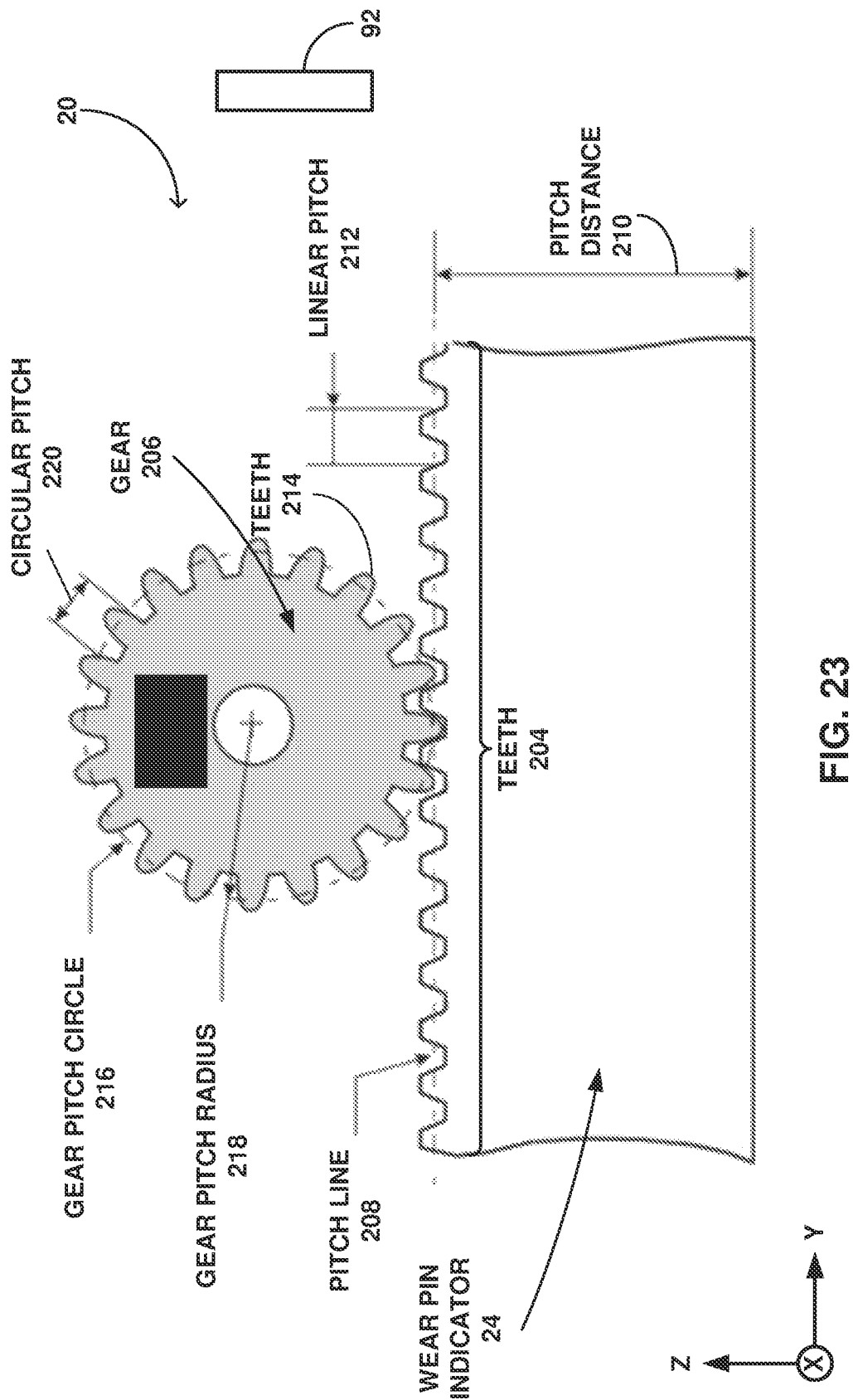
FIG. 23 is a schematic illustration of a wear pin indicator engaging a gear of a sensing device.

FIG. 23 is a perspective cross-sectional view conceptual diagram illustrating a y-axis view of the wear pin indicator 24 engaging with the gear 206, in accordance with one or more techniques of this disclosure. A pitch line 208 extends along a center of the set of teeth 204. Pitch distance 210 represents a distance between pitch line 208 and another side of the wear pin indicator 24. Linear pitch 212 may represent a length of one cycle of teeth 204. Gear 206 includes a set of teeth 214. The set of teeth 214 on gear 206 may be configured to engage with the set of teeth 204 on the wear pin indicator 24 such that a lateral movement of wear pin indicator 24 causes gear 206 to rotate. Gear pitch circle 216 may extend around a center of the teeth 214. Gear pitch radius 218 may represent a distance between gear pitch circle 216 and a center of gear 206. Circular pitch 220 may represent a distance of one cycle of teeth 214.

Figure 24A:
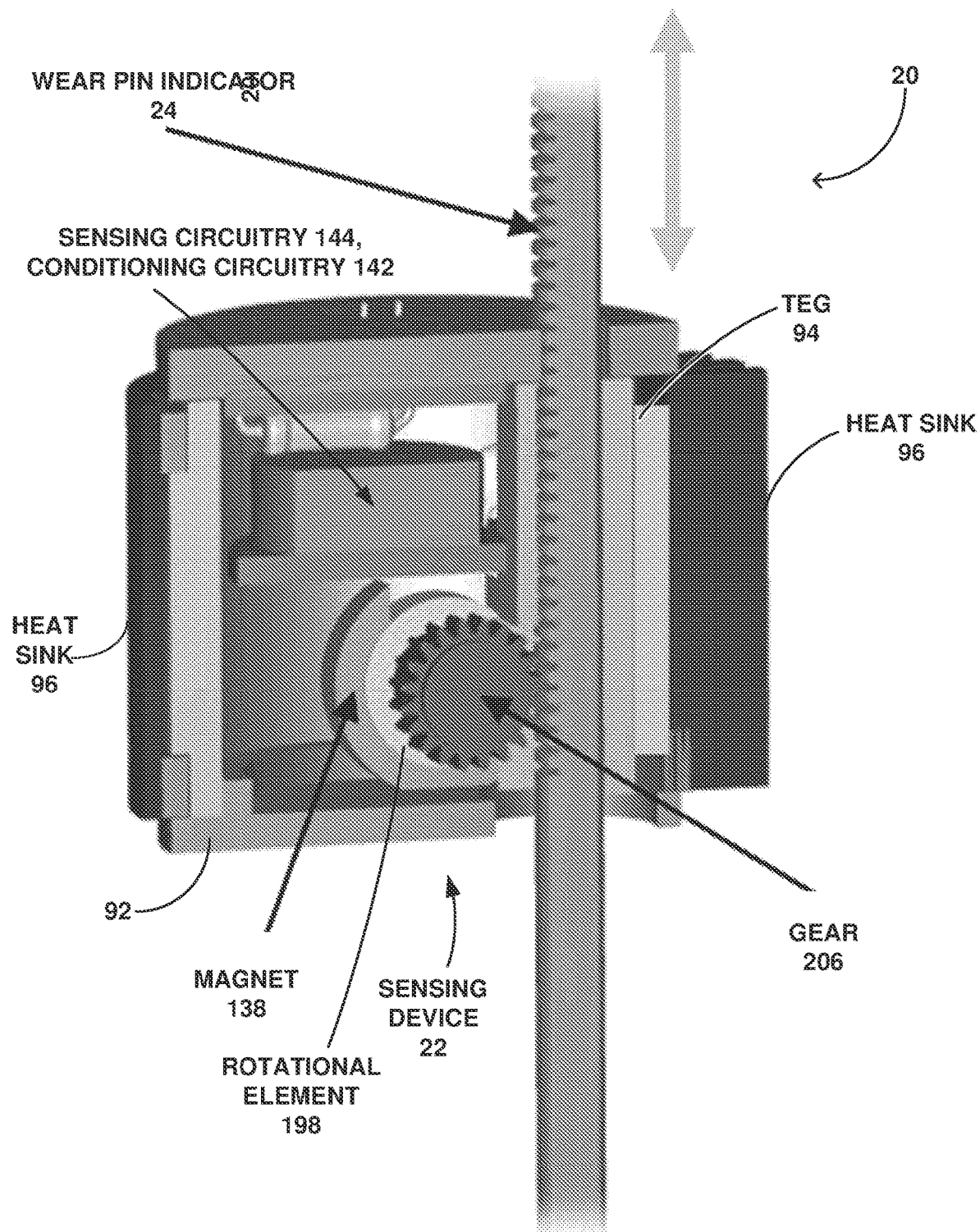
FIG. 24A is a perspective cross-sectional illustration of a sensing device with a rotational element including a rotary magnetic sensor.
Figure 24B:
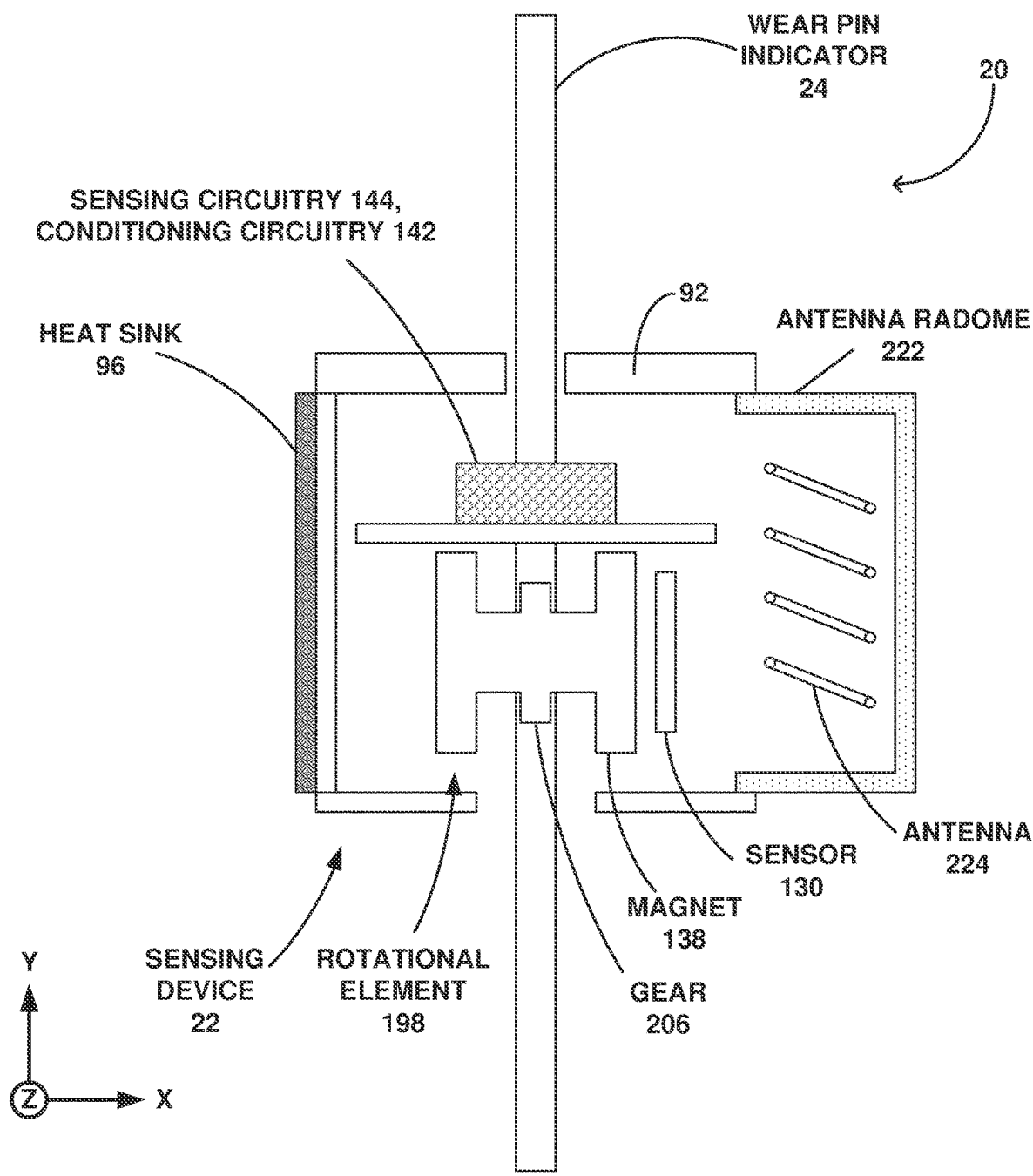
FIG. 24B is a schematic cross-sectional illustration of the example sensing device of FIG. 24A, with a cutting plane taken perpendicular to the z axis of the x-y-z axes shown.

FIG. 24A is a cross-sectional perspective view of an example system 20 including rotational element 198. As illustrated in FIG. 24A, heat sink 96 may extend around at least a portion of the outside of sensing device 22. Rotational element 198 and sensor 130 (not illustrated in FIG. 24A) are located within sensing device 22. TEG 94 may be located on an opposite side of wear pin indicator 24 from rotational element 198. Sensing circuitry 144 and/or conditioning circuitry 142 may be located within sensing device 22. FIG. 24B is a conceptual schematic diagram illustrating a y-axis view of sensing device 22 including rotational element 198 and sensor 130, in accordance with one or more techniques of this disclosure. As seen in FIG. 24B, sensing device 22 includes an antenna radome 222 and an antenna 224. System 20 (e.g., communication circuitry 136) may be configured to transmit and/or receive information via antenna 224 housed within antenna radome 222.

Figure 25:
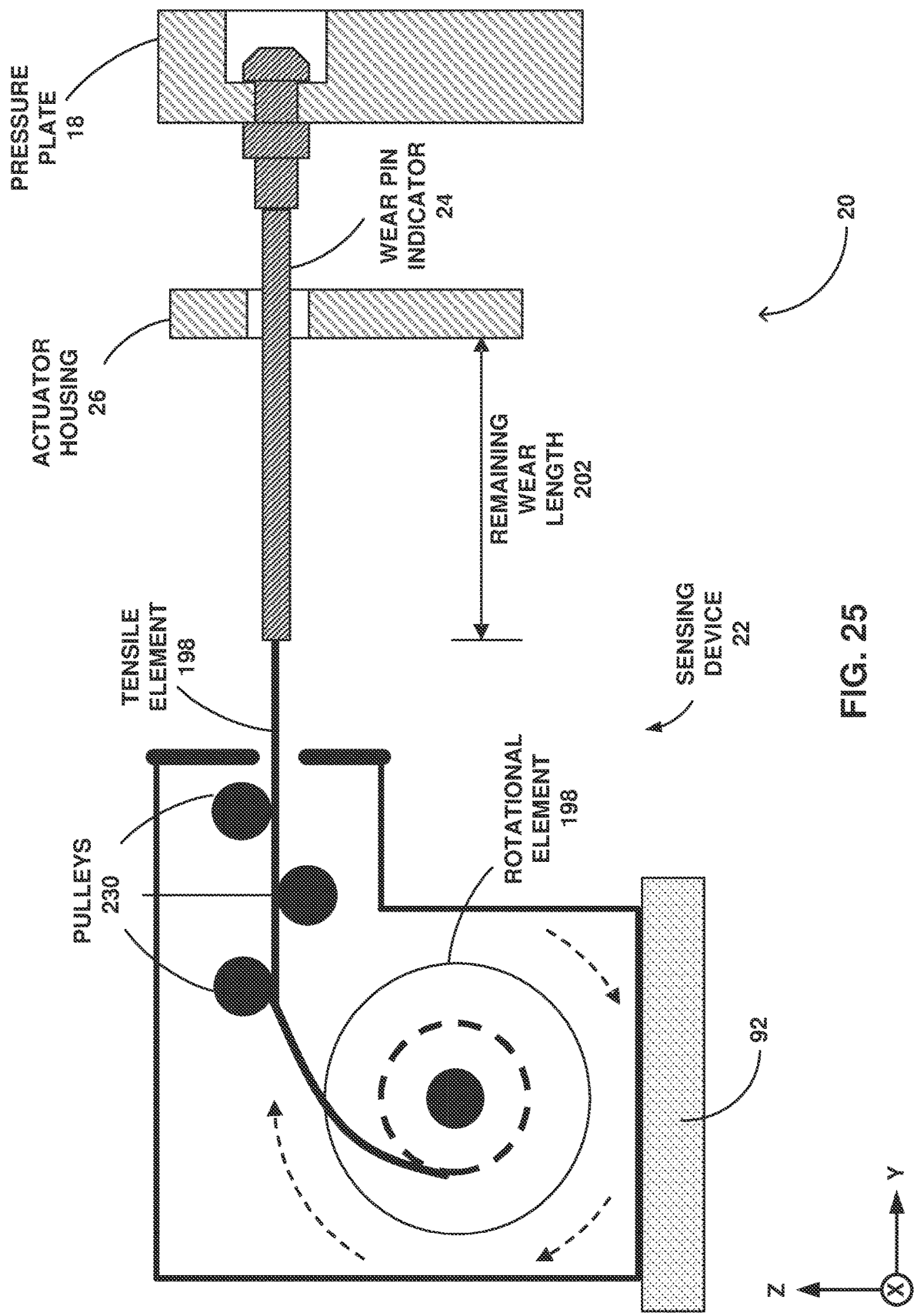
FIG. 25 is a schematic cross-sectional illustration of an example sensing device including a tensile element, with a cutting plane taken perpendicular to the x axis of the x-y-z axes shown.

In some examples, system 20 may include a tensile element 228 configured to cause movement of rotational element 198 as wear pin indicator 24 translates. Tensile element 228 may be substantially flexible element (e.g., a metallic cord) to, for example, allow flexibility in the positioning of sensor housing 92 relative to wear pin indicator 24. For example, FIG. 25 is a schematic diagram depicting an example sensing device 22 with tensile element 228 configured to cause movement of rotational element 198 as wear pin indicator 24 translates. A first end of tensile element 228 may be coupled to wear pin indicator 24, and a second end of tensile element 228 may be attached to and/or substantially wrapped around rotational element 198. Tensile element 228 may be configured such that, when wear pin indicator 24 moves towards pressure plate 18, wear pin indicator 24 pulls tensile element 228 (e.g., places tensile element 228 in tension), causing rotational element 198 to rotate. In examples, sensing device 22 includes one or more pulleys 230 (e.g., one or more micro pulleys) configured to direct a path of tensile element 222 from wear pin indicator 24 to rotational element 198. In examples, rotational element 198 includes a bobbin 232 around which tensile element 222 may be wrapped. Tensile element 198 may be configured to substantially unspool from bobbin 232 as wear pin indicator 24 translates.

Figure 26:
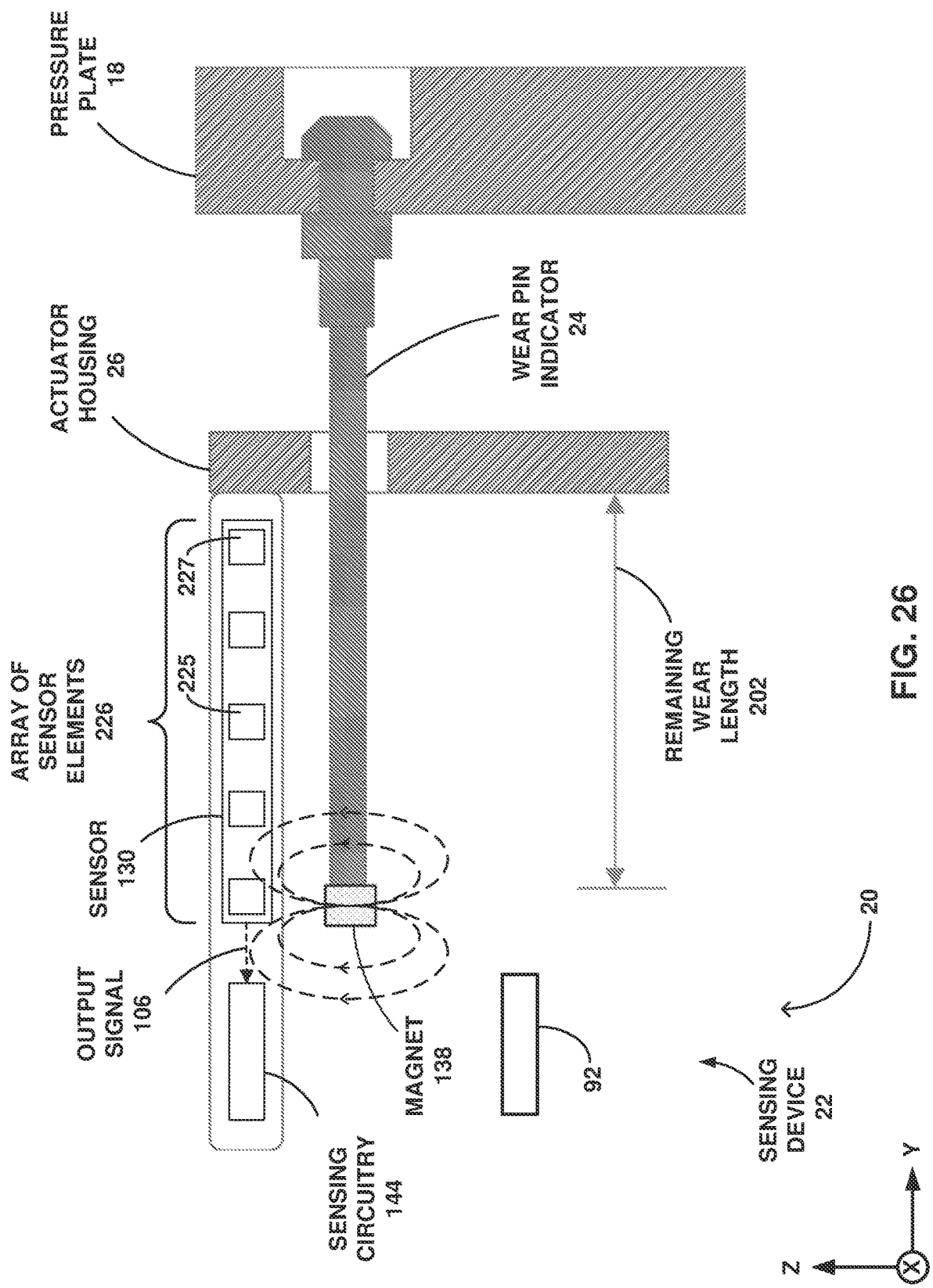
FIG. 26 is a schematic cross-sectional illustration of an example sensing device including an array of sensing elements, with a cutting plane taken perpendicular to the x axis of the x-y-z axes shown.

In some examples, at illustrated in FIG. 26, sensor 130 is configured to determine a position and/or movement of wear pin indicator 24 using a linear array of sensor elements 226 ("array 226"), in accordance with one or more techniques of this disclosure. Array 226 may include one or more sensor elements, such as sensor element 225 and sensor element 227. Sensing device 22 may be attached to actuator housing 26 such that sensing device 22 does not move relative to actuator housing 26 when actuator 14 causes a translation of disc stack 16. Therefore, as the length of wear pin indicator 24 decreases, output signal 140 may change based on the position of magnet 138 relative to each sensor of array 226. Output signal 140 may indicate a reduction in the remaining wear length 202 of wear pin indicator 24.

One or more of the sensor elements of array 226 may be configured to generate a sensor output signal based on the position of magnet 138. In examples, sensor 130 may include a single sensor element or any other number of sensor elements. Each sensor element in array 226 may be spaced apart or separated from an adjacent sensor by an air gap or another dielectric material. This dielectric material may include an encapsulation material, a potting compound, or a room temperature vulcanizing (RTV) rubber sealant. Each of the sensor elements may be spaced center-on-center by five millimeters, ten millimeters, or any other suitable spacing. For example, if array 226 has eight sensor elements, sensor 130 may be 75 millimeters or three inches wide. Each of the sensor elements may be mounted on a printed circuit board inside of a housing or carrier. In some examples, the output signal of each sensor element of array 226 may be inversely proportional to the distance between the respective sensor element and magnet 138. Sensor 130 may include a magnetoresistive sensor such as an anisotropic magnetoresistive (AMR) sensor or a giant magnetoresistive sensor, a Hall sensor, and/or any other type of sensor.

Output signal 140 may also be based on the position of magnet 138, or more specifically, by the direction of the portion of the magnetic field generated by magnet 138 that is passing through sensor 130 (e.g., through each element of array 226) at that position. Because the magnetic field lines are curved, the direction of the field passing through sensor 130 changes as magnet 138 moves along the y-axis, thereby varying output signal 140. For example, as magnet 138 approaches sensor 130 from the negative y-axis, the magnetic field passing through the sensor may gradually rotate from the positive z-axis, to the negative y-axis, to the negative z-axis. This rotation may trigger output signal 140 to have a positive value, a minimum negative value, and then approach zero value, respectively. Once magnet 138 is directly underneath a sensor element of array 226 (in the negative z-axis direction relative to sensor 130), the sensor element may be situated directly between the symmetrical magnetic fields extending from either side of magnet 138, and output signal 140 may register a zero value. As magnet 138 further progresses along the y-axis, the opposite magnetic field may trigger output signal 140, moving from the zero value to a maximum positive value, and then regressing back toward a negative value. Operating circuitry 132 and/or sensing circuitry 144 may be configured to determine the position of magnet 138 based on output signal 140, which may include a plurality of output signals generated by array 226.

For example, if array 226 includes five sensor elements, each sensor can generate an output signal. Operating circuitry 132 and/or sensing circuitry 144 may be configured to receive the five output signals and determine the position of magnet 138 relative to sensor 130 based on the five output signals. If magnet 138 is closer to a first sensor element (e.g., sensor element 225) than a second sensor element (e.g., sensor element 227), the first sensor element may generate a stronger output signal than the first sensor element depending on the orientation of the positive pole and the negative pole of magnet 138. Using output signal 140, Operating circuitry 132 and/or sensing circuitry 144 may be configured to determine a remaining wear length 202 or other wear pin data by, for example, comparing the current distance measurement to an initial or previous distance or length.

Operating circuitry 132 and/or sensing circuitry 144 may be configured to communicate the remaining wear length 202 and/or other wear pin data (e.g., along with a timestamp indicative of the time at which the remaining wear length 202 and/or other wear data was measured) for storage within memory 134. Memory 134 may be further configured to store multiple sets of wear data and time data, as well as rates of change of the remaining wear length 202 and/or other wear data between measurements. Memory 134 may also store thresholds (e.g., threshold lengths and threshold distances) used by operating circuitry 132 and/or sensing circuitry 144. In examples, communication circuitry 136 is configured to transmit data to an external computing system. The communication element may transmit data through a wired connection or a wireless connection to the external computing system. The transmitted data may indicate the estimated remaining use of the brake assembly, the length of the wear, the rate of change of the length of the wear pin indicator, and/or any other relevant data.

In accordance with the techniques of this disclosure, operating circuitry 132 and/or sensing circuitry 144 may determine the estimated remaining use of the brake assembly based on output signal 140, which may indicate the position of magnet 138 relative to sensor 130. Sensing device 22 may perform a measurement of the estimated remaining use of the brake assembly automatically (e.g., without a human operator). For example, a measurement of the estimated remaining use of the brake assembly may occur when the brakes are applied. Operating circuitry 132 and/or sensing circuitry 144 may be configured to determine when the brakes are applied and to sample, without human intervention, output signal 140 when the brakes are applied. The techniques of this disclosure may be especially useful for after-market devices that can be installed on existing brake assemblies. In examples, sensing device 22 includes a detachable anchor coupled to wear pin indicator 24 (e.g., an end of wear pin indicator 24) and configured to move in response to movement of wear pin indicator 24. The detachable anchor may be configured to attach to wear pin indicator 24 such that movement of wear pin indicator 24 causes movement of magnet 138 or another component of sensing device 22. In examples, the detachable anchor includes a spring configured to expand or compress in response to movement of wear pin indicator 24.

Figure 27:
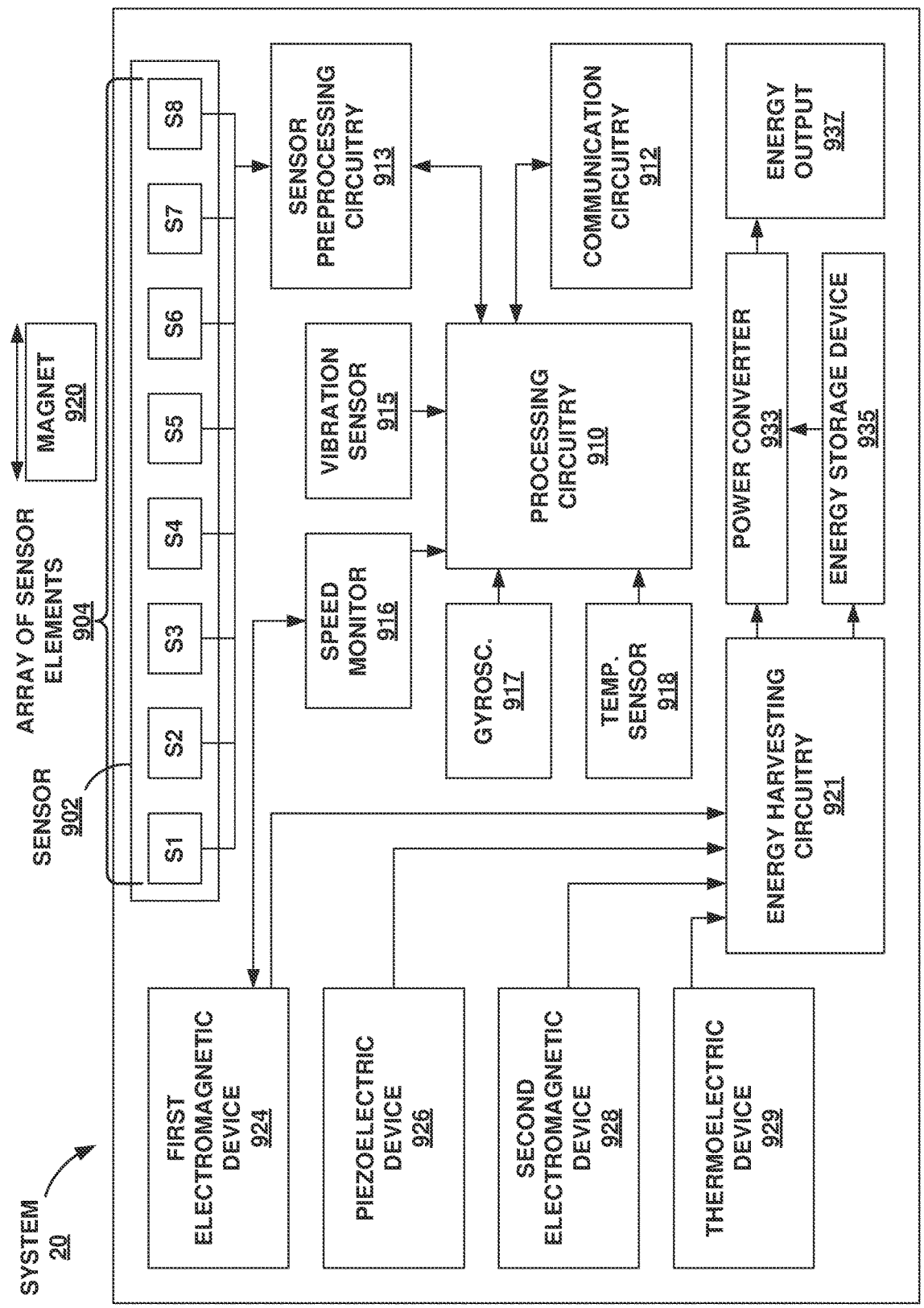
FIG. 27 is a block diagram illustrating a system configured to measure a position or movement of a wear pin indicator using a sensor including a magnet.

FIG. 27 is a block diagram illustrating a system 20 according to one or more techniques of this disclosure. As seen in FIG. 27, system 20 may include a sensor 902 (e.g., sensor 13), processing circuitry 910 (e.g., operating circuitry 132 and/or sensing circuitry 144), communication circuitry 912 (e.g., communication circuitry 136), sensor preprocessing circuitry 913, a vibration sensor 915, a speed monitor 916, a gyroscope 917, a temperature sensor 918, a magnet 920 (e.g., magnet 138), energy harvesting circuitry 921 (e.g., conditioning circuitry 142 and/or interface circuitry 146), a thermoelectric device 929 (e.g. TEG 94), a power converter 933, an energy storage device 935 (e.g., energy storage device 145), and energy output 937. In some examples, system 20 includes an accelerometer configured to generate an accelerometer signal.

Sensor 902 includes an array of sensor elements 904 (e.g., array 226). The array of sensor elements 904 may be arranged in a line. Each sensor element of the array of sensor elements 904 may be configured to generate a sensor element signal that indicates a proximity of magnet 920 to the respective sensor element and/or an angle of magnet 920 relative to the respective sensor element. For example, as seen in FIG. 27, the sensor element signal generated by sensor element S5 may indicate a first magnitude and the sensor element signal generated by sensor element S1 may indicate a second magnitude. Since magnet 920 is closer to sensor element S5 than sensor element S1, the first magnitude may be greater than the second magnitude. Magnet 920 may, in some examples move in response to a movement of a wear pin indicator (e.g., wear pin indicator 24). Consequently, a movement of magnet 920 may indicate a remaining wear length of the wear pin indicator. In some examples, magnet 920 may be a rotational magnet and sensor 902 may sense one or more rotational parameters of magnet 920.

Sensor preprocessing circuitry 913 may receive a sensor element signal from each of sensor elements 904. Sensor preprocessing circuitry 913 may perform one or more preprocessing actions (e.g., filtering) and deliver one or more signals to processing circuitry 910. Processing circuitry 910 may be configured to determine a remaining wear length of the wear pin indicator based on the one or more signals received from sensor preprocessing circuitry 913.

Vibration sensor 915 may, in some examples, be configured to generate a vibration signal indicating a level of vibration of system 20 and/or a level of vibration of one or more components of brake assembly 12. Vibration sensor 915 may send the vibration signal to processing circuitry 910. Speed monitor 916 may be configured to generate a speed signal indicating a speed of the vehicle on which system 20 is located. In some examples, speed monitor 916 may generate the speed signal based on one or more signals received from a first electromagnetic device 924. Gyroscope 917 may generate a gyroscope signal that indicates a special orientation of one or more components of system 20. Gyroscope 917 may send the gyroscope signal to processing circuitry 910. Temperature sensor 918 may generate a temperature signal that indicates a temperature of one or more components of system 20 and/or a temperature of the environment at or proximate to system 20. Temperature sensor 918 may send the temperature signal to processing circuitry 910.

Energy harvesting circuitry 921 may be configured to harvest energy for powering one or more components of system 20. In some examples, energy harvesting circuitry 921 may harvest energy based on the operation of a brake assembly. For example, thermoelectric device 929 may generate energy based on one or more aspects of the operation of brake assembly 12, and send the generated energy to energy harvesting circuitry 921. In examples, in addition to or instead of thermoelectric device 929, system 20 may include piezoelectric device 926 and/or second electromagnetic device 928. First electromagnetic device 924, piezoelectric device 926, and/or second electromagnetic device 928, may generate energy based on one or more aspects of the operation of brake assembly 12, and send the generated energy to energy harvesting circuitry 921. Energy harvesting circuitry 921 may send energy to one or both of power converter 933 and energy storage device 935. Power converter 933 may send energy to energy output 937. In some examples, energy output 937 may include one or more components of system 20 including sensor 902, processing circuitry 910, communication circuitry 912, sensor preprocessing circuitry 913, vibration sensor 915, speed monitor 916, gyroscope 917, temperature sensor 918, or any combination thereof. Consequently, energy harvesting circuitry 921 may supply energy to one or more components of system 20, the energy being derived from the operation of the brake assembly.

Figure 28:
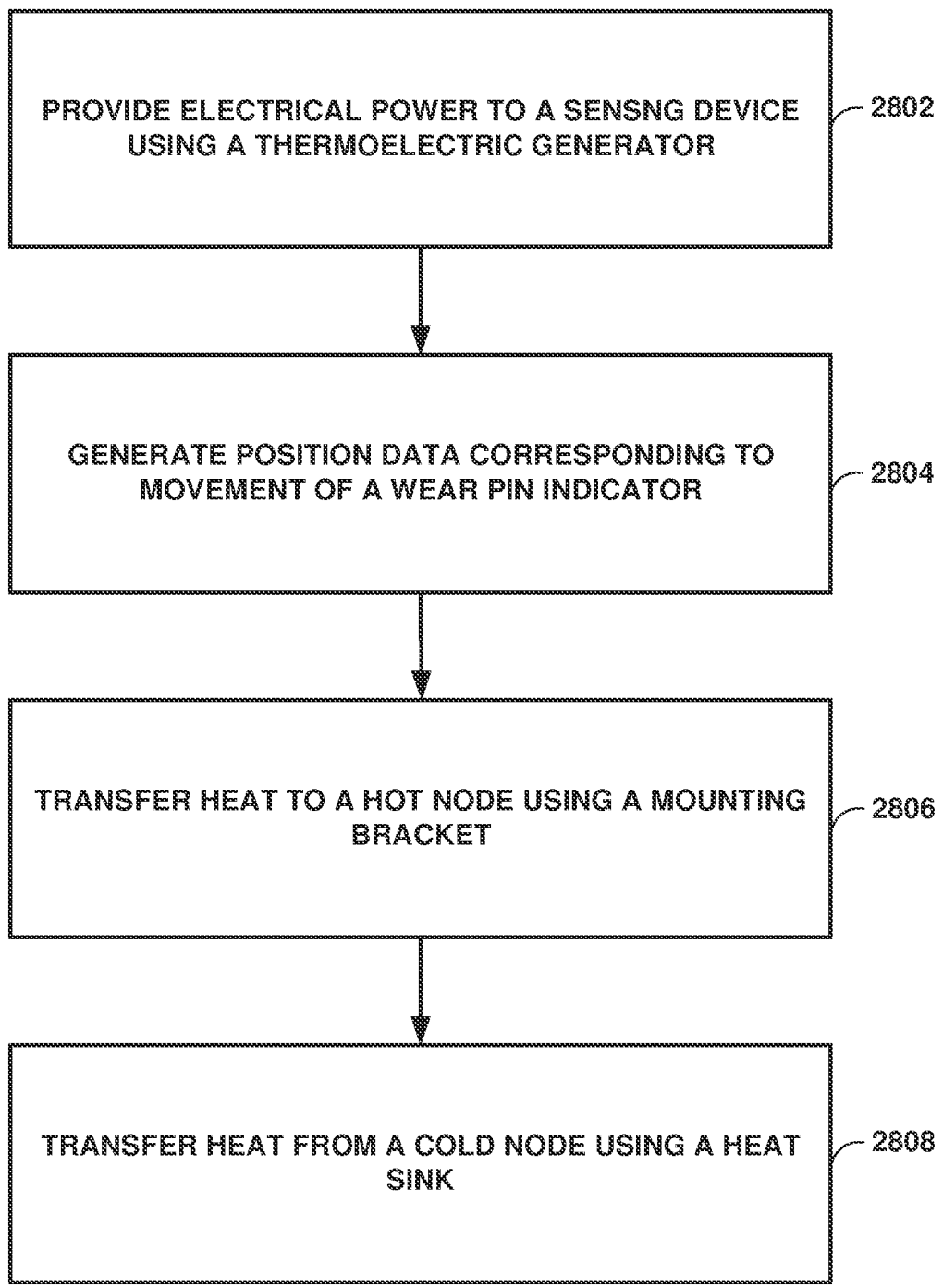
FIG. 28 is a flow diagram illustrating an example operation for sensing an amount of wear of a brake assembly and harvesting energy using a mounting bracket, in accordance with one or more techniques of this disclosure.

FIG. 28 is a flow diagram illustrating an example operation for sensing an amount of wear of a brake assembly and harvesting energy, in accordance with one or more techniques of this disclosure. FIG. 28 is described with respect to system 20 and/or brake assembly 12 of FIGS. 1-27. However, the techniques of FIG. 28 may be performed by different components of sensing device 22 and/or brake assembly 12 or by additional or alternative systems.

The technique includes providing electrical power to a sensing device 22 using a TEG 94 (2802). TEG 94 may include a TEG hot node 102 and a TEG cold node 104. TEG 94 may produce the electrical power using a temperature gradient between TEG hot node 102 and TEG cold node 104. In examples, TEG 94 produces the electrical power using solid-state device 178. TEG 94 may provide the electrical power to sensing device at a voltage VT when TEG 94 experiences the temperature gradient between TEG hot node 102 and TEG cold node 104. In examples, shunt circuitry 176 limits the voltage VT to a voltage less than or equal to a cutoff voltage of one or more components of sensing device 22 (e.g., interface circuitry 146) when TEG 94 provides the electrical power.

The technique includes generating, using sensing device 22, position data corresponding to movement of wear pin indicator 24 using the electrical power (2804). Wear pin indicator 24 may move based on a translation of disc stack 16 of brake assembly 12. In examples, wear pin indicator 24 moves relative to one or more components of brake assembly 12 when disc stack 16 translates, such as one or more of actuator housing 26, actuator body 84, torque tube 64, and/or another component of brake assembly 12. In examples, sensing device 22 (e.g., sensor 130) generates the position data based on movement of magnet 138. Wear pin indicator 24 may cause the movement of magnet 138 when wear pin indicator 24 moves based on a translation of disc stack 16.

The technique include transferring heat, using mounting bracket 98, from actuator housing 26 to TEG hot node 102 (2806). Mounting bracket 98 may be mechanically coupled to actuator housing 26 and sensor housing 92 when mounting bracket 98 transfer the heat. Sensor housing 92 may mechanically support sensing device 22, TEG 94, and heat sink 96 when mounting bracket mechanically couples actuator housing 26 and sensor housing 92. In examples, mounting bracket 98 displaces sensor housing 92 from pressure plate 18 of brake assembly 12 when mounting bracket mechanically couples actuator housing 26 and sensor housing 92. In examples, mounting bracket 98 substantially suspends sensor housing 92 between a portion of actuator housing 26 and pressure plate 18 when mounting bracket mechanically couples actuator housing 26 and sensor housing 92. In examples, sensor housing 92 mechanically supports heat conductive element 106, and mounting bracket 98 transfers heat (e.g., by conduction) from actuator housing 26 to heat conductive element 106. Heat conductive element 106 may transfer some portion of the heat (e.g., by conduction) to TEG hot node 102.

The technique include transferring heat, using heat sink 96, from TEG cold node 104 to an environment (e.g., an air environment) surrounding brake assembly 12 and/or wheel 10. In examples, heat sink 96 transfers heat using fins 118, 120 and/or pins 122. In examples, heat sink 96 transfers heat using mesh 123 defined by members 124. In some examples, fins 118, 120 and/or pins 122 are substantially perpendicular to a direction of travel DT of wheel 10 when wheel 10 travels in the direction of travel DT. In examples, fins 118, 120 and/or pins 122 are substantially perpendicular to a direction of travel DT when mounting bracket mechanically couples actuator housing 26 and sensor housing 92.

Figure 29:
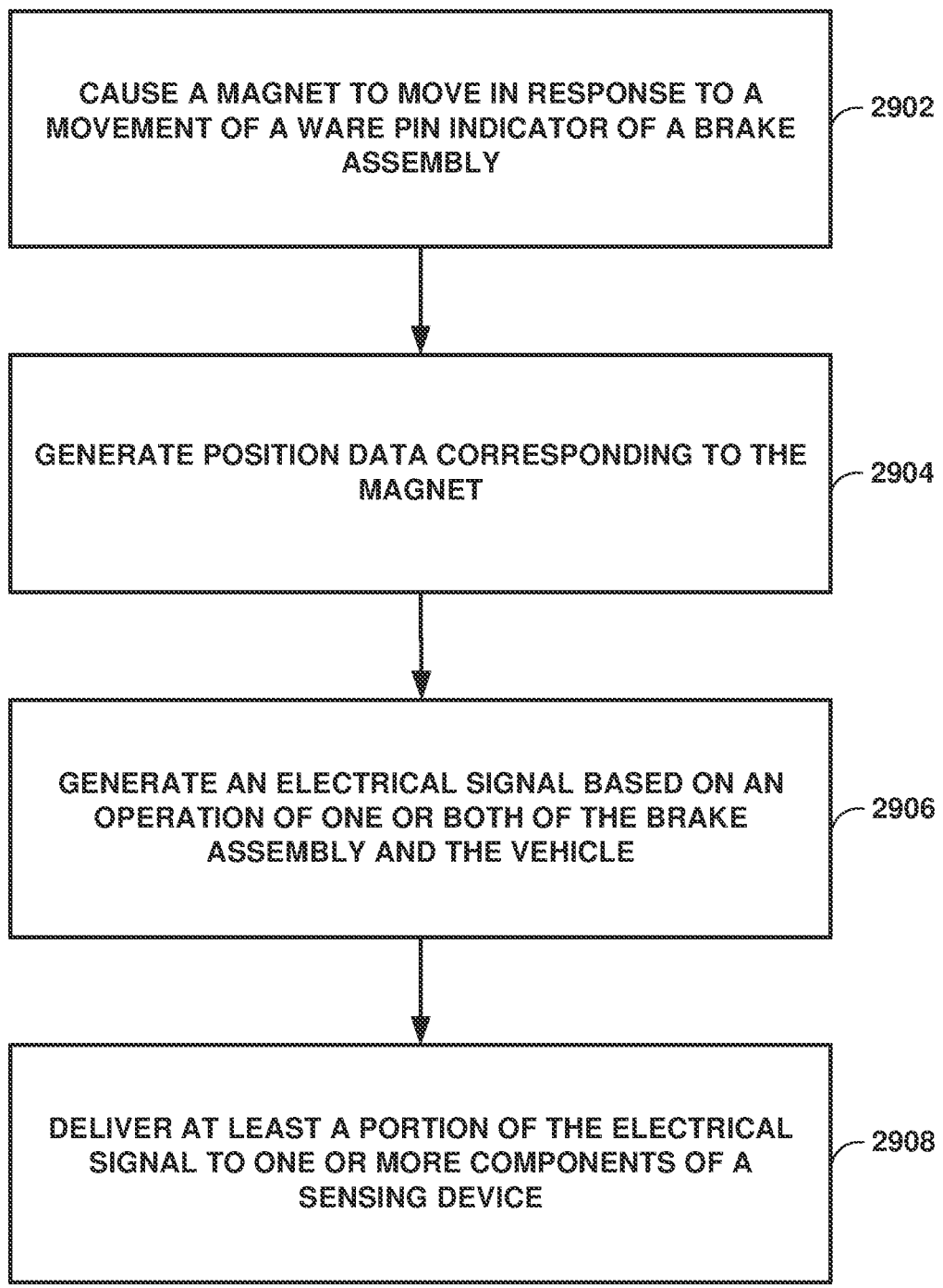
FIG. 29 is a flow diagram illustrating an example operation for sensing an amount of wear of a brake assembly and harvesting energy, in accordance with one or more techniques of this disclosure.

FIG. 29 is a flow diagram illustrating an example operation for sensing an amount of wear of a brake assembly and harvesting energy, in accordance with one or more techniques of this disclosure. FIG. 29 is described with respect to system 20 and/or brake assembly 12 of FIGS. 1-27. However, the techniques of FIG. 29 may be performed by different components of sensing device 22 and/or brake assembly 12 or by additional or alternative systems.

Brake assembly 12 may cause a magnet 138 to move in response to a movement of a wear pin indicator 24 (2902). In some examples, magnet 138 may move laterally in response to the movement of the wear pin indicator 24. In some examples, magnet 138 may rotate in response to the movement of the wear pin indicator 24 without moving laterally. In some examples, a movement of wear pin indicator 24 may represent a movement relative to Sensing device 22 (e.g., sensor housing 92). In some examples, a movement of wear pin indicator 24 may represent a change in a remaining wear length of the wear pin indicator 24. The remaining length of the wear pin indicator 24 may represent a distance that wear pin indicator 24 extends past one or more components (e.g., actuator housing 26) of brake assembly 12. Sensing device 22 may be fixed to one or more components of brake assembly 12 such that sensing device 22 can sense a change in the remaining wear length of the wear pin indicator 24.

Sensing device 22 may generate position data corresponding to magnet 138 (2904). In some examples, Sensing device 22 may include a sensor 130 configured to generate the position data based on a position of the magnet relative to the sensing device 22. In some examples, the sensing device 22 senses one or more lateral movement parameters of magnet 138. In some examples, the sensing device 22 senses one or more rotational parameters of magnet 138.

TEG 94 may generate an electrical signal based on an operation of one or both of brake assembly 12 and a vehicle on which brake assembly 12 is located (2906). In examples, TEG 94 include one or more thermoelectric devices. For example, the brake assembly 12 may generate heat during operation. TEG 94 harvest this heat in order to generate power (e.g. an electrical signal having a voltage). TEG 94 may deliver at least a portion of the power to one or more components of sensing device 22 (2908).

Figure 30:
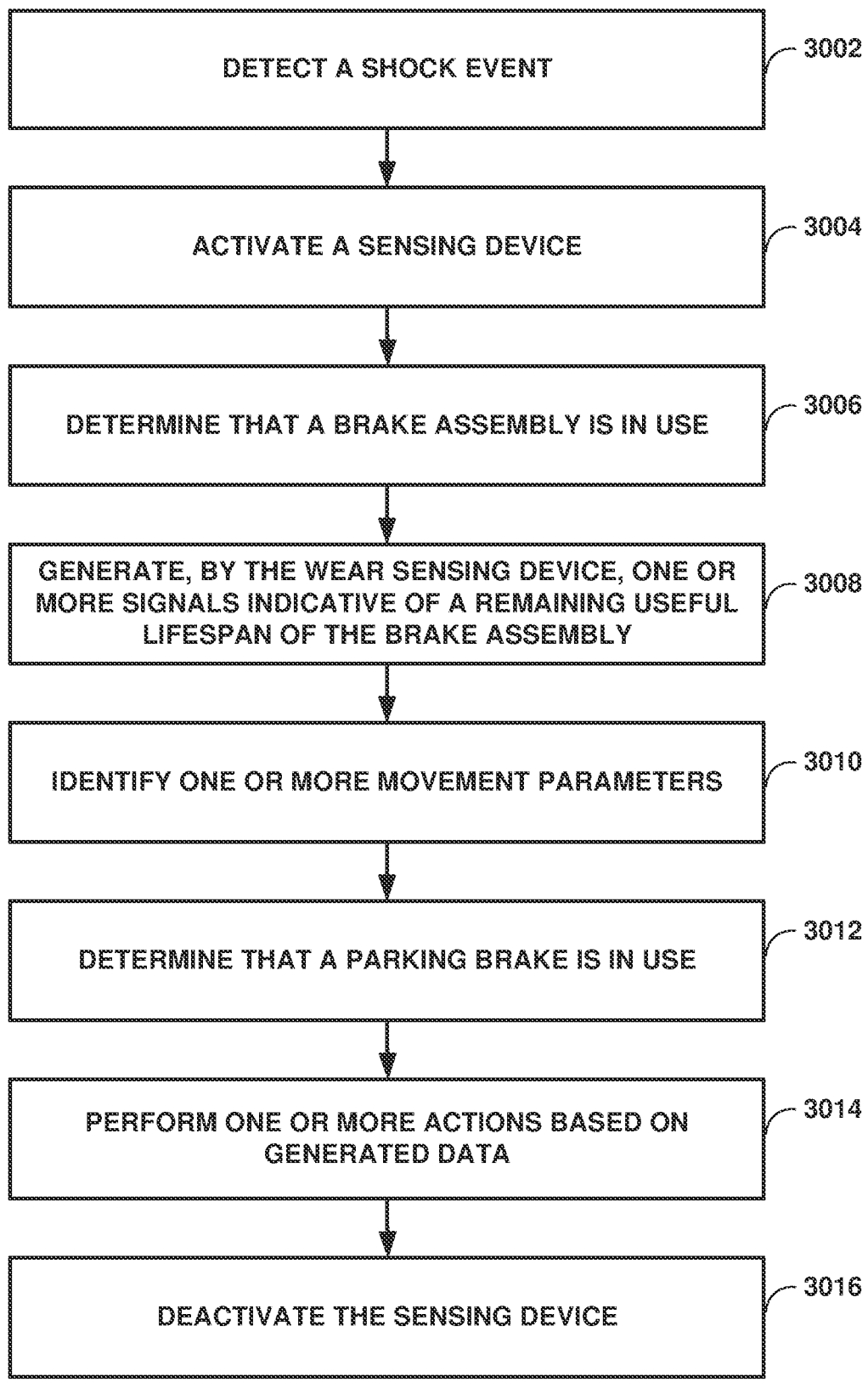
FIG. 30 is a flow diagram illustrating an example operation for operating a wear sensing device when an aircraft lands, in accordance with one or more techniques of this disclosure.

FIG. 30 is a flow diagram illustrating an example operation for operating a wear sensing device when an aircraft lands, in accordance with one or more techniques of this disclosure. FIG. 30 is described with respect to system 20 and/or brake assembly 12 of FIGS. 1-27. However, the techniques of FIG. 30 may be performed by different components of sensing device 22 and/or brake assembly 12 or by additional or alternative systems.

In some examples, an aircraft may include one or more sensing devices, wherein each sensing device (e.g., sensing device 22) of the one or more sensing devices monitor a respective brake assembly (e.g., brake assembly 12) of the aircraft. In some examples, each sensing device generates one or more signals that indicate a remaining life of the respective brake assembly. In some cases, it may be beneficial for the one or more sensing devices to monitor the respective brake assemblies when the aircraft is taking off, landing, taxiing, resting, or any combination thereof. The one or more sensing devices may be configured to generate signals indicative of one or more use states of the aircraft including taking off, landing, taxiing, resting, or any combination thereof. The one or more sensing devices may activate or deactivate depending on a use state of the aircraft.

In some examples, an onboard sensor (e.g., a sensor of system 20, such as vibration sensor 915) may detect a shock event (3002). The shock event may be indicative of a mechanical shock to one or more components of braking assembly 12. In some examples, the shock event may represent a contact between landing gear of the aircraft and the ground when the aircraft is landing. In some examples, a sensor may be configured to detect a weight on wheels (WoW) using a shock sensing algorithm. The sensor that performs the shock detection may be part of a sensing device, but this is not required.

Based on detecting the shock event, one or more components of sensing device 22 may activate and start drawing power from a power source (3004). In some examples, sensing device 22 may deactivate when the aircraft is flying and activate when the aircraft is landing and/or is landed. Once the one or more components of sensing device 22 are activated, sensing device 22 may begin generating one or more signals that indicate a remaining life of the respective brake assembly.

In some examples, system 20 (e.g., sensing device 22) may detect one or more events at which brake assembly 12 is applied (3006). For example, brake assembly 12 may perform braking functions one or more times after the aircraft lands. In some examples, system 20 (e.g., sensing device 22) may monitor position sensing data and/or acceleration data in order to determine when brakes of brake assembly 12 are applied. In some examples, system 20 (e.g., sensing device 22) may detect one or more taxiing "snub" events based on acceleration data and break wear-out data. System 20 (e.g., sensing device 22) may generate one or more signals indicative of a remaining useful lifespan of the brake assembly (3008) based on detecting the shock event, detecting that brake assembly i12 *s* in use, detecting one or more taxiing snub events or any combination thereof.

System 20 (e.g., sensing device 22) may identify one or more movement parameters (3010). In some examples, the one or more movement parameters may include velocity data, acceleration data, shock data, or any combination thereof. These one or more movement parameters may indicate whether the aircraft is decelerating and/or whether a parking brake is applied. System 20 (e.g., sensing device 22) may additionally or alternatively measure temperature data (e.g., using temperature sensor 918) in order to determine whether the aircraft is decelerating and/or whether the parking brake is applied. System 20 (e.g., sensing device 22) may determine that the parking brake is in use (3012). Based on determining that the parking brake is in use, system 20 (e.g., sensing device 22) may perform one or more actions based on the generated data (3014). For example, system 20 (e.g., sensing device 22) may transmit information (e.g., wear data and/or any other kind of data generated by sensing device 22) via communication circuitry 136. One or more components of system 20 (e.g., sensing device 22) may deactivate when system 20 (e.g., sensing device 22) is finished performing the one or more actions (3016).

Figure 31:
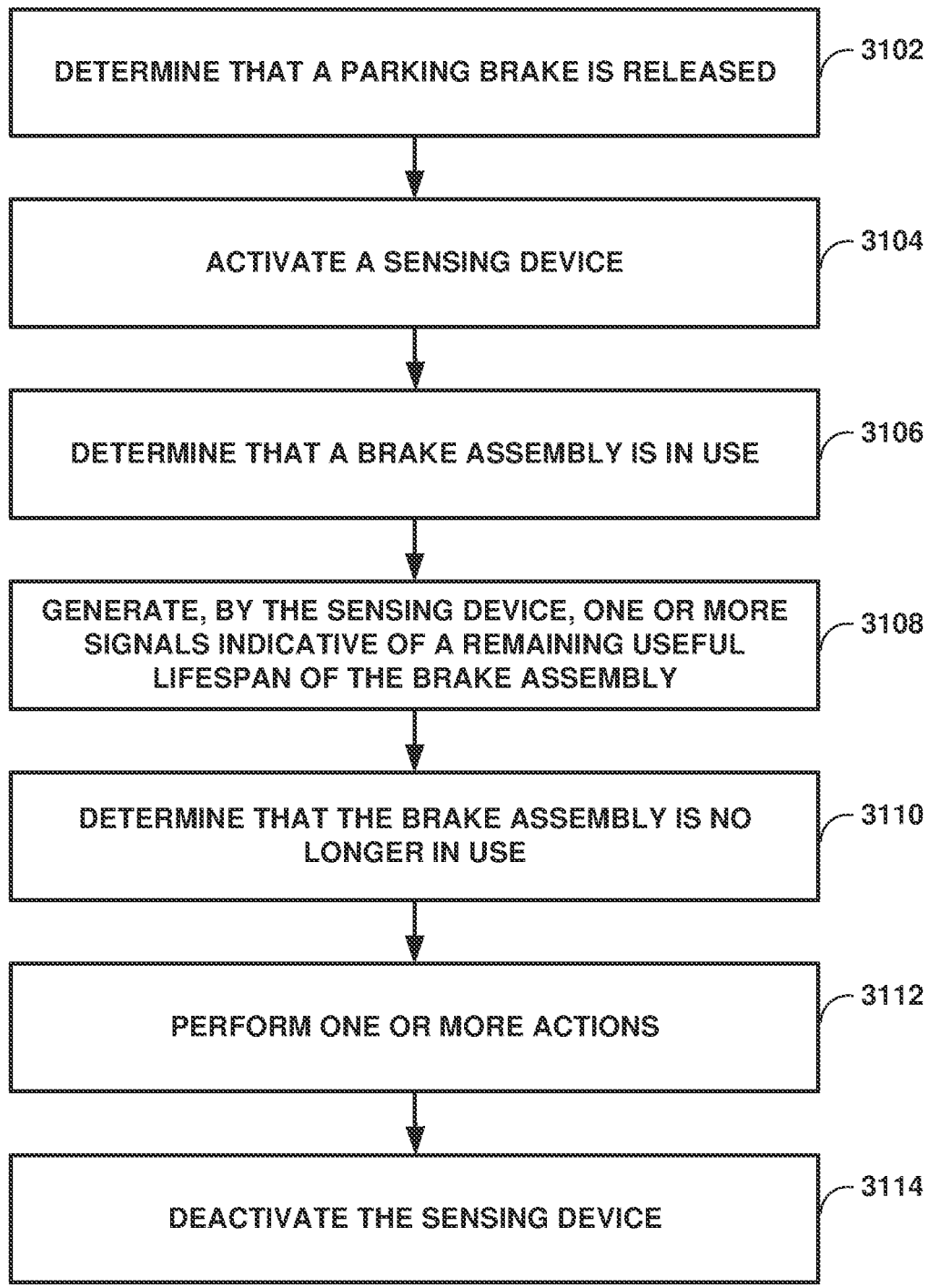
FIG. 31 is a flow diagram illustrating an example operation for operating a wear sensing device when an aircraft takes off, in accordance with one or more techniques of this disclosure.

FIG. 31 is a flow diagram illustrating an example operation for operating sensing device 22 when an aircraft takes off, in accordance with one or more techniques of this disclosure. FIG. 31 is described with respect to system 20 and/or brake assembly 12 of FIGS. 1-27. However, the techniques of FIG. 31 may be performed by different components of sensing device 22 and/or brake assembly 12 or by additional or alternative systems.

System 20 (e.g., sensing device 22) may determine that a parking brake is released (3102). Based on determining that a parking brake is released, one or more components of system 20 (e.g., sensing device 22) may activate (3104). system 20 (e.g., sensing device 22) may determine that brake assembly 12 is in use (3106). Based on determining that a parking brake assembly is in use, system 20 (e.g., sensing device 22) may generate one or more signals indicative of a remaining useful lifespan of brake assembly 12 (3108). System 20 (e.g., sensing device 22) may determine that the brake assembly is no longer in use (3110) and perform one or more actions (3112). These one or more actions may include transmitting and/or receiving information via communication circuitry. Portions of system 20 (e.g., sensing device 22) may deactivate after performing the one or more actions (3114).

Figure 32:
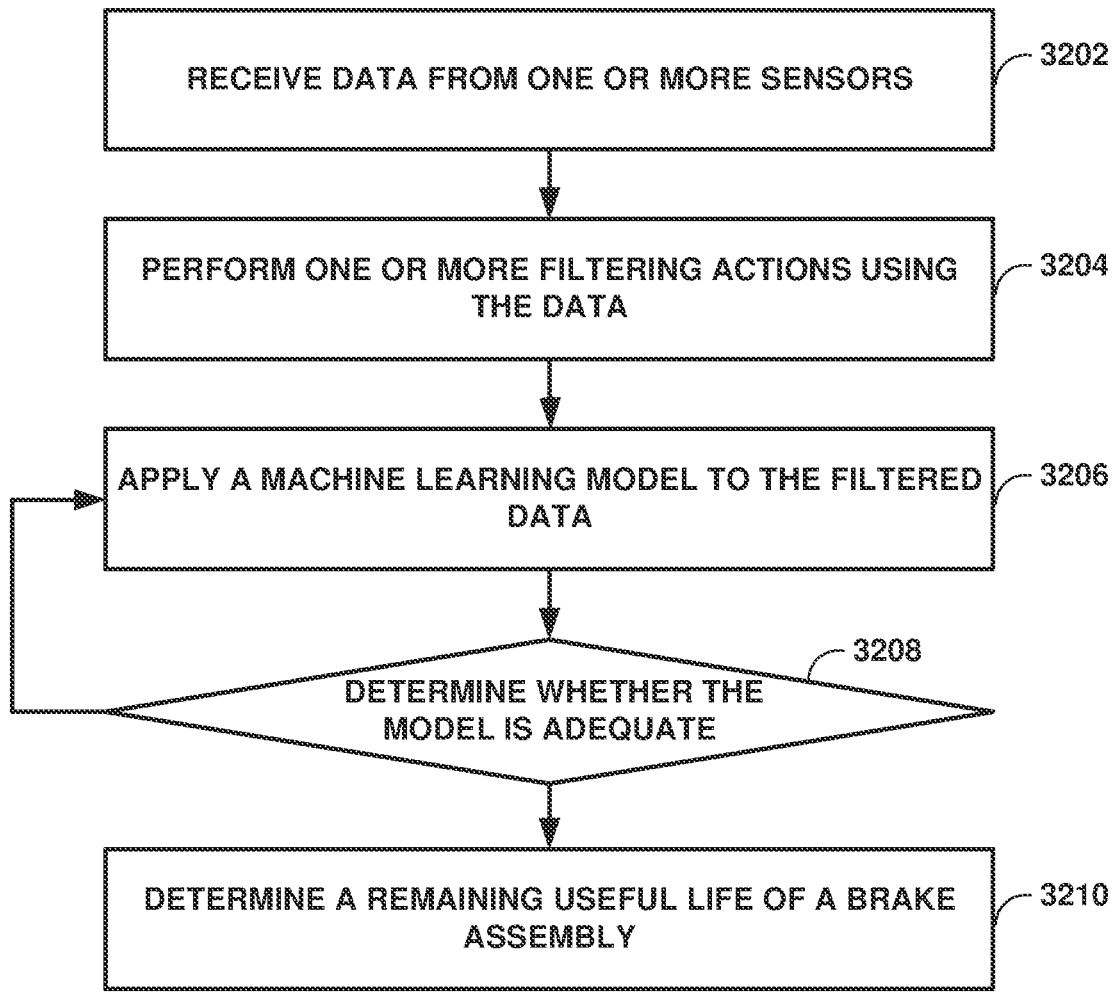
FIG. 32 is a flow diagram illustrating an example operation for using a machine learning model to determine a remaining useful lifespan of a brake assembly, in accordance with one or more techniques of this disclosure.

FIG. 32 is a flow diagram illustrating an example operation for using a machine learning model to determine a remaining useful lifespan of a brake assembly, in accordance with one or more techniques of this disclosure. FIG. 32 is described with respect to system 20 and/or brake assembly 12 of FIGS. 1-27. However, the techniques of FIG. 32 may be performed by different components of sensing device 22 and/or brake assembly 12 or by additional or alternative systems.

In some examples, a computing device is configured to receive data from one or more sensors (3202). In some examples, the computing device may be configured to receive the data from one or more sensing devices and/or one or more other sensors. For example, the computing device may collect data from one or more wear position sensors, one or more temperature sensors, one or more accelerometers (e.g., 3-axis accelerometers), one or more gyroscopes, or any combination thereof.

In some examples, the computing device is configured to perform one or more filtering actions using the data (3204). The computing device is configured to filter the data received by the computing device. For example, the computing device may transform data collected by the one or more wear sensing device during landing, parking and takeoff of an aircraft to a clean dataset. The data may, in some examples may include inconsistent values. It may be beneficial to filter the data in order to remove instances having missing values, estimate missing values of instances using statistical analysis, removing duplicate instances, and normalizing the sensor data in the dataset.

The computing device may apply a machine learning model to the filtered data (3206). In some examples, the computing device may apply the central limit theorem (CLT) to the filtered data in order to generate one or more outputs. In some examples, the computing device passes sensor data through a learning block that analyzes normal gaussian distribution to calculate one or more mean values. The computing device may use a multivariate CLT process for multi-sensor data correlation.

The computing device is configured to determine whether the model is adequate (3208). The computing device may compare normal distribution parameters stored in a memory with a current set of data for which normal distribution parameters are calculated. The errors are measured between the different stages integrated over time to validate the model accuracy. Based on a model verification error band, the computing device may proceed to a next stage. In some examples, verification is repeated iteratively to obtain acceptable error band.

When the computing device determines that the model is not adequate ("NO" at block 3208), the computing device may determine a remaining useful life of one or more brake assemblies (3210). Based on the trained model and the current sensor dataset, the computing device may derive the normal distribution parameters are derived. The computing device may perform statistical data analysis, and a relationship may be established between multi sensors with linear or multiple polynomial regression models. The remaining useful life (RUL) of the brakes may be predicted. The RUL data may be communicated to a cloud and/or field maintenance operator.

The central limit theorem provides that when random variables are collected, their properly normalized sum tends toward a normal distribution. Under the central limit theorem, when random samples are taken from a population of data points to form a dataset with mean μ and standard deviation a, a distribution of the dataset may be approximately normally distributed. This may hold true regardless of whether the source population is normal or skewed, provided the sample size is sufficiently large (usually N>30).

In some examples, a computing device stores wear-out data collected for every landing in a memory. The computing device may retrieve previous wear-out data is retrieved from the memory. For example, a difference between current and previous landing wear-out data may be stored in the memory. In some examples, the difference may be stored as $\delta WL_n$ with respect to a number of landings $N_n$. After recording a dataset that is integrated over time, calculating a sample mean of the $\delta WL_n$ may be normally distributed if the sample size meets CLT criteria. Applying the central limit theorem to a collected sensor dataset for a specific time interval may result in calculating a mean value $\mu_{\delta WL}$. Tracking a mean value for a larger number of aircraft landings and establishing a correlation with the wear-out data provides the slope (rate of wear-out) for specific conditions. The wear-out data for aircraft parked condition, taxiing snub, and hard landings may be filtered with multi-sensor fusion and stored separately in the memory.

In some examples, a computing device may apply linear regression in order to analyze break wear sensor data. In some examples, a computing device may execute an optimized model stored in a memory. In some examples, the processing circuitry may further process the model through the decision tree for edge inferencing. The computing device may retrieve sorted or filtered data from the memory to establish a relationship by means of regression to predict the remaining useful life of one or more brake assemblies (e.g., an estimated remaining number of landings). Regression is an approach for modeling a relationship between variables. A linear regression model may include a relationship between two variables, whereas multiple polynomial regression may include a modeling relationship between multiple variables. The simple least squares approach to regression includes approximating the parameters of a linear model. In some examples, linear regression may determine a linear model that minimizes a sum of the squared errors between the observations in a dataset and those predicted by the model.

In some examples, a computing device may apply a non-linear regression analysis in order to analyze break wear sensor data. A computing device may generate and execute a non-linear regression model in an edge device. The computing device may, in some examples, generate a non-linear regression model based on wear data corresponding to one or more brake assemblies. In some examples, the computing device may store the model in a memory. The computing device may retrieve the model is retrieved from the memory for the inferencing and prediction of the remaining useful life of the brakes. Wear data indicators, RUL, energy information sent may be sent to a cloud for further processing and actions. A non-linear regression model and/or a multiple polynomial regression model may include a section for an "elapsed number of landings" and a section for a "prediction of remaining useful life of brakes." The prediction section of the model may allow a prediction of a number of landings remaining before a brake assembly wears out.

Figure 33:
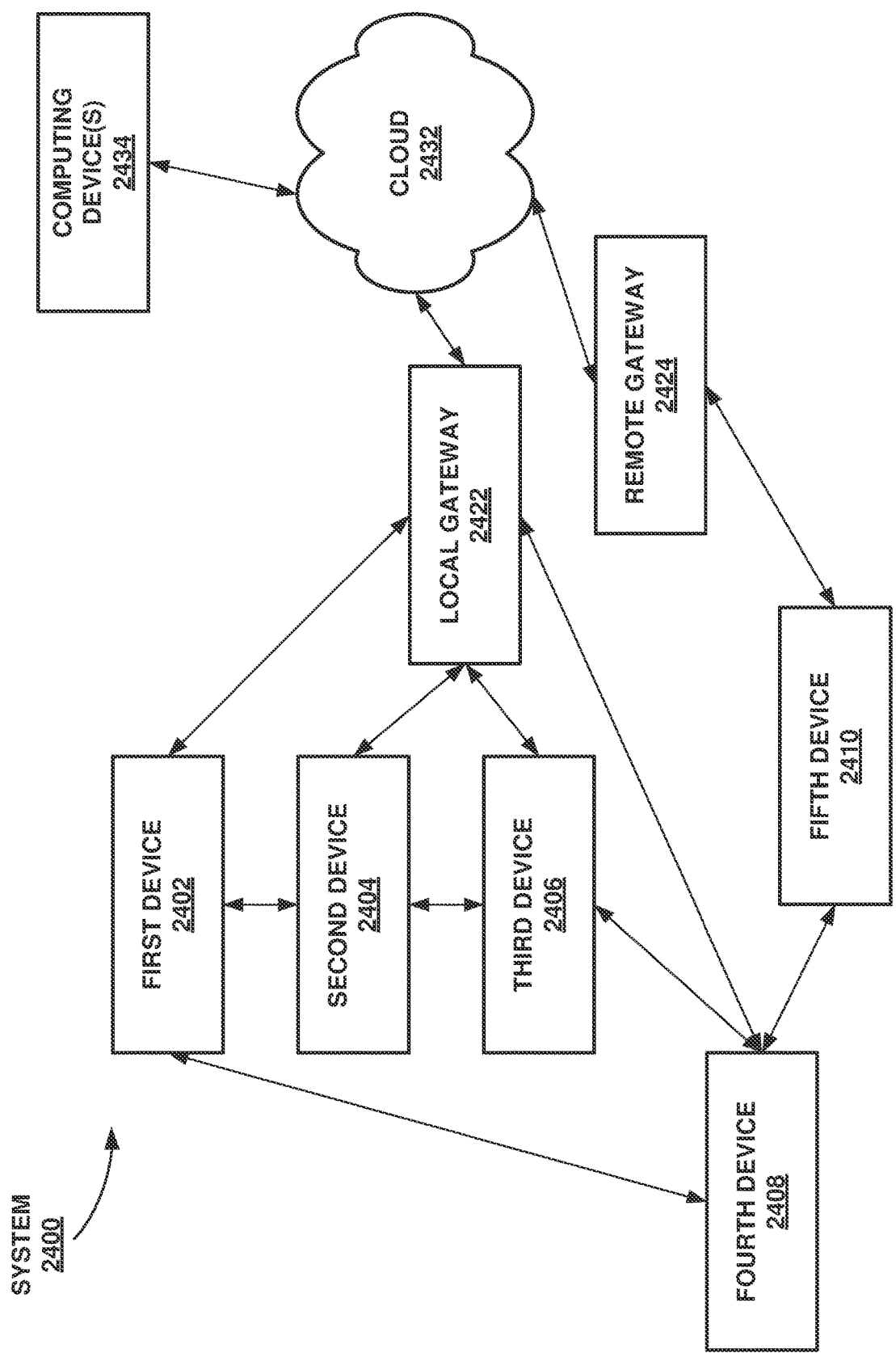
FIG. 33 includes a block diagram illustrating a system including a set of wear sensing devices connected to one or more computing devices via one or more gateways, in accordance with one or more techniques of this disclosure.

FIG. 33 includes a block diagram illustrating a system 2400 including a set of wear sensing devices connected to one or more computing devices via one or more gateways, in accordance with one or more techniques of this disclosure. System 2400 may be an example of system 20. As seen in FIG. 33, system 2400 includes a first device 2402, a second device 2404, a third device 2406, a fourth device 2408, and a fifth device 2410 (collectively, "devices 2402-2410"). Devices 2402-2410 may be connected to cloud 2432 via local gateway 2422 and/or remote gateway 2424. Computing device(s) 2432 may be connected to cloud 2432.

In some examples, each device of devices 2402-2410 may represent a wear sensing device that generates data indicative of a remaining useful life of a brake assembly. In some examples, devices 2402-2410 may form a mesh network including sensors located on the same network. Each device of devices 2402-2410 may communicate with one or more other devices of devices 2402-2410 via one or more wireless links. These one or more wireless links include Bluetooth® wireless links and/or one or more other kinds of wireless links. In some examples, each device of devices 2402-2410 may communicate one or more sensing parameters such as a current remaining wear length of a wear pin indicator, a temperature, vibration and/or shock data, gyroscope data, battery status information, or any combination thereof. In some examples, each device of devices 2402-2410 may be configured for point-to-point communication between one or more nodes of the network. In some examples, each device of devices 2402-2410 may be configured to perform edge inferencing in order to predict a remaining useful life of a respective brake assembly.

In some examples, the local gateway 2422 comprises a gateway that is located on a same vehicle on which devices 2402-2410 are located. In some examples, the local gateway 2422 comprises an aircraft data gateway (ADG). In some examples, remote gateway 2424 may be located separately from a vehicle on which devices 2402-2410 are located. In some examples, one or more of devices 2402-2410 may communicate with the local gateway 2422 according to one or more Bluetooth® communication protocols or one or more Wi-Fi communication protocols. In some examples, one or more of devices 2402-2410 may communicate with the remote gateway 2424 using one or more Long Range (LoRa) communication protocols and/or one or more SigFox Low Power Wide Area Network (LPWAN) protocols.

In one or more examples, the techniques described herein may utilize hardware, software, firmware, or any combination thereof for achieving the functions described. Those functions implemented in software may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure.

Instructions may be executed by one or more processors within the accelerometer or communicatively coupled to the accelerometer. The one or more processors may, for example, include one or more DSPs, general purpose microprocessors, application specific integrated circuits ASICs, FPGAs, or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for performing the techniques described herein. Also, the techniques could be fully implemented in one or more circuits or logic elements.

The techniques of this disclosure may be implemented in a wide variety of devices or apparatuses that include integrated circuits (ICs) or sets of ICs (e.g., chip sets). Various components, modules, or units are described in this disclosure to emphasize functional aspects of devices configured to perform the disclosed techniques, but do not necessarily require realization by different hardware units. Rather, various units may be combined or provided by a collection of interoperative hardware units, including one or more processors as described above, in conjunction with suitable software and/or firmware.

The disclosure includes the following examples.

Example 1: A system, comprising: a sensing device including: sensing circuitry configured to generate position data corresponding to movement of a wear pin indicator configured to indicate translation of a disc stack of a brake assembly relative to an actuator housing of the brake assembly, and wherein the sensing circuitry is configured to generate the position data using electrical power, and conditioning circuitry configured to provide the electrical power to the sensing circuitry; a thermoelectric generator configured to provide the electrical power to the conditioning circuitry, wherein the thermoelectric generator defines a hot node and a cold node, and wherein the thermoelectric generator is configured to produce the electrical power based on a temperature gradient between the hot node and the cold node; a heat sink configured to transfer heat from the cold node to an environment surrounding the brake assembly; a sensor housing mechanically supporting at least the sensing device, the thermoelectric generator, and the heat sink; and a mounting bracket mechanically coupled to the sensor housing, wherein the mounting bracket is configured to attach to the actuator housing, and wherein the mounting bracket is configured to transfer heat from the actuator housing to the hot node to generate the temperature gradient when the mounting bracket is attached to the actuator housing.

Example 2: The system of example 1, further comprising communication circuitry mechanically supported by the sensor housing, wherein the communication circuitry is configured to transmit the position data to an external device using the electrical power produced by the thermoelectric generator.

Example 3: The system of example 1 or example 2, wherein the mounting bracket is configured to displace the sensor housing from the actuator housing when the mounting bracket is attached to the actuator housing.

Example 4: The system of any of examples 1-3, wherein the mounting bracket is configured to position the sensor housing substantially between the actuator housing and a pressure plate of the brake assembly when the mounting bracket is attached to the actuator housing.

Example 5: The system of any of examples 1-4, wherein the mounting bracket is configured to transfer heat by conduction from the actuator housing to the hot node when the mounting bracket is attached to the actuator housing.

Example 6: The system of any of examples 1-5, wherein the sensing device is configured to generate the position data when a wear pin extends through the sensor housing, and wherein the position data corresponds to movement of the wear pin.

Example 7: The system of any of examples 1-6, wherein the mounting bracket is configured to attach to the actuator housing of the brake assembly when the brake assembly provides braking of a wheel of a vehicle moving in a direction of travel, wherein the heat sink includes a base and a plurality of fins extending from the base, and wherein the sensor housing mechanically supports the heat sink such that the fins extend from the base in a direction substantially parallel to the direction of travel when the mounting bracket is attached to the actuator housing.

Example 8: The system of any of examples 1-7, wherein the heat sink comprises a plurality of members defining a mesh, wherein the plurality of members are configured to transfer the heat from the hot node to the environment surrounding the brake assembly.

Example 9: The system of example 8, wherein the plurality of members defines at least one of a diamond lattice structure, a hexagonal diamond lattice structure, a body-centered cubic structure, or a face-centered cubic structure.

Example 10: The system of any of examples 1-9, wherein the heat sink defines a gyroid lattice.

Example 11: The system of any of examples 1-10, wherein the thermoelectric generator is configured to provide the electrical power when the hot node has a temperature of at least 90 degrees Celsius.

Example 12: The system of any of examples 1-11, further comprising a coupling transformer configured to receive at least a portion of the electrical power produced by the thermoelectric generator and produce a transformed power, wherein the coupling transformer is configured to provide the transformed power to the conditioning circuitry.

Example 13: The system of any of examples 1-12, further comprising shunt circuitry, wherein the thermoelectric generator is configured to produce the electrical power at a thermoelectric generator voltage (TEG voltage), and wherein the shunt circuitry is configured to limit a voltage of the electrical power provided to the conditioning circuitry to less than or equal to a cutoff voltage when the TEG voltage exceeds the cutoff voltage.

Example 14: The system of example 13, wherein the thermoelectric generator includes a solid-state device having a thermoelectric sensitivity sufficient to cause the solid-state device to develop a device voltage greater than the cutoff voltage.

Example 15: The system of example 13 or example 14, wherein the shunt circuitry is configured to limit the voltage of the electrical power provided to the conditioning circuit when the temperature gradient generated by the heat transfer of the mounting bracket exceeds a temperature gradient threshold.

Example 16: The system of any of examples 13-15, wherein the shunt circuitry includes a diode configured to shunt a portion of the electrical power produced by the thermoelectric generator to a common electrical node of the system when the TEG voltage exceeds a forward bias voltage of the diode.

Example 17: The system of any of examples 13-16, wherein the shunt circuitry includes a field-effect transistor configured to shunt a portion of the electrical power produced by the thermoelectric generator to a common electrical node of the system, wherein the portion of the electrical power shunted is based on a gate voltage of the field-effect transistor, and wherein the gate voltage is based on the TEG voltage.

Example 18: The system of any of examples 13-17, wherein the shunt circuitry is configured to adjust a stepping ratio of a tapped transformer configured to receive at least a part of the electrical power produced by the thermoelectric generator and provide the part of the electrical power to the conditioning circuitry.

Example 19: The system of example 18, wherein the coupling transformer of example 12 includes the tapped transformer.

Example 20: The system of any of examples 1-19, further comprising: the braking assembly, wherein the braking assembly includes a piston configured to move relative to the actuator housing to cause the translation of the disc stack relative to the actuator housing; and the wear pin indicator, wherein the wear pin indicator is configured to indicate translation of the disc stack relative to the actuator housing.

Example 21: The system of any of examples 1-20, further comprising a magnet configured to move in response to a movement of the wear pin indicator, wherein the sensing circuitry is configured to generate the position data corresponding to movement of the magnet.

Example 22: The system of any of examples 1-21, further comprising a rotational element configured to rotate in response to the movement of the wear pin indicator, wherein the sensing circuitry is configured to generate the position data based on the rotation of the rotational element.

Example 23: The system of example 22, wherein the rotational element is configured such that the rotation of the rotational element causes movement of the magnet of example 21.

Example 24: The system of example 22 or example 23, wherein the rotational element is configured to mechanically engage the wear pin indicator such that translation of the wear pin indicator relative to the actuator housing causes the rotation of the rotational element.

Example 25: The system of example 24, wherein the rotational element defines a first set of gear teeth configured to engage a second set of gear teeth defined by the wear pin indicator when the wear pin indicator translates relative to the actuator housing.

Example 26: The system of any of examples 1-25, further comprising processing circuitry configured to: sense a shock event indicative of a mechanical shock on the sensing device; and activate the sensing circuitry in response to sensing the shock event.

Example 27: A method, comprising: providing electrical power, using a thermoelectric generator, to a sensing device, wherein the thermoelectric generator defines a hot node and a cold node, and wherein the thermoelectric generator produces the electrical power based on a temperature gradient between the hot node and the cold node; generating, using the sensing device, position data corresponding to movement of a wear pin indicator configured to indicate translation of a disc stack of a brake assembly relative to an actuator housing of the brake assembly, wherein the sensing device generates the position data using the electrical power; transferring heat, using a mounting bracket mechanically coupled to the actuator housing, from the actuator housing to the hot node to generate the temperature gradient, wherein the mounting bracket is mechanically coupled to a sensor housing mechanically supporting at least the sensing device, the thermoelectric generator, and the heat sink; and transferring heat, using the heat sink, from the cold node to an environment surrounding the brake assembly.

Example 28: The method of example 27, further comprising transmitting, using communication circuitry mechanically supported by the sensor housing, the position data to an external device, wherein the communication circuitry transmits the position data using the electrical power produced by the thermoelectric device.

Example 29: The method of example 27 or example 28, further comprising positioning, using the mounting bracket, the sensor housing substantially between the actuator housing and a pressure plate of the brake assembly when the mounting bracket is attached to the actuator housing.

Example 30: The method of any of examples 27-29, further comprising transferring the heat, using a plurality of fins of the heat sink, from the cold node to the environment surrounding the brake assembly when the brake assembly provides braking of a wheel of a vehicle moving in a direction of travel, wherein the fins extend from a base of the heat sink in a direction substantially parallel to the direction of travel when the mounting bracket is attached to the actuator housing.

Example 31: The method of any of examples 27-30, further comprising providing the electrical power, using the thermoelectric generator, when the hot node has a temperature of at least 90 degrees Celsius.

Example 32: The method of any of examples 27-31, further comprising limiting a voltage, using shunt circuitry, of the electrical power to a voltage below a cutoff voltage of conditioning circuitry of the sensing device, wherein the conditioning circuitry provides the electrical power to sensing circuitry of the sensing device.

Example 33: The method of example 32, further comprising producing, using the thermoelectric generator, the electrical power at a thermoelectric generator voltage (TEG voltage) greater than the cutoff voltage.

Example 34: The method of examples 27-33, further comprising: moving, using the wear pin indicator, a magnet; and generating, using the sensing device, the position data using the movement of the magnet.

Example 35: The method of examples 27-34, further comprising: rotating, using the wear pin indicator, a rotational element; and generating, using the sensing device, the position data using the rotation of the rotational element.

Example 36: The method of examples 27-35, further comprising: sensing, using processing circuitry, a shock event indicative of a mechanical shock on the sensing device; and activating, in response to sensing the shock event, the sensing device to cause the sensing device to generate the position data.

Example 37: A system, comprising: a thermoelectric generator configured to provide electrical power to conditioning circuitry of the system, wherein the thermoelectric generator defines a hot node and a cold node, and wherein the thermoelectric generator is configured to produce the electrical power based on a temperature gradient between the hot node and the cold node; a heat sink configured to transfer heat from the cold node to an environment surrounding the brake assembly; a sensor housing mechanically supporting at least the thermoelectric generator and the heat sink; and a mounting bracket mechanically coupled to the sensor housing, wherein the mounting bracket is configured to attach to an actuator housing of a brake assembly, wherein the mounting bracket is configured to displace the sensor housing from the actuator housing when the mounting bracket is attached to the actuator housing, wherein the mounting bracket is configured to position the sensor housing substantially between the actuator housing and a pressure plate of the brake assembly when the mounting bracket is attached to the actuator housing, and wherein the mounting bracket is configured to transfer heat by conduction from the actuator housing to the hot node to generate the temperature gradient when the mounting bracket is attached to the actuator housing.

Example 38: The system of example 37, further comprising: shunt circuitry; and conditioning circuitry configured to receive at least some portion of the electrical power from the thermoelectric generator, wherein the thermoelectric generator is configured to produce the electrical power at a thermoelectric generator voltage (TEG voltage), and wherein the shunt circuitry is configured to limit a voltage of the electrical power provided to the conditioning circuitry to less than or equal to a cutoff voltage when the TEG voltage exceeds the cutoff voltage.

Example 39: The system of example 37 or example 38, further comprising: sensing circuitry configured to generate position data corresponding to movement of a wear pin indicator configured to indicate translation of a disc stack of the brake assembly relative to the actuator housing, wherein the sensing circuitry is configured to generate the position data using the electrical power; and communication circuitry mechanically supported by the sensor housing, wherein the communication circuitry is configured to transmit the position data to an external device using the electrical power produced by the thermoelectric generator.

Various examples of the disclosure have been described. Any combination of the described systems, operations, or functions is contemplated. These and other examples are within the scope of the following claims.

What is claimed is:

1. A system, comprising:
   a sensing device including:
      sensing circuitry configured to generate position data corresponding to movement of a wear pin indicator configured to indicate translation of a disc stack of a brake assembly relative to an actuator housing of the brake assembly, and wherein the sensing circuitry is configured to generate the position data using electrical power, and
      conditioning circuitry configured to provide the electrical power to the sensing circuitry;
   a thermoelectric generator configured to provide the electrical power to the conditioning circuitry, wherein the thermoelectric generator defines a hot node and a cold node, and wherein the thermoelectric generator is configured to produce the electrical power based on a temperature gradient between the hot node and the cold node, wherein the thermoelectric generator includes a solid-state device having a thermoelectric sensitivity sufficient to cause the solid-state device to develop a device voltage greater than a cutoff voltage;
   shunt circuitry, wherein the thermoelectric generator is configured to produce the electrical power at a thermoelectric generator voltage (TEG voltage), and wherein the shunt circuitry is configured to limit a voltage of the electrical power provided to the conditioning circuitry to less than or equal to the cutoff voltage when the TEG voltage exceeds the cutoff voltage;
   a heat sink configured to transfer heat from the cold node to an environment surrounding the brake assembly;
   a sensor housing mechanically supporting at least the sensing device, the thermoelectric generator, and the heat sink; and
   a mounting bracket mechanically coupled to the sensor housing, wherein the mounting bracket is configured to attach to the actuator housing, and wherein the mounting bracket is configured to transfer heat from the actuator housing to the hot node to generate the temperature gradient when the mounting bracket is attached to the actuator housing.

2. The system of claim 1, further comprising communication circuitry mechanically supported by the sensor housing, wherein the communication circuitry is configured to transmit the position data to an external device using the electrical power produced by the thermoelectric generator.

3. The system of claim 1, wherein the mounting bracket is configured to displace the sensor housing from the actuator housing when the mounting bracket is attached to the actuator housing.

4. The system of claim 1, wherein the mounting bracket is configured to position the sensor housing substantially between the actuator housing and a pressure plate of the brake assembly when the mounting bracket is attached to the actuator housing.

5. The system of claim 1, wherein the mounting bracket is configured to transfer heat by conduction from the actuator housing to the hot node when the mounting bracket is attached to the actuator housing.

6. The system of claim 1, wherein the sensing device is configured to generate the position data when a wear pin extends through the sensor housing, and wherein the position data corresponds to movement of the wear pin.

7. The system of claim 1,
   wherein the mounting bracket is configured to attach to the actuator housing of the brake assembly when the brake assembly provides braking of a wheel of a vehicle moving in a direction of travel,
   wherein the heat sink includes a base and a plurality of fins extending from the base, and
   wherein the sensor housing mechanically supports the heat sink such that the fins extend from the base in a direction substantially parallel to the direction of travel when the mounting bracket is attached to the actuator housing.

8. The system of claim 1, wherein the heat sink comprises a plurality of members defining a mesh, wherein the plurality of members are configured to transfer the heat from the hot node to the environment surrounding the brake assembly.

9. The system of claim 1, wherein the shunt circuitry is configured to limit the voltage of the electrical power provided to the conditioning circuit when the temperature gradient generated by the heat transfer of the mounting bracket exceeds a temperature gradient threshold.

10. The system of claim 1, wherein the shunt circuitry includes a diode configured to shunt a portion of the electrical power produced by the thermoelectric generator to a common electrical node of the system when the TEG voltage exceeds a forward bias voltage of the diode.

11. The system of claim 1, wherein the shunt circuitry includes a field-effect transistor configured to shunt a portion of the electrical power produced by the thermoelectric generator to a common electrical node of the system, wherein the portion of the electrical power shunted is based on a gate voltage of the field-effect transistor, and wherein the gate voltage is based on the TEG voltage.

12. The system of claim 1, wherein the shunt circuitry is configured to adjust a stepping ratio of a tapped transformer configured to receive at least a part of the electrical power produced by the thermoelectric generator and provide the part of the electrical power to the conditioning circuitry.

13. The system of claim 1, further comprising:
the braking assembly, wherein the braking assembly includes a piston configured to move relative to the actuator housing to cause the translation of the disc stack relative to the actuator housing; and
the wear pin indicator, wherein the wear pin indicator is configured to indicate translation of the disc stack relative to the actuator housing.

14. A system, comprising:
a thermoelectric generator configured to provide electrical power to conditioning circuitry of the system, the conditioning circuitry configured to receive at least some portion of the electrical power from the thermoelectric generator, wherein the thermoelectric generator defines a hot node and a cold node, wherein the thermoelectric generator is configured to produce the electrical power based on a temperature gradient between the hot node and the cold node, wherein the thermoelectric generator is configured to produce the electrical power at a thermoelectric generator voltage (TEG voltage);
shunt circuitry; wherein the shunt circuitry includes a diode configured to shunt a portion of the electrical power produced by the thermoelectric generator to a common electrical node of the system when the TEG voltage exceeds a forward bias voltage of the diode, and wherein the shunt circuitry is configured to limit a voltage of the electrical power provided to the conditioning circuitry to less than or equal to a cutoff voltage when the TEG voltage exceeds the cutoff voltage;
a heat sink configured to transfer heat from the cold node to an environment surrounding a brake assembly;
a sensor housing mechanically supporting at least the thermoelectric generator and the heat sink; and
a mounting bracket mechanically coupled to the sensor housing,
wherein the mounting bracket is configured to attach to an actuator housing of the brake assembly,
wherein the mounting bracket is configured to displace the sensor housing from the actuator housing when the mounting bracket is attached to the actuator housing,
wherein the mounting bracket is configured to position the sensor housing substantially between the actuator housing and a pressure plate of the brake assembly when the mounting bracket is attached to the actuator housing, and
wherein the mounting bracket is configured to transfer heat by conduction from the actuator housing to the hot node to generate the temperature gradient when the mounting bracket is attached to the actuator housing.

15. The system of claim 14, further comprising:
sensing circuitry configured to generate position data corresponding to movement of a wear pin indicator configured to indicate translation of a disc stack of the brake assembly relative to the actuator housing, wherein the sensing circuitry is configured to generate the position data using the electrical power; and
communication circuitry mechanically supported by the sensor housing, wherein the communication circuitry is configured to transmit the position data to an external device using the electrical power produced by the thermoelectric generator.

16. A method, comprising:
providing electrical power, using a thermoelectric generator, to a sensing device, wherein the thermoelectric generator defines a hot node and a cold node, and wherein the thermoelectric generator produces the electrical power based on a temperature gradient between the hot node and the cold node, and wherein the thermoelectric generator is configured to produce the electrical power at a thermoelectric generator voltage (TEG voltage);
limiting a voltage of the electrical power provided to conditioning circuitry to less than or equal to a cutoff voltage when the TEG voltage exceeds the cutoff voltage using shunt circuitry;
generating, using the sensing device, position data corresponding to movement of a wear pin indicator configured to indicate translation of a disc stack of a brake assembly relative to an actuator housing of the brake assembly, wherein the sensing device generates the position data using the electrical power;
transferring heat, using a mounting bracket mechanically coupled to the actuator housing, from the actuator housing to the hot node to generate the temperature gradient, wherein the mounting bracket is mechanically coupled to a sensor housing mechanically supporting at least the sensing device, the thermoelectric generator, and a heat sink; and
transferring heat, using the heat sink, from the cold node to an environment surrounding the brake assembly.

17. The method of claim 16, further comprising transmitting, using communication circuitry mechanically supported by the sensor housing, the position data to an external device, wherein the communication circuitry transmits the position data using the electrical power produced by the thermoelectric device.

* * * * *